(12) United States Patent
Hesla

(10) Patent No.: US 9,204,591 B2
(45) Date of Patent: *Dec. 8, 2015

(54) GAUGE WHEEL AND UNIVERSAL SCRAPER FOR USE WITH A CONVENTIONAL ROW PLANTER ASSEMBLY

(76) Inventor: Ron Hesla, Wakonda, SD (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/344,531

(22) Filed: Jan. 5, 2012

(65) Prior Publication Data

US 2012/0192774 A1 Aug. 2, 2012

Related U.S. Application Data

(63) Continuation-in-part of application No. 11/803,447, filed on May 15, 2007, now Pat. No. 8,104,543.

(60) Provisional application No. 60/800,550, filed on May 15, 2006, provisional application No. 60/922,867, filed on Apr. 11, 2007, provisional application No. 61/429,948, filed on Jan. 5, 2011.

(51) Int. Cl.
| | |
|---|---|
| *A01C 5/06* | (2006.01) |
| *A01C 7/20* | (2006.01) |
| *A01B 15/16* | (2006.01) |
| *A01B 23/06* | (2006.01) |
| *A01B 71/08* | (2006.01) |

(52) U.S. Cl.
CPC ............... *A01C 5/064* (2013.01); *A01B 15/16* (2013.01); *A01B 23/06* (2013.01); *A01B 71/08* (2013.01); *A01C 7/203* (2013.01)

(58) Field of Classification Search
CPC ........ A01B 71/08; A01B 71/00; A01B 15/00; A01B 15/16; A01B 19/10; A01B 19/00; A01B 23/06; A01C 5/00; A01C 5/06; A01C 5/062; A01C 5/064; A01C 5/068; A01C 7/203; A01C 7/201; A01C 7/20; A01C 7/00

USPC ......... 111/191, 193, 195, 135, 137, 167, 164, 111/163, 157, 149; 172/540, 555, 610

See application file for complete search history.

(56) References Cited

U.S. PATENT DOCUMENTS

| | | | |
|---|---|---|---|
| 4,760,806 A | * | 8/1988 | Bigbee et al. ................ 111/167 |
| 4,882,957 A | | 11/1989 | Wright et al. |
| 5,269,237 A | | 12/1993 | Baker et al. |
| 5,269,380 A | | 12/1993 | Lofquist et al. |
| 5,427,038 A | | 6/1995 | Ege |
| 5,431,233 A | | 7/1995 | Schmidt |
| 5,483,907 A | | 1/1996 | Gaalswyk |
| 5,884,711 A | | 3/1999 | Shoup |

(Continued)

FOREIGN PATENT DOCUMENTS

| | | |
|---|---|---|
| JP | 70026300 | 8/1970 |
| JP | 59-140149 | 8/1984 |

*Primary Examiner* — Christopher J Novosad
(74) *Attorney, Agent, or Firm* — Pandiscio & Pandiscio

(57) ABSTRACT

A universal scraper for use with an opening disc, the universal scraper comprising an elongated body having a first end and a second end, the first end being adapted to mount to an axle, and the second end being adapted to receive a scraper blade, wherein the elongated body is sized and shaped so that when the first end of the elongated body is attached to an axle and a scraper blade is mounted to the second end of the elongated body, the scraper blade is presented in scraping disposition to the opening disc.

19 Claims, 55 Drawing Sheets

(56) References Cited

U.S. PATENT DOCUMENTS

| | | |
|---|---|---|
| 5,904,107 A | 5/1999 | Kester |
| 5,970,891 A | 10/1999 | Schlagel |
| 6,321,667 B1 | 11/2001 | Shoup |
| D596,203 S | 7/2009 | Schaffert |
| 7,584,706 B1 | 9/2009 | Smith |
| 7,730,962 B1 | 6/2010 | Kester |
| 7,823,521 B1 | 11/2010 | Smith |
| 8,104,543 B2 * | 1/2012 | Hesla .......................... 172/610 |

* cited by examiner

GAUGE WHEEL AND UNIVERSAL SCRAPER FOR USE WITH A CONVENTIONAL ROW PLANTER ASSEMBLY

REFERENCE TO PENDING PRIOR PATENT APPLICATIONS

This patent application:

(i) is a continuation-in-part of prior U.S. patent application Ser. No. 11/803,447, filed May 15, 2007 now U.S. Pat. No. 8,104,543 by Ron Hesla for NOVEL GAUGE WHEEL FOR USE WITH A CONVENTIONAL ROW PLANTER ASSEMBLY, which in turn claims benefit of (a) prior U.S. Provisional Patent Application Ser. No. 60/800,550, filed May 15, 2006 by Ron Hesla for GAUGE WHEEL FOR USE WITH A CONVENTIONAL ROW PLANTER ASSEMBLY; and (b) prior U.S. Provisional Patent Application Ser. No. 60/922,867, filed Apr. 11, 2007 by Ron Hesla for GAUGE WHEEL FOR USE WITH A CONVENTIONAL ROW PLANTER ASSEMBLY; and (ii) claims benefit of prior U.S. Provisional Patent Application Ser. No. 61/429,948, filed Jan. 5, 2011 by Ron Hesla for SCRAPER ARM.

The four (4) above-identified patent applications are hereby incorporated herein by reference.

FIELD OF THE INVENTION

This invention relates to agricultural machinery in general, and more particularly to a novel gauge wheel and a novel universal scraper for use with a conventional row planter assembly to facilitate planting in adverse conditions.

BACKGROUND OF THE INVENTION

Row planter assemblies are designed to plant rows in an agricultural field, with a plurality of parallel rows being planted with each pass of the row planter assembly. More particularly, with the row planter assembly, for each row, a row unit opens a furrow in the soil, distributes the seed into the furrow, and then closes the furrow by pushing soil back over the seed.

The row planter assemblies have a plurality of the aforementioned row units, one for each row being planted. Each row unit has four main components: (i) a pair of gauge wheels which support the row unit on the soil being planted and which regulate the depth of the seed furrow; (ii) a pair of opening discs (sometimes referred to as a "double disc opener") set at an angle to one another for opening the furrow in the soil, with the depth of the opening discs being set relative to the gauge wheels; (iii) a planter for distributing seeds in the open furrow; and (iv) a pair of closing wheels set at an angle to one another for pushing the soil back over the seeds.

More particularly, and looking now at FIGS. 1-5, there is shown a row planter assembly 1. Row planter assembly 1 generally comprises a plurality of row units 7. Each row unit 7 comprises a pair of gauge wheels 5 and a pair of opening discs 10. Gauge wheels 5 support the frame 15 of the row planter assembly 1 on the soil. The two opening discs 10 of the double disc opener are carried by frame 15 of row planter assembly 1, with the two opening discs 10 of the double disk opener being configured in the shape of a V. The depth of the two opening discs 10 protrude below the depth of the gauge wheels 5 and, as a result, when the row unit is moved across the soil 20, the opening discs 10 form a furrow 25 in the soil. The gauge wheels 5 are positioned on either side of the opening discs 10, in close lateral proximity to the opening discs, and by virtue of their adjustable connection to frame 15, set the depth of the opening discs 10 (i.e., the depth of penetration of the opening discs 10 into the soil 20). A planter 30 (e.g., a seed tube) is spaced just back from the opening discs 10 of the double disc opener and serves to deposit seeds into the opened furrow 25. The closing wheels 35 are positioned at the back end of the row unit, and comprise a pair of angled wheels which close the soil 20 back over the deposited seeds.

As noted above, in order to properly set the depth of the opening discs 10 (i.e., the depth of penetration of the opening discs 10 into the soil 20), it is important for the gauge wheels 5 to be set in close lateral proximity to the opening discs 10. In relatively dry soil conditions, this does not present a significant problem, since the dry soil can move easily through the gap (i.e., the intervening space) between the opening discs 10 and the gauge wheels 5. However, in wet soil conditions, the soil is "sticky" (in the sense that it tends to bind to itself) and there is a significant problem with soil building-up on the outsides of the opening discs 10 and the insides of the gauge wheels 5. To this end, a scraper 40 is typically provided to scrape dirt off the face of opening disc 10. However, when the soil is sticky, soil scraped off the face of opening disc 10 still builds up between the opening disc 10 and the inside of the gauge wheel 5. Thus, the gap between the opening discs 10 and the gauge wheels 5 can become clogged or plugged with mud, which prevents the opening discs 10 and gauge wheels 5 from rotating on their axles. When the gauge wheels 5 stop rotating on their axles, the gauge wheels 5 tend to "drag" across the soil, so that the gauge wheels 5 can no longer reliably set the depth of the furrow 25. Among other things, when the gauge wheels 5 get clogged or plugged with soil in the foregoing manner, the gauge wheels tend to skid across the top of the soil, destroying the seed furrow 25, so that seed is left on top of the ground rather than deposited into a furrow. In this respect it should be appreciated that the depth of the furrow 25 is generally important for proper crop growth. When the gauge wheels 5 stop rotating so that they can no longer accurately set furrow depth, the farmer must interrupt the planting operation, climb down from the tractor, manually remove the mud from the space between the opening discs 10 and the gauge wheels 5, climb back up onto the tractor and resume planting—until the machinery clogs once again, in which case the planting operation must be halted once more while the machinery is cleaned in the foregoing manner.

Planting in wet conditions, using conventional row planter assemblies, is extremely time-consuming and labor intensive. For example, if the operator of the planter assembly is required to stop the machinery approximately every ten minutes and spend approximately five minutes cleaning the gap between the opening discs 10 and the gauge wheels 5, productivity is reduced by 33%. Furthermore, operator fatigue is significantly increased, due to the additional exertion of climbing down from the tractor, manually cleaning the space between the opening discs 10 and the gauge wheels 5, and climbing back up into the tractor to resume planting. This loss of productivity and increase in operator fatigue are significant problems, particularly in certain climates and/or for certain crops, one or both of which may have very limited planting periods.

Various efforts have been made in an effort to keep the gauge wheel free of soil build-up. Many of these approaches incorporate the use of scrapers for scraping soil build-up off of the opening discs. However, this type of solution is not entirely satisfactory, since in many cases the scrapers merely push the wet soil off of the opening discs and onto the gauge wheel, and fail to prevent a build-up of soil in the gap between the opening discs and the gauge wheel. In addition, current scrapers are not entirely satisfactory. For one thing, current scrapers are generally attached to the frame 15 of the row planter assembly 1 using an attachment arm. See, for example, FIGS. 4, 6 and 7, where scraper 40 comprises an attachment arm 42 for mounting a scraper blade 43 to frame 15. This attachment arm can block soil from exiting the gap between the opening discs and the gauge wheels. Furthermore, current scrapers employ a wide variety of different attachment arms for mounting the scraper blade to the frame of the row planter assembly. This can present inventory issues for dealers, since it requires stocking a larger inventory of attachment arms. In addition, the lack of standardization in attachment arms can present serious issues for farmers, since it may complicate obtaining a replacement part if and when a scraper is damaged in the field. It will be appreciated that any delay in obtaining a replacement part can be disastrous if the delay occurs during a critical planting time.

SUMMARY OF THE INVENTION

It is, therefore, one object of the present invention to provide an improved gauge wheel for use with a conventional row planter assembly, wherein the improved gauge wheel facilitates the egress of soil (particularly sticky wet soil) from the gap located between the opening disc and the gauge wheel.

Another object of the present invention to provide a universal scraper for use with a conventional row planter assembly, wherein the universal scraper may be used with a wide range of conventional row planter assemblies.

And another object of the present invention is to provide an improved row planter assembly which utilizes the aforementioned improved gauge wheels and/or the aforementioned universal scrapers so as to avoid the problems associated with the prior art.

These and other objects are addressed by the present invention, which comprises the provision and use of a novel gauge wheel which prevents a build-up of soil in the gap between the opening disc and the gauge wheel. More particularly, the novel gauge wheel comprises at least one opening formed in the face of the gauge wheel which permits soil to exit the gap between the opening disc and the gauge wheel. As a result of this construction, soil does not build up in the gap between the opening disk and the gauge wheel, the gauge wheels continue to rotate freely, and the depth of the opening discs is properly maintained, whereby planting may continue without interruption, even in wet soil conditions.

The present invention also comprises the provision and use of a novel universal scraper for use with a conventional row planter assembly, wherein the universal scraper may be used with a wide range of conventional row planter assemblies.

And the present invention provides an improved row planter assembly which utilizes the aforementioned improved gauge wheels and/or the aforementioned universal scrapers so as to avoid the problems associated with the prior art.

In one preferred form of the present invention, there is provided a universal scraper for use with an opening disc, the universal scraper comprising:
an elongated body having a first end and a second end, the first end being adapted to mount to an axle, and the second end being adapted to receive a scraper blade, wherein the elongated body is sized and shaped so that when the first end of the elongated body is attached to an axle and a scraper blade is mounted to the second end of the elongated body, the scraper blade is presented in scraping disposition to the opening disc.

In another preferred form of the present invention, there is provided apparatus for opening ground, the apparatus comprising:
a frame;
an opening disc rotatably mounted to the frame; and
a universal scraper for scraping the opening disc, the universal scraper comprising:
an elongated body having a first end and a second end, the first end being adapted to mount to an axle, and the second end being adapted to receive a scraper blade, wherein the elongated body is sized and shaped so that when the first end of the elongated body is attached to an axle and a scraper blade is mounted to the second end of the elongated body, the scraper blade is presented in scraping disposition to the opening disc.

In another preferred form of the present invention, there is provided a row planter assembly comprising:
a frame;
an opening disc rotatably mounted to the frame;
a gauge wheel rotatably mounted to the frame and disposed alongside, but spaced from, the opening disc so as to create a narrow gap therebetween;
wherein the gauge wheel comprises at least one opening in the side wall thereof so as to permit soil to pass from the gap located between the opening disk and the gauge wheel to the region outside of the gauge wheel; and
a universal scraper mounted to an axle supporting one of the opening disc and the gauge wheel.

In another preferred form of the present invention, there is provided a method for opening ground, the method comprising:
providing a frame, an opening disc rotatably mounted to the frame, and a universal scraper for scraping the opening disc, the universal scraper comprising an elongated body having a first end and a second end, the first end being adapted to mount to an axle, and the second end being adapted to receive a scraper blade, wherein the elongated body is sized and shaped so that when the first end of the elongated body is attached to an axle and a scraper blade is mounted to the second end of the elongated body, the scraper blade is presented in scraping disposition to the opening disc; and
moving the opening disc through the ground.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Figure 8:
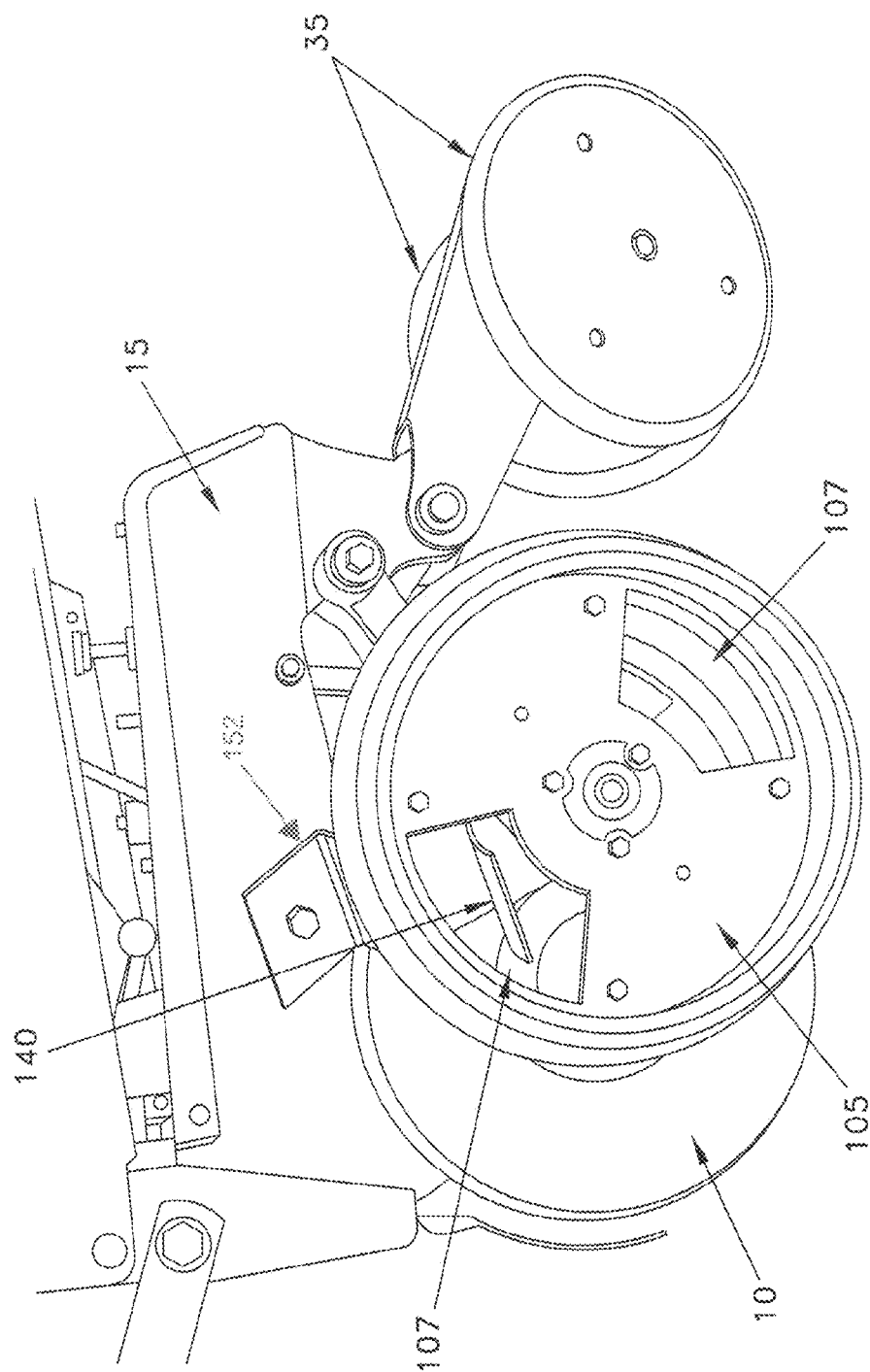
FIG. 8 is a perspective view showing a novel gauge wheel formed in accordance with the present invention, and also showing an opening disc, scraper and closing wheels.
Figure 9:
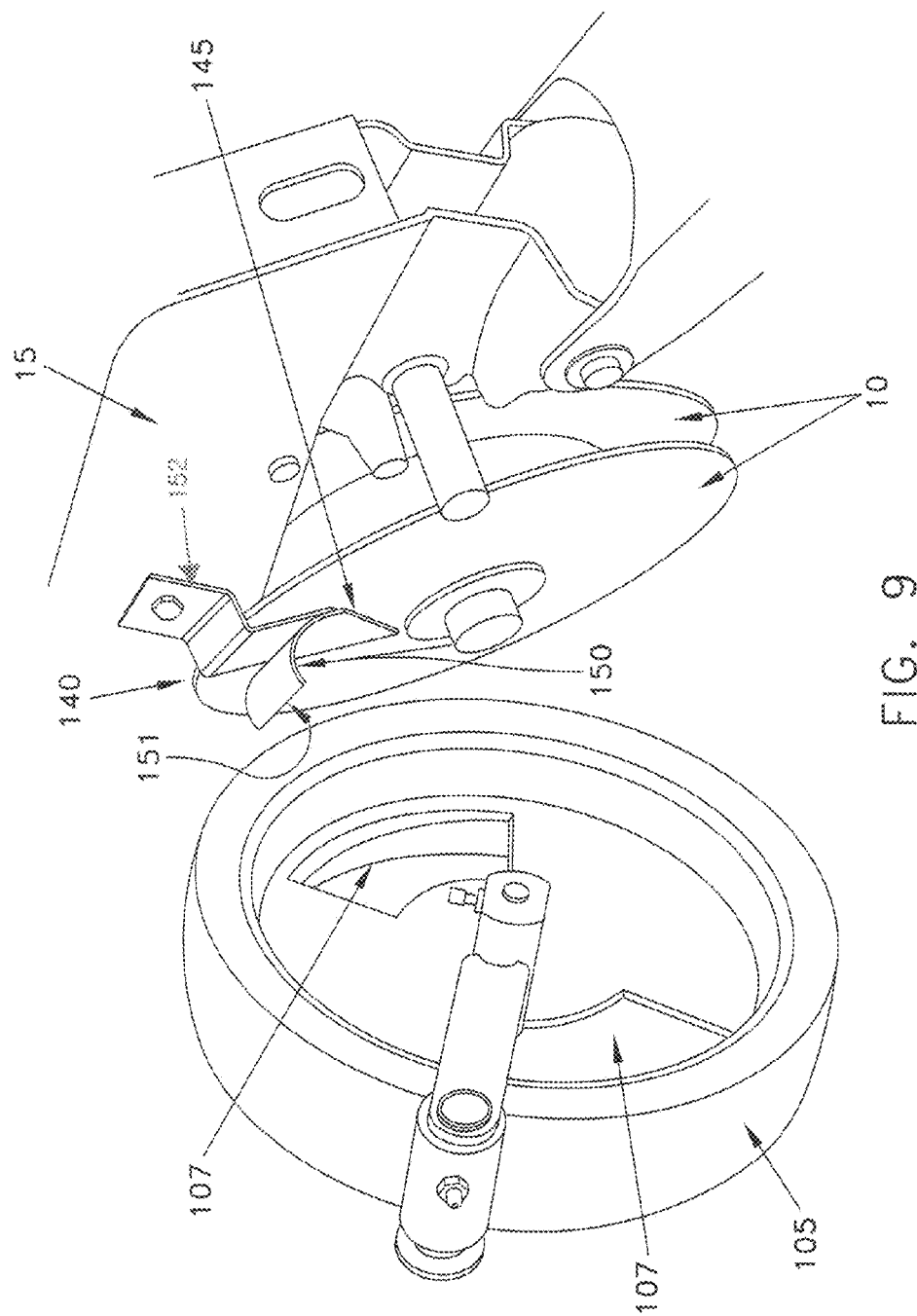
FIG. 9 is an exploded view showing a novel gauge wheel formed in accordance with the present invention, and also showing opening discs and a scraper.
Figure 10:
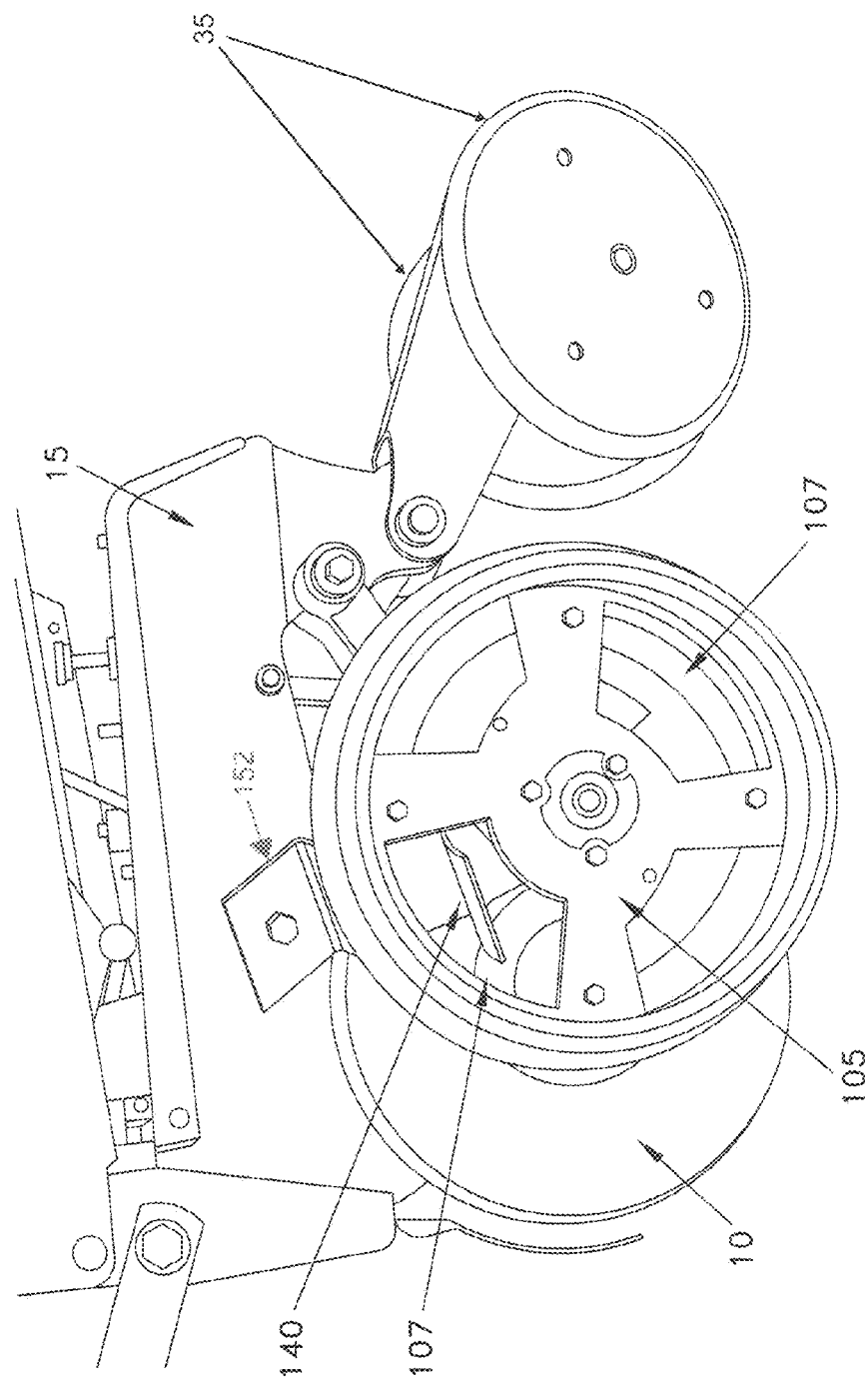
FIG. 10 is a perspective view showing an alternative form of a gauge wheel also formed in accordance with the present invention.
Figure 11:
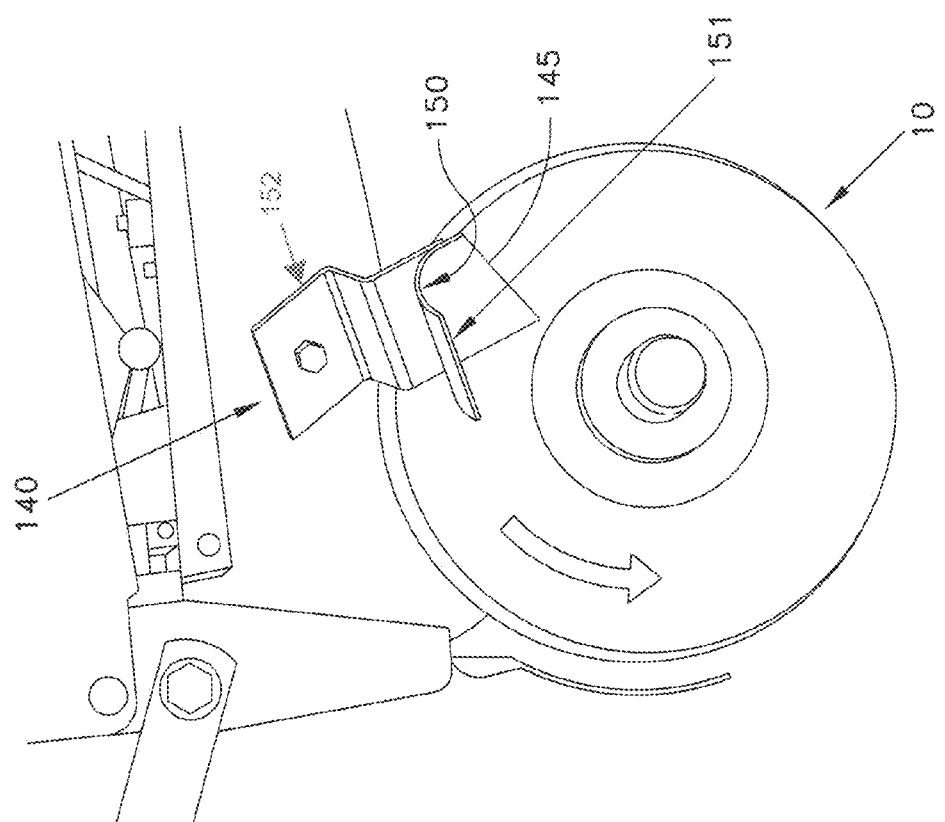
FIG. 11 is a perspective view showing a novel form of scraper also formed in accordance with the present invention.
Figure 12:
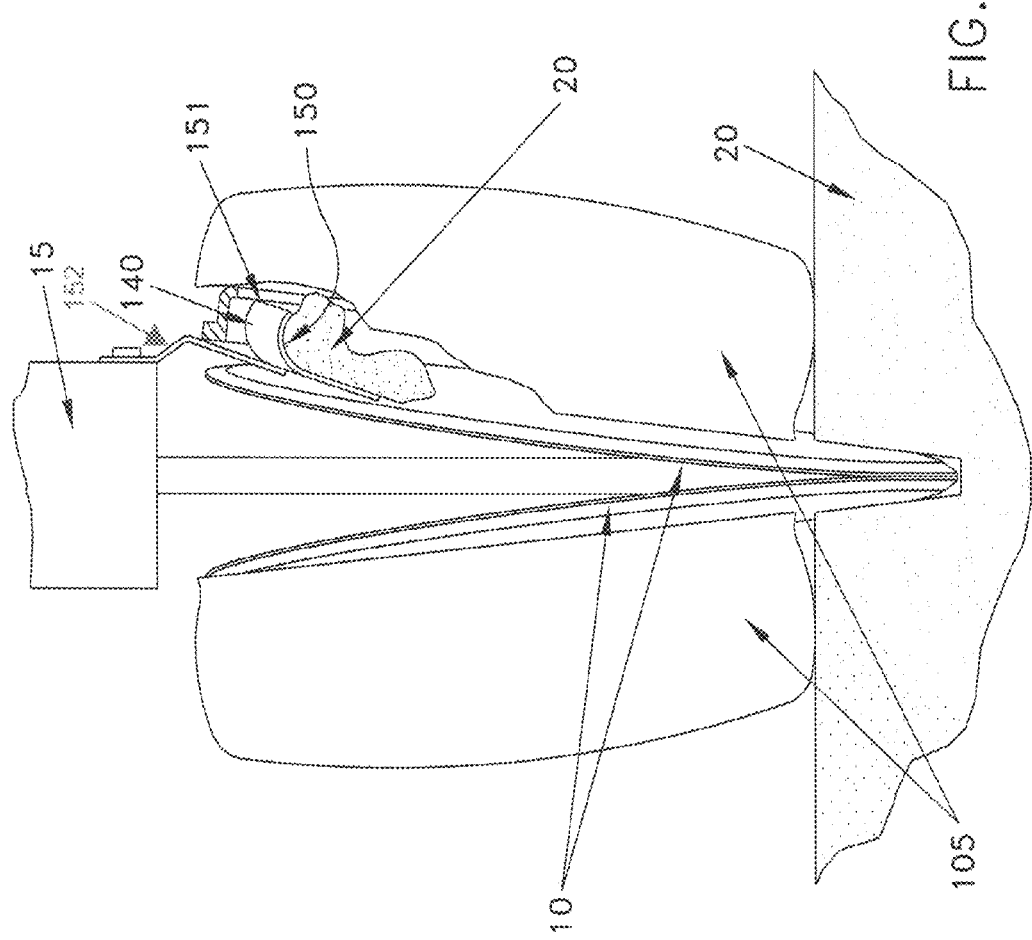
FIG. 12 is a front view showing the scraper of FIG. 11 removing soil from the outside face of the opening disc.
Figure 13:
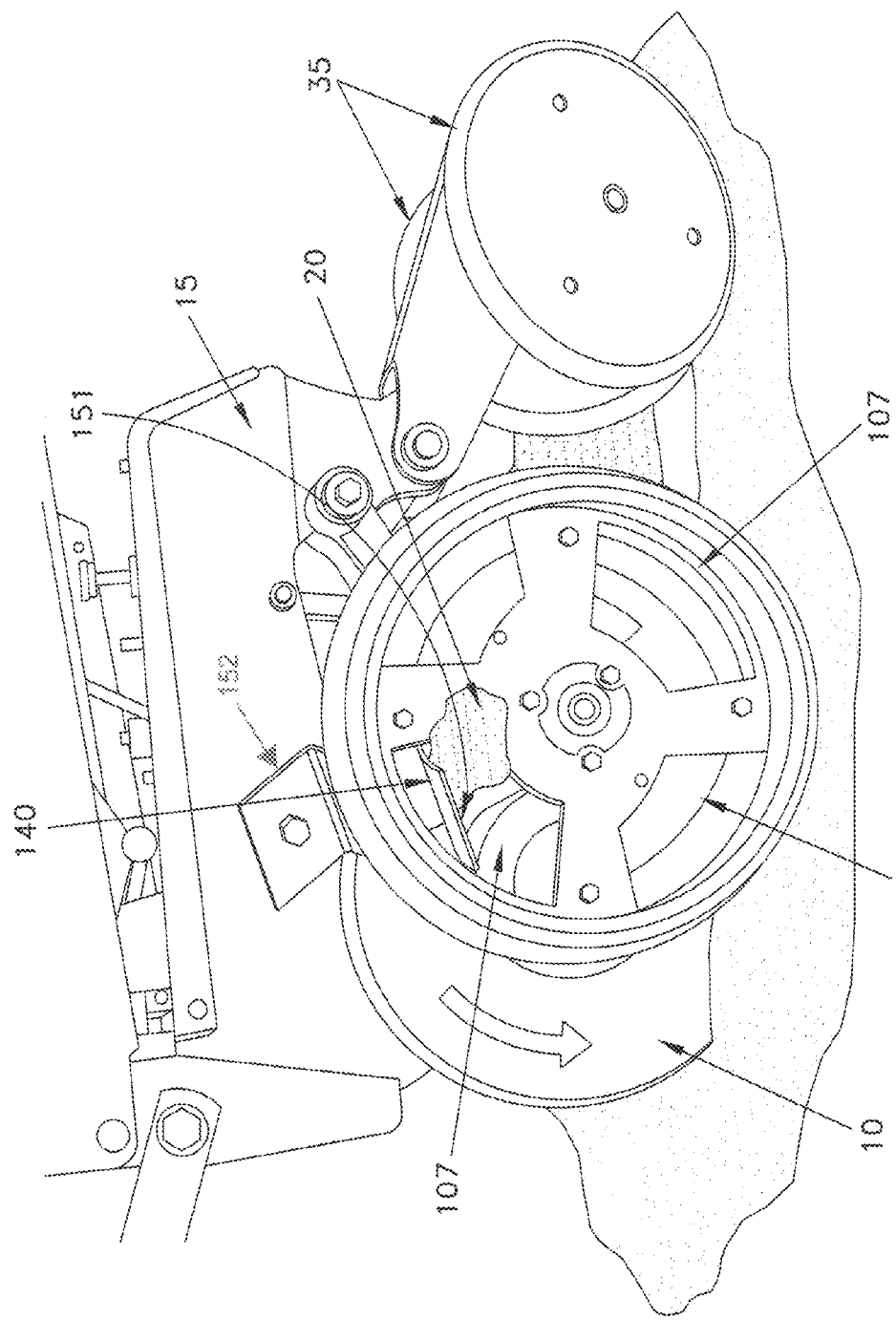
FIG. 13 is a perspective view showing soil exiting an opening in a gauge wheel formed in accordance with the present invention.

Looking first at FIGS. 8 and 9, the present invention generally comprises the provision and use of a novel gauge wheel 105 which prevents a build-up of soil in the gap between the opening disc 10 and the gauge wheel. More particularly, the novel gauge wheel 105 comprises at least one opening 107 formed in the face of the gauge wheel which permits soil to exit the gap between the opening disc 10 and the gauge wheel 105. As a result of this construction, soil does not build up in the gap between the opening disc 10 and the gauge wheel 105, the gauge wheels 105 continue to rotate freely, and the depth of the opening discs 10 are properly maintained, whereby planting may continue without interruption, even in wet soil conditions.

In one preferred construction, and still looking now at FIGS. 8 and 9, gauge wheel 105 comprises a pair of diametrically-opposed openings 107, with the openings extending along a substantial portion (e.g., greater than about 30%) of the radius of the gauge wheel.

And in a preferred construction, each of the openings 107 extends along a substantial arc (e.g., greater than about 50 degrees) of the circumference of the gauge wheel.

Of course, it will be appreciated that the number, size and disposition of the openings 107 may vary. In general, openings 107 are sufficient in number, size and disposition to permit soil to exit the gap located between the opening disc 10 and the gauge wheel 105, so as to keep soil from building up in this region and causing gauge wheel 105 to bind. However, it will also be appreciated that sufficient material must be maintained within the face of gauge wheel 105 so as to ensure sufficient wheel integrity to support the weight of the row planter assembly.

In addition to the foregoing, the portions of gauge wheel 105 forming the perimeters of the opening 107 may have various configurations, e.g., the surface edges of the openings may be tapered to facilitate egress of soil through the openings, the corners of openings 107 may be radiused, etc.

Furthermore, it will be appreciated that gauge wheel 105 may be formed out of any suitable material or materials, e.g., the entire gauge wheel 105 may be formed out of a suitable metal, a suitable plastic, etc.; or the gauge wheel 105 may be formed out of two or more materials, e.g., a metal inner rim and a plastic outer rim, etc.

Preferably, a scraper (e.g., the scraper 40 shown in FIGS. 4, 6 and 7, or the scraper 140 shown in FIGS. 8-13, etc.) is used in conjunction with the novel gauge wheel 105. In this situation, the scraper may assist, or may be modified to further assist, in directing the loosened soil through the at least one opening 107 in the face of the gauge wheel 105 as the gauge wheel turns.

It will be appreciated that numerous benefits are obtained by using the novel gauge wheel design of the present invention. First and foremost, the one or more openings 107 formed in gauge wheel 105 facilitate egress of soil from the gap between the opening discs 10 and the gauge wheels 105. As a result, productivity is increased by allowing more time to be spent planting and less time unplugging clogged row units of the row planter assemblies. This in turn permits the farmer to plant more acres in less time, with less fatigue, thereby increasing planting efficiency, particularly in wet soil conditions.

In addition to the foregoing, the one or more openings 107 in gauge wheel 105:

(i) provide an easy way to examine the row planter assembly's opening discs (particularly their hubs and bearings), scrapers, seed deployment tubes, etc.;

(ii) provide a visual cue of gauge wheel rotation;

(iii) reduce the total amount of material used to produce the gauge wheel; and (iv) provide increased tolerance for the gap between the opening discs and the gauge wheels, thereby minimizing the time spent adjusting gauge wheel position.

Significantly, the present invention may be retroactively installed on existing row planter assemblies as well as used in new row planter assemblies.

And the present invention may be used on other farm equipment such as planting drills, etc.

And the present invention may be used with virtually any type of seed planting.

Novel Scraper

Figure 1:
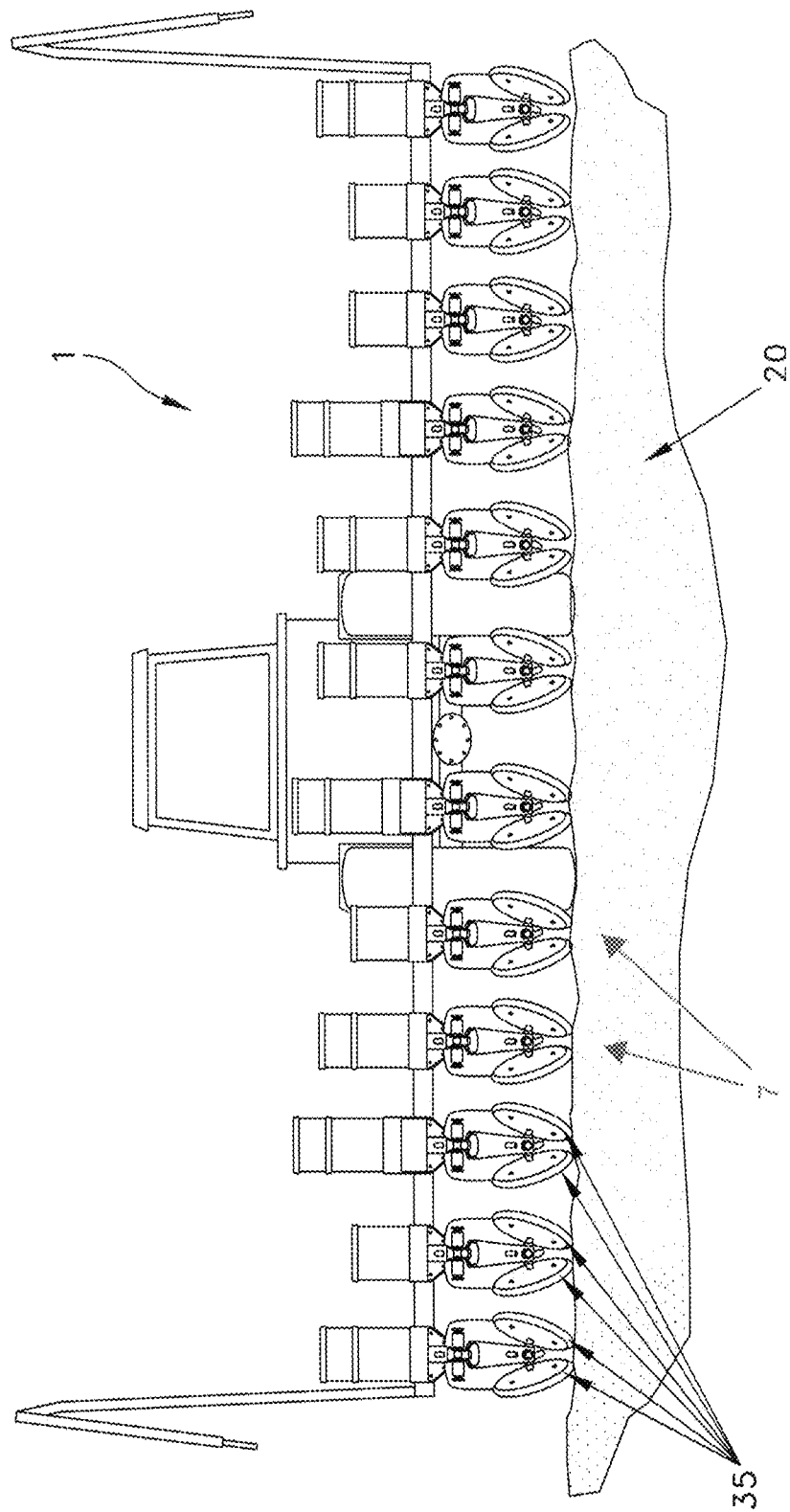
FIG. 1 is a rear view showing a prior art row planter assembly.
Figure 2:
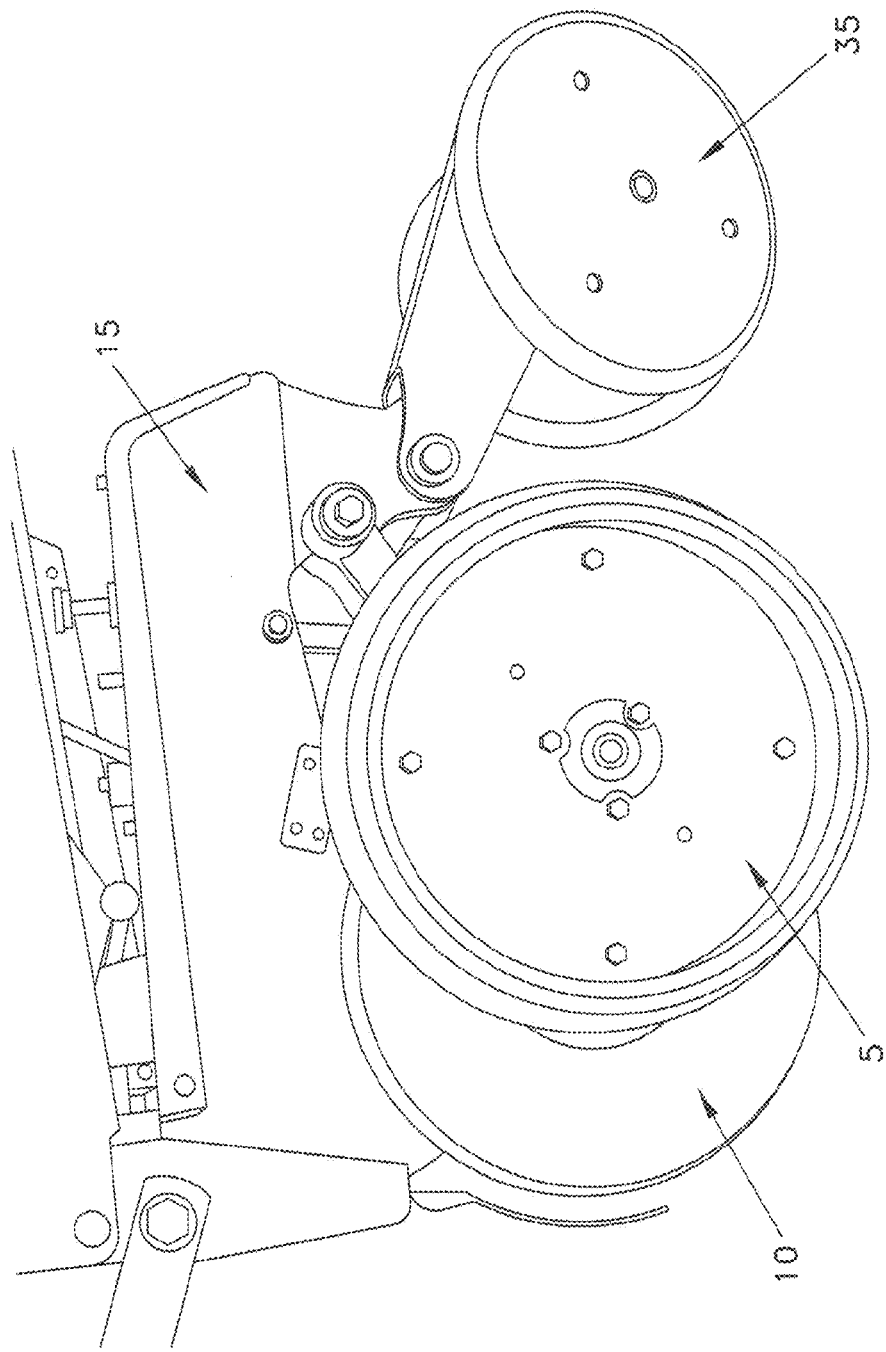
FIG. 2 is a perspective view showing a prior art opening disc, gauge wheel and closing wheels of a row unit of a planter assembly.
Figure 3:
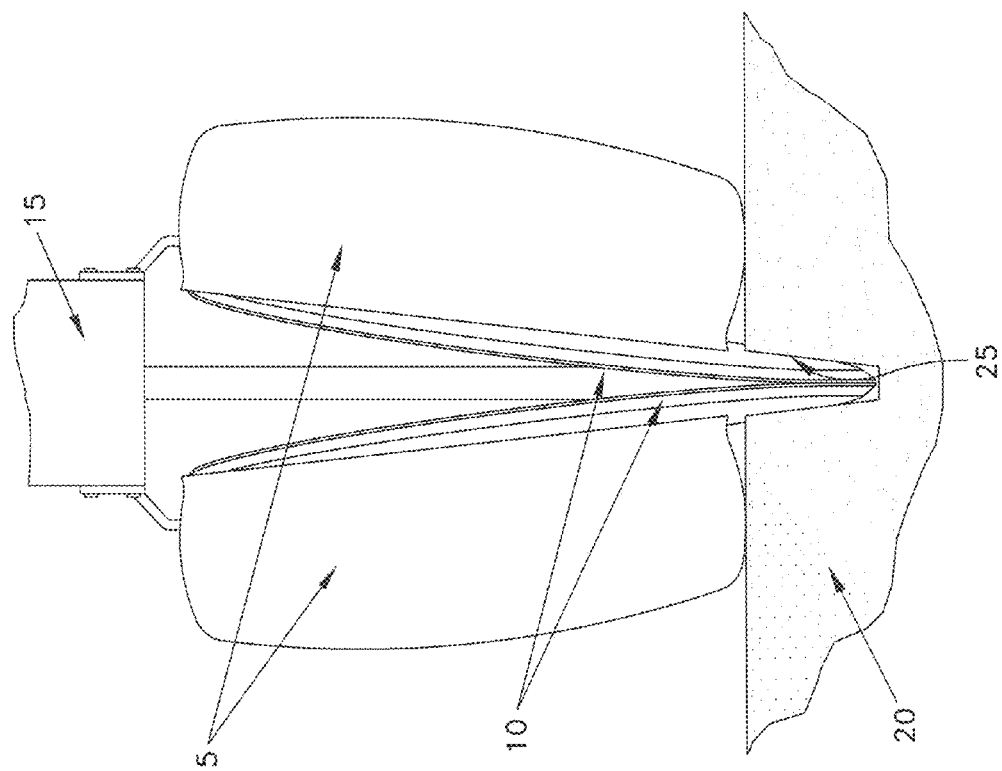
FIG. 3 is a front view showing prior art opening discs and gauge wheels of a row planter assembly.
Figure 4:
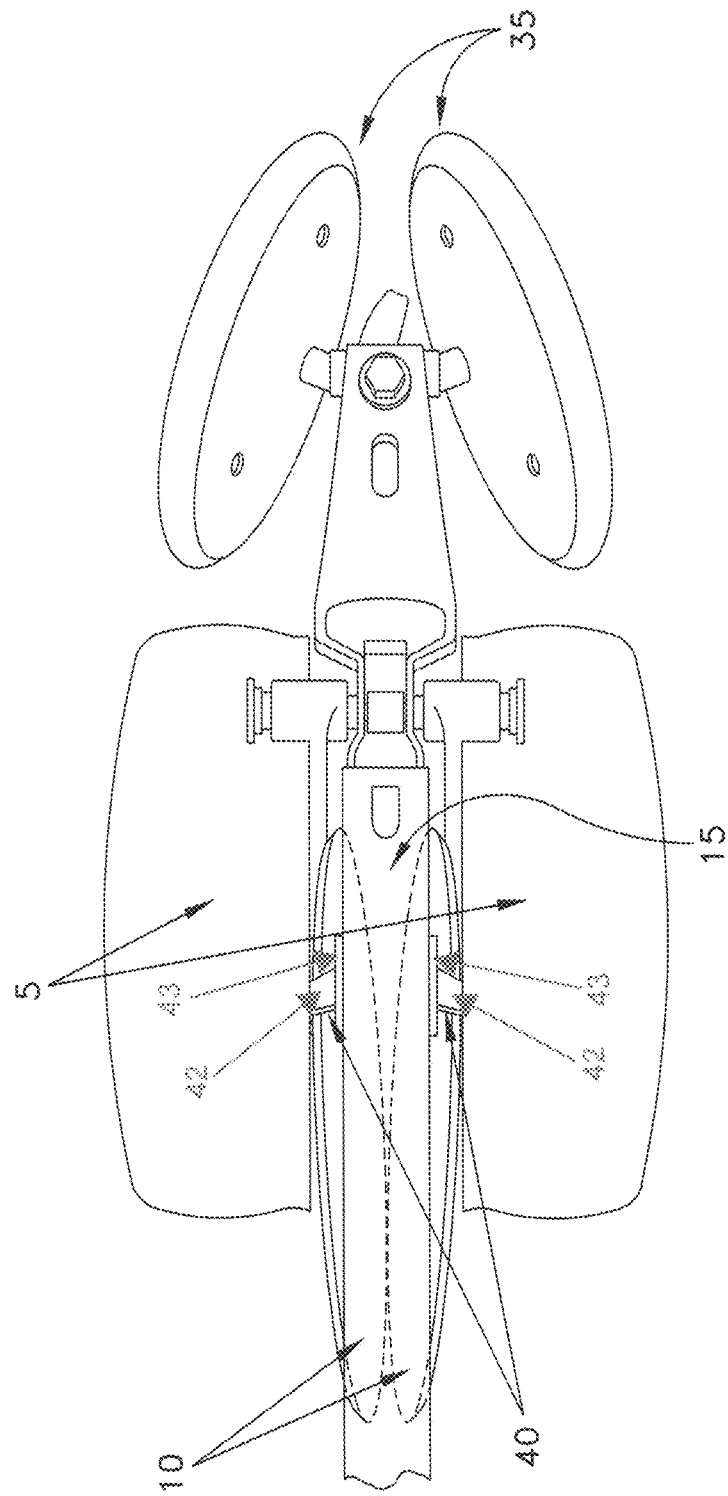
FIG. 4 is a top view showing prior art opening discs, scrapers, gauge wheels and closing wheels of a row planter assembly.
Figure 5:
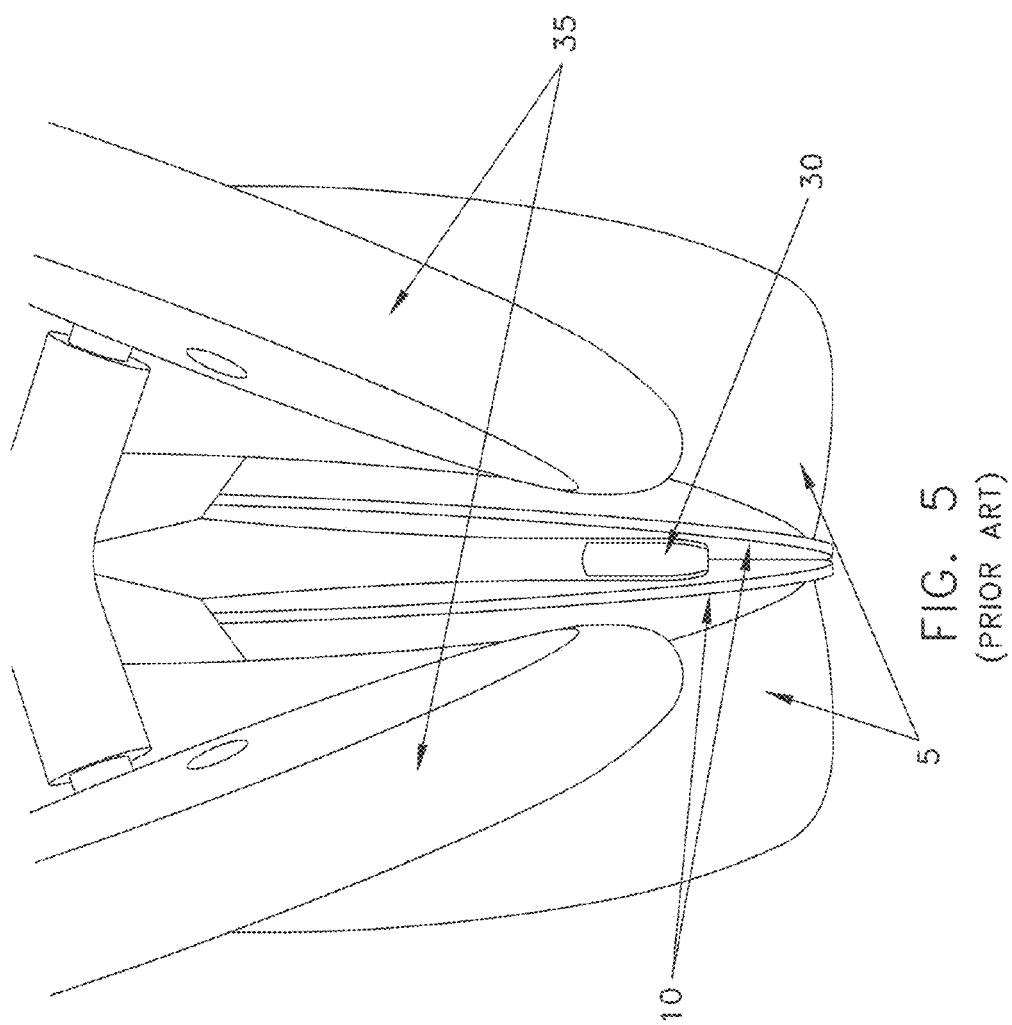
FIG. 5 is a rear view showing prior art opening discs, gauge wheels, seed tube and closing wheels of a row unit of a row planter assembly.
Figure 6:
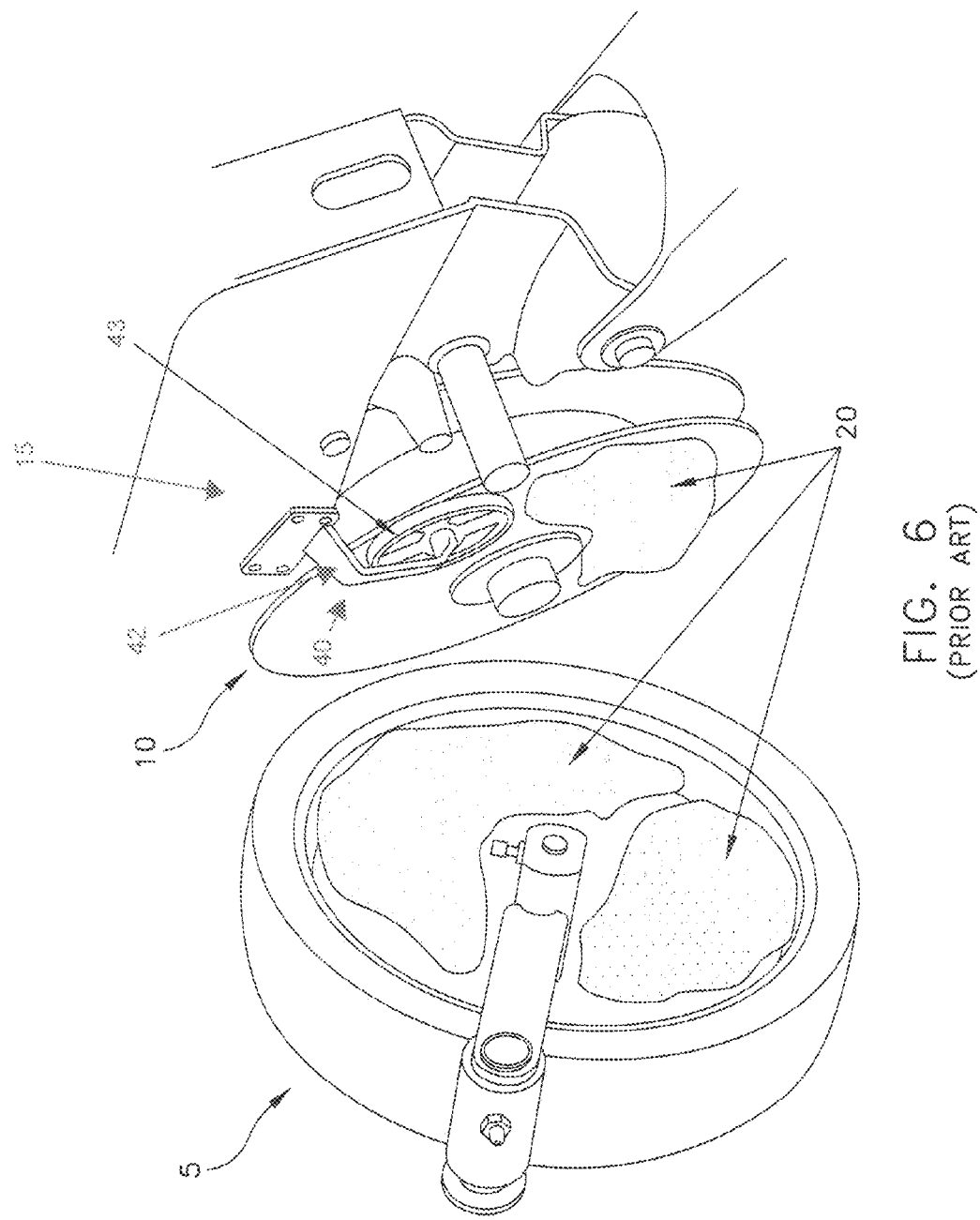
FIG. 6 is an exploded view of a prior art gauge wheel, scraper and opening discs of a row unit of a row planter assembly, with soil shown adhering to the outside face of the opening disc and the inside face of the gauge wheel.
Figure 7:
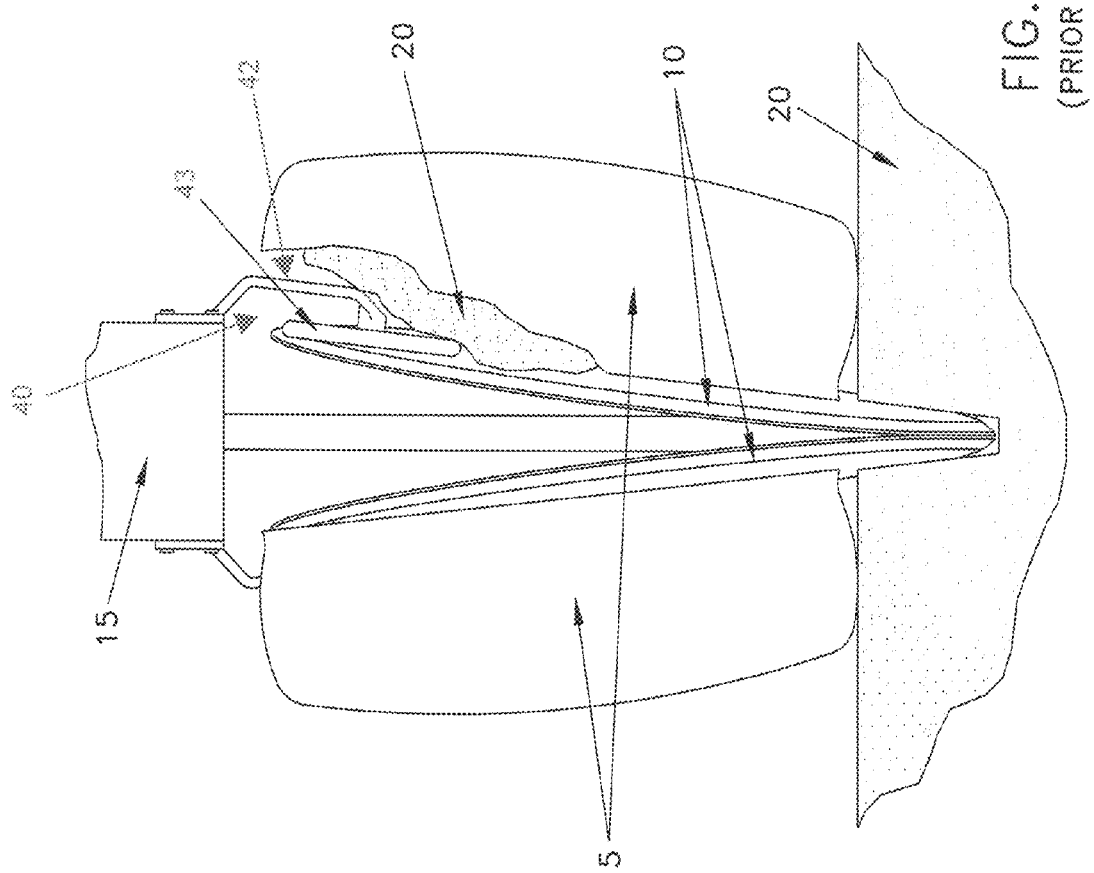
FIG. 7 illustrates prior art opening discs, scraper and gauge wheels of a row unit of a row planter assembly, with soil shown lodged in the gap between the opening disc and the gauge wheel.

The prior art scraper 40 shown in FIGS. 4, 6 and 7 essentially comprises a wheel which contacts the face of opening disc 10, i.e., a wheel-shaped scraper blade 43 is mounted to frame 15 by means of an attachment arm 42. While the prior art scraper 40 works well with the novel gauge wheel 105, with the loosened soil being free to exit the gap located between opening disc 10 and gauge wheel 105 via openings 107, the present invention generally performs better with the provision of a novel scraper which is configured to direct the loosened soil out through openings 107.

Thus, for example, and looking now at FIGS. 8-13, there is shown a novel scraper 140. Novel scraper 140 serves to remove accumulated soil from the face of opening disc 10 and/or the rim of gauge wheel 105 and direct that loosened soil out of openings 107 of the gauge wheel 105. To this end, novel scraper 140 comprises (i) a flat leading edge 145 for engaging the side wall of the opening disc 10 and freeing the built-up soil from the opening disc, and (ii) a curved body 150 for channeling the scraped-off soil toward the openings 107 in gauge wheel 105, so as to facilitate egress of soil from the space between the opening disc and gauge wheel. Curved body 150 also includes a trailing edge 151 for removing any accumulated soil from the rim of gauge wheel 105 and channel that loosened soil out openings 107. In one form of the invention, novel scraper 140 comprises an attachment arm 152 for securing the scraper to frame 15 of the row planter assembly.

Thus it will be seen that novel scraper 140 provides one edge 145 for removing accumulated soil from opening disc 10, another edge 151 for removing accumulated soil from gauge wheel 105, and a curved body 150 located between edges 145 and 151 for guiding loosened soil out openings 107.

Universal Scraper Arm

In the construction shown in FIGS. 8-13, scraper 140 is shown mounted to the frame 15 of the row planter assembly 1, i.e., via an attachment arm 152. This is analogous to the manner in which the prior art scraper 40 is mounted to the frame 15 of the row planter assembly, i.e., via attachment arm 42 (FIGS. 4, 6 and 7).

In an alternative form of the present invention, the scraper comprises a universal scraper arm for supporting the scraper blade adjacent to the opening disc 10. This universal scraper arm is mounted to an adjacent axle and permits the scraper blade to be properly positioned against the opening disc when using any of the commercially-available opening discs. This universal scraper arm may be mounted to the axle of the opening disc 10, or the universal scraper arm may be mounted to the axle of gauge wheel 105. In one preferred form of the invention, the universal scraper arm is mounted to the axle of opening disc 10. The universal scraper arm may be used to support substantially any scraper blade, e.g., it may be used to support the wheel-shaped scraper blade 43 shown in FIGS. 4, 6 and 7, or the scraper 140 shown in FIGS. 8-13, etc.

Figure 14:
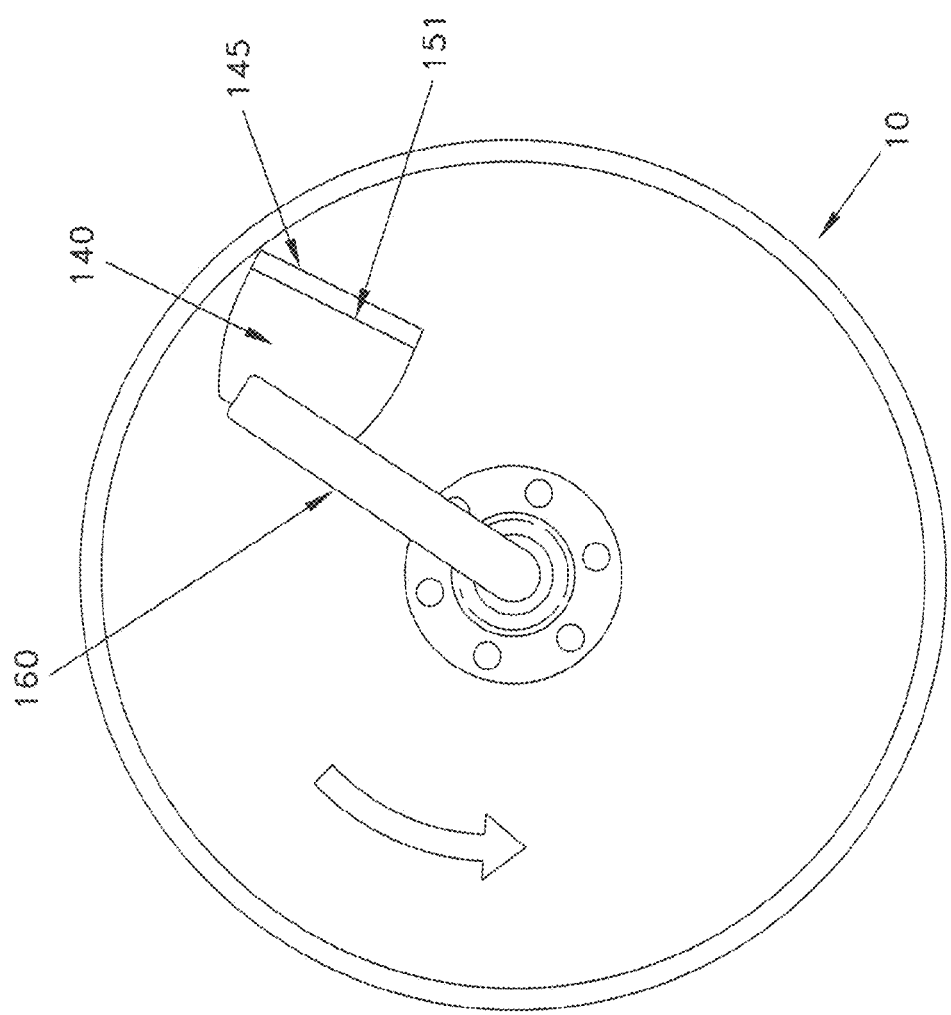
FIG. 14 is a side view showing an alternative approach for mounting the scraper adjacent the opening disc.
Figure 15:
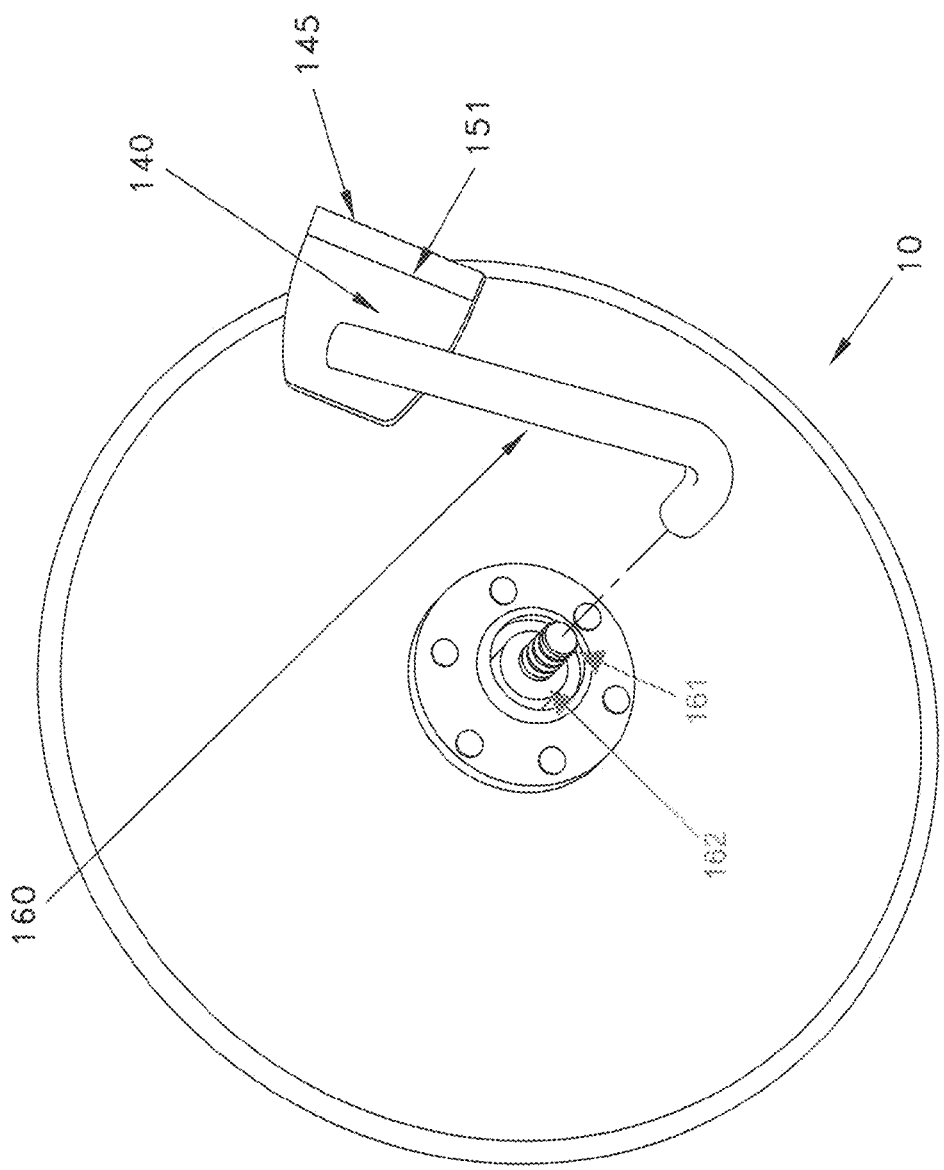
FIG. 15 is a side view showing one way of effecting the construction shown in FIG. 14.
Figure 16:
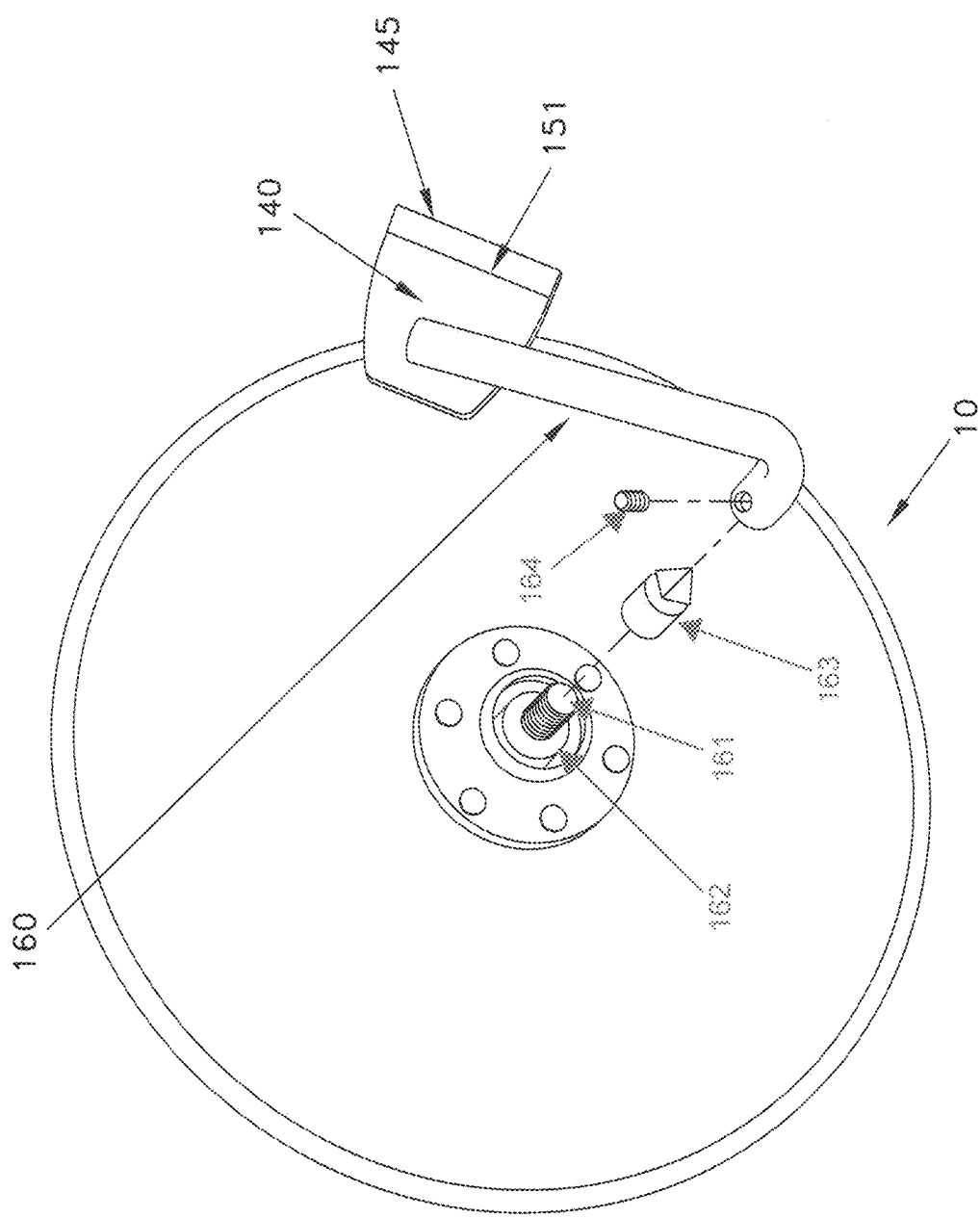
FIG. 16 is a side view showing another way of effecting the construction shown in FIG. 14.
Figure 17:
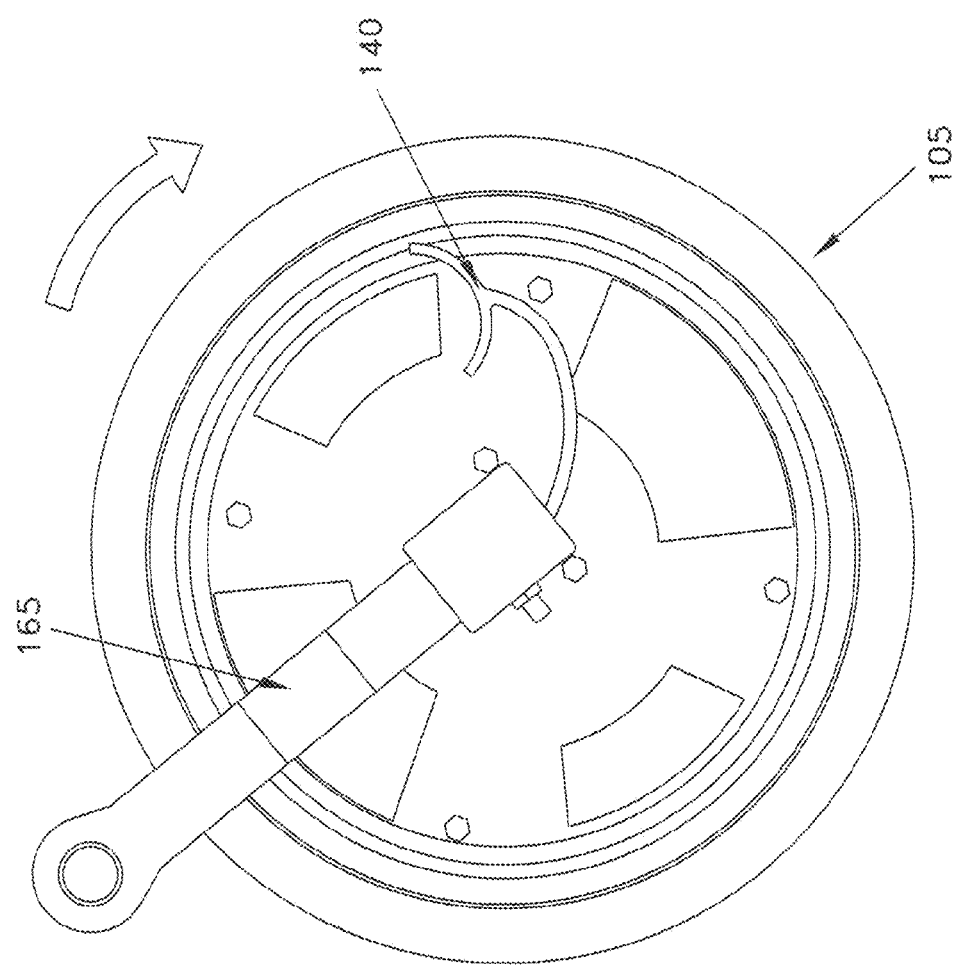
FIG. 17 is a side view showing another form of scraper, with another mounting arrangement.
Figure 18:
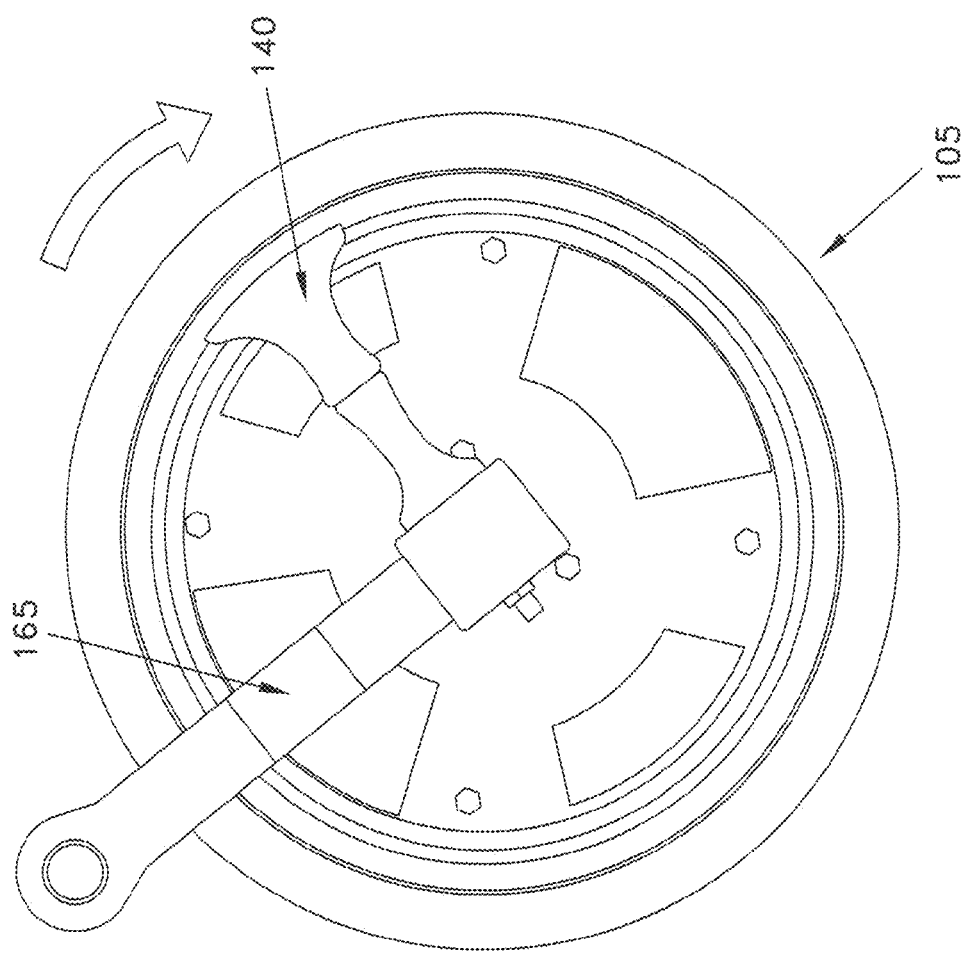
FIG. 18 is a side view showing another form of scraper, with another mounting arrangement.
Figure 19:
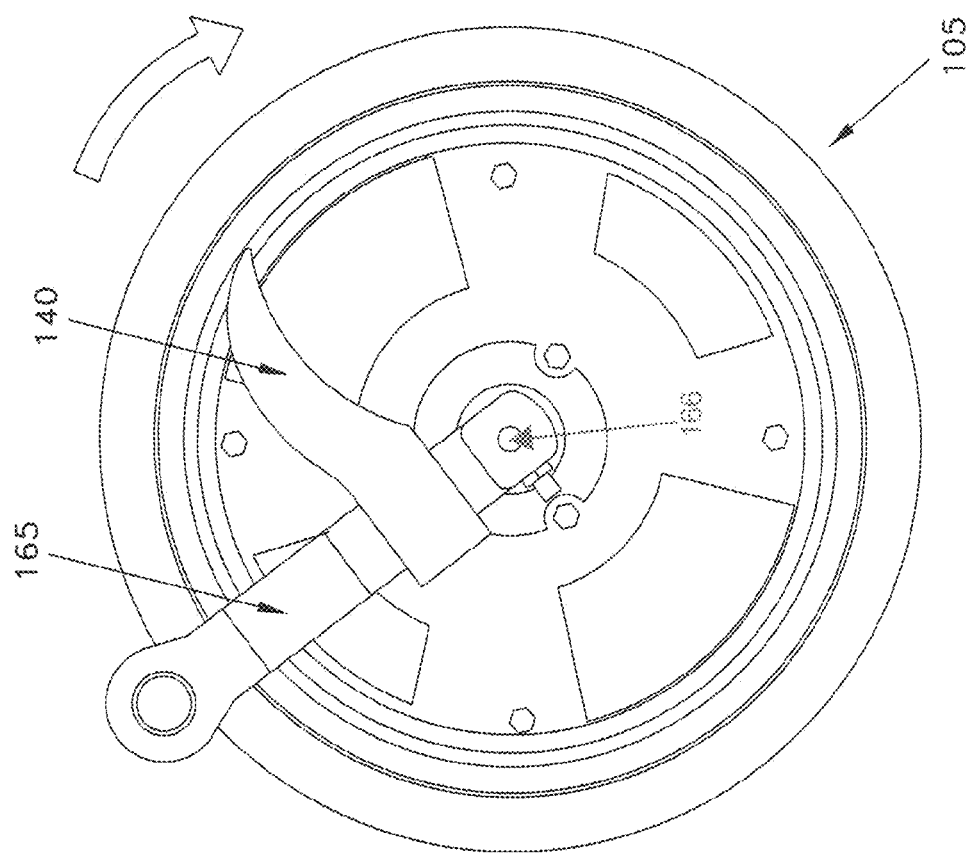
FIG. 19 is a side view showing another form of scraper, with another mounting arrangement.
Figure 20:
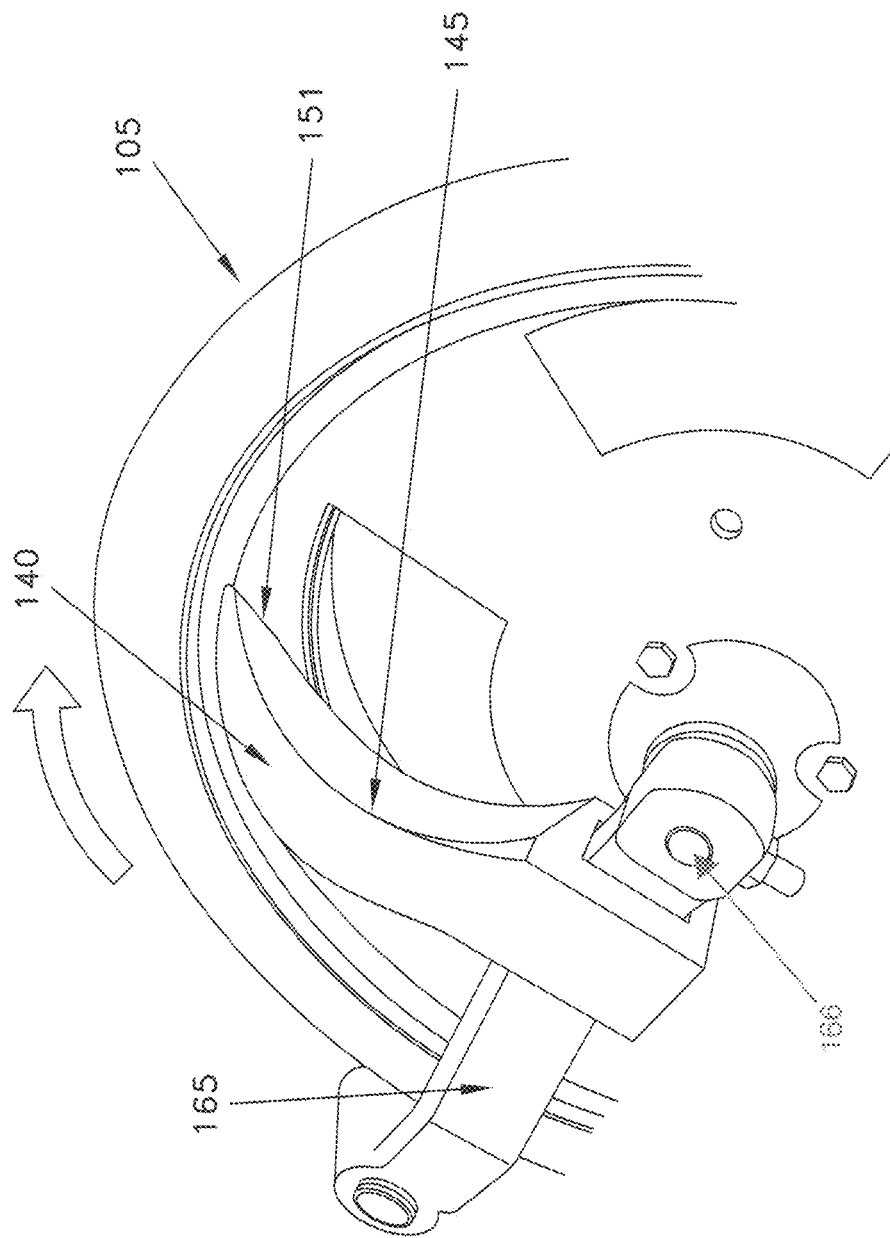
FIG. 20 is a perspective view showing further details of the construction shown in FIG. 19.

Thus, for example, and looking now at FIGS. 14-16, it will be seen that a scraper (e.g., scraper 140) may be mounted to the axle of the opening disc 10 via universal scraper arm 160. In FIG. 15, universal scraper arm 160 is shown screwed directly onto the threaded stud 161 of opening disc axle 162. In FIG. 16, universal scraper arm 160 is shown attached to axle 162 by means of an intermediate adapter 163, with intermediate adapter 163 being screwed onto threaded stud 161 of opening disc axle 162, and with universal scraper arm 160 mounting to intermediate adapter 163, e.g., via a set screws 164. Intermediate adapter 163 allows universal scraper arm 160 to be set at substantially any radial position, and intermediate adapter 163 allows a single universal arm 160 to be used with threaded studs 161 of various sizes.

Alternatively, and looking now at FIGS. 17-20, a scraper (e.g., scraper 140) may be mounted to the axle 166 of gauge wheel 105 via universal scraper arm 165.

Wheel Liner

Figure 21:
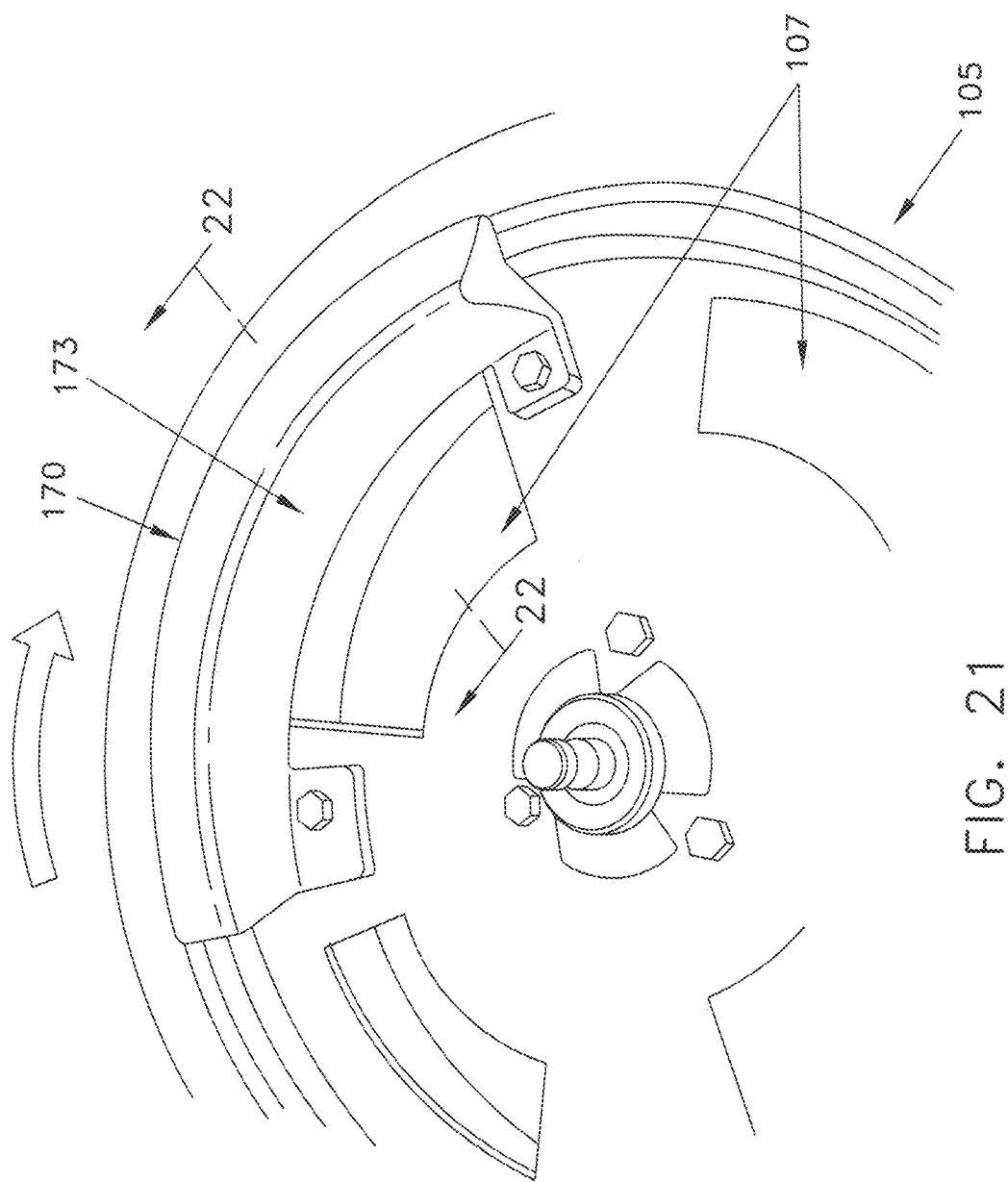
FIG. 21 is a perspective view showing a gauge wheel liner formed in accordance with the present invention.
Figure 22:
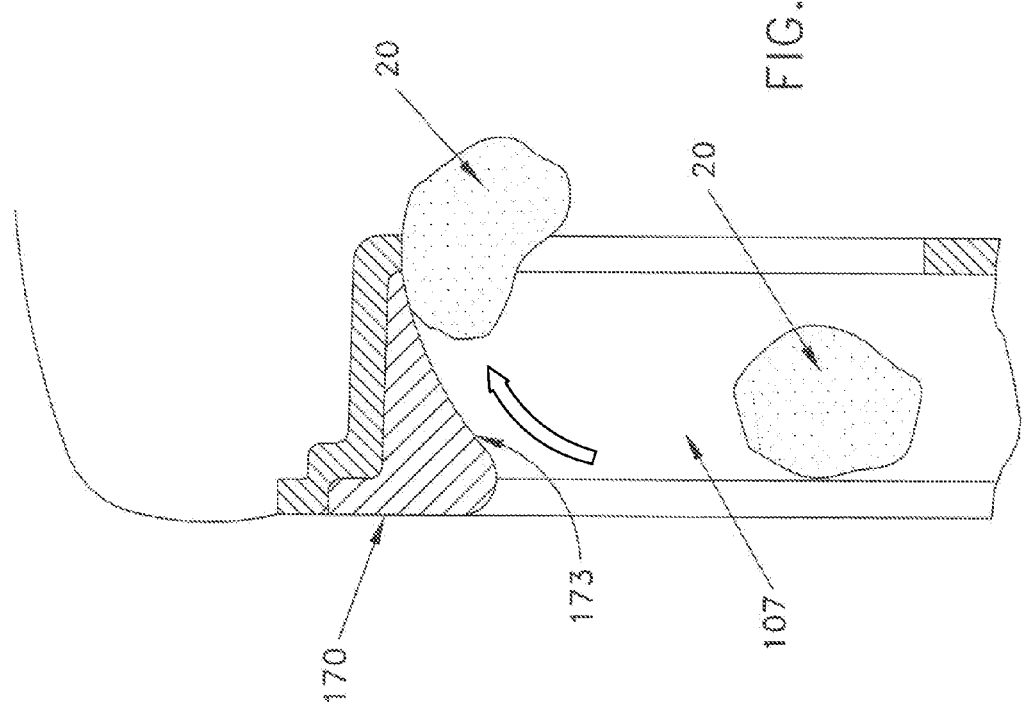
FIG. 22 is a side view in section taken along line 22-22 of FIG. 21.

In an alternate form of the present invention, and looking now at FIGS. 21 and 22, the gauge wheel 105 can be formed with a gauge wheel liner 170. The gauge wheel liner 170 is formed so as to generally follow the shape of the gauge wheel rim at its base, forming an inner rim. The gauge wheel liner 170 is formed so that its inner rim surface 173 gradually slopes downward and outward from the adjacent opening disc, towards the exit openings 107 formed in the gauge wheel rim. This sloping of the inner rim surface 173 of gauge wheel liner 170 serves to facilitate egress of soil from the space between the opening disc and the gauge wheel. In other words, the varying slope along the inner rim surface 173 of gauge wheel liner 170 is formed so as to create a higher bevel at the inner rim surface furthest from the openings in the gauge wheel, and a lower bevel at the inner rim surface adjacent to the openings in the gauge wheel, whereby to help channel loosened soil out openings 107. Furthermore, the body of gauge wheel liner 170 also acts as a block to prevent the build-up of soil adjacent to openings 107.

In one preferred form of the invention, gauge wheel liner 170 is formed so that its inner rim surface 173 is set at an angle of approximately 70 degrees or less to the plane of gauge wheel 105.

The gauge wheel liner 170 may be formed with tabs positioned so as to align with existing bolts on the gauge wheel, whereby to facilitate affixing the gauge wheel liner to the gauge wheel.

Alternatively, the gauge wheel liner may be provided with a face plate. The face plate is formed with a perimeter slope molding that matches the rim face, thus covering the inner rim face and aligning with all holes formed in the rim face. The face plate includes openings which would align with the soil egress openings of the gauge wheel.

Soil Deflector

Figure 23:
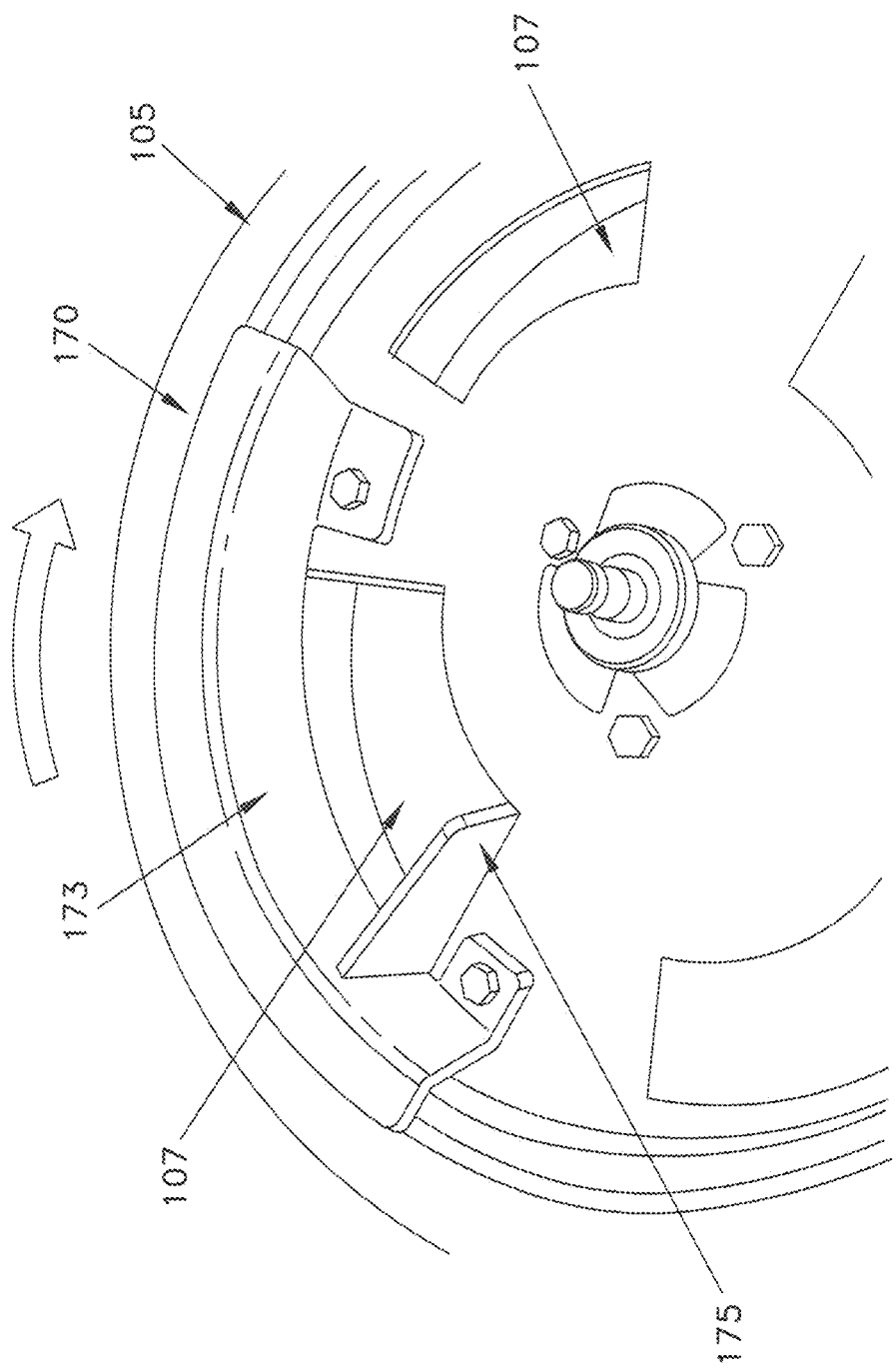
FIG. 23 is a perspective view showing a gauge wheel deflector formed in accordance with the present invention.

In another preferred form of the present invention, and looking now at FIG. 23, when the gauge wheel liner or face plate is used, a soil deflector 175 may also be provided. The soil deflector 175 is positioned along the inner rim of the gauge wheel, along the vertical trailing edge of the opening in the gauge wheel. The soil deflector 175 serves as an additional means to facilitate egress of soil from the space between the opening disc and the gauge wheel. Additionally, the soil deflector 175 serves to prevent wet soil from sticking to the flat edges of the openings in the gauge wheel. The soil deflector 175 is positioned at an angle of deflection toward the gauge wheel opening 107, and may be formed out of a non-stick material. The soil deflector 175 is preferably attached to the gauge wheel using an adjacent existing bolt on the gauge wheel.

Soil Exit Chute

Figure 24:
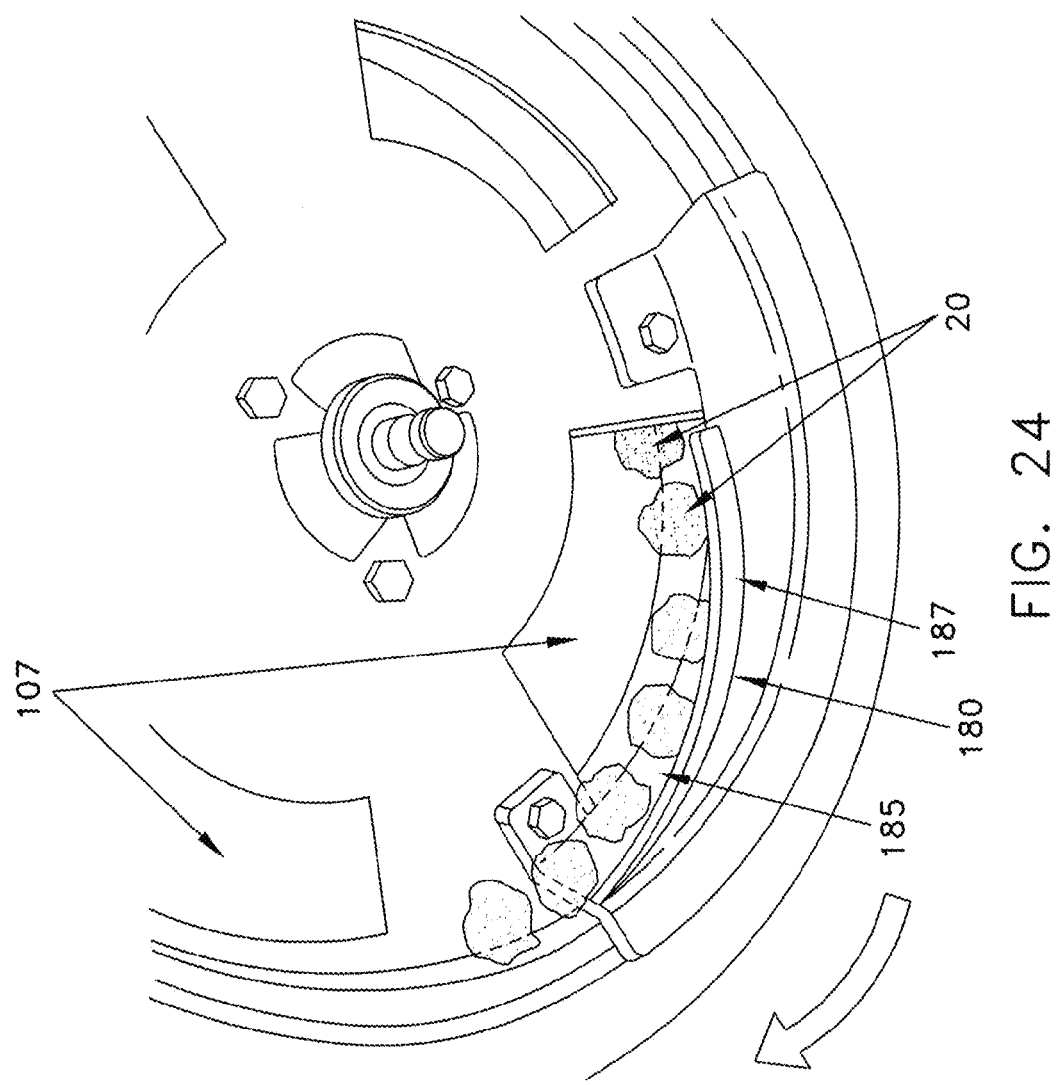
FIG. 24 is a perspective view showing another form of gauge wheel liner formed in accordance with the present invention.

In yet another preferred construction, and looking now at FIG. 24, there is shown a soil exit chute 180 which is positioned adjacent to gauge wheel openings 107, whereby to facilitate egress of soil from the gap located between opening disc 10 and gauge wheel 105. More particularly, FIG. 24 shows how wet soil removed from the opening disc 10 and/or gauge wheel 105 by a scraper (e.g., scraper 40 or scraper 140) tends to roll along the perimeter of the gauge wheel rim and, as additional soil is scraped from the opening disk and/or gauge wheel, the newly scraped soil also falls to the perimeter of the gauge wheel rim, sticking to the previously scraped soil. In other words, these soil scrapings have a tendency to stick to each other as well as to the rim of the gauge wheel (and opening disc), effectively forming soil "balls". Accordingly, the soil exit chute 180 takes advantage of this particle attraction, by providing a soil egress for guiding the soil balls out openings 107 in the gauge wheels. In one preferred form of the invention, soil exit chute 180 comprises a floor 185 and a side wall 187, where floor 185 and side wall 187 are configured to direct the soil balls outboard as they emerge from openings 107 in the gauge wheels.

The soil exit chute 180 may be manufactured out of a non-stick plastic, or a coated metal, or a combination of the two.

Preferred Construction for Universal Scraper

The present invention also provides a novel universal scraper which may be used with ground opening equipment, including ground opening equipment using furrow opener discs used on seed planters, fertilizer attachment ground opening discs, and so-called "no till" ground opening discs.

As noted above, scrapers have long been used to remove soil that adheres to the surface of an opening disc. This is especially important in wet or sticky soil conditions. Prior art scrapers have generally been attached to the frame that the opening disc is mounted to, e.g., the frame of a row planter assembly. Some prior art scrapers are provided with a circular scraper contact surface (see, for example, scraper 40 of FIGS. 4, 6 and 7, which comprise a wheel-shaped scraper blade 43), while other prior art scrapers are provided with a flat edge scraper contact surface.

Scrapers used in the prior art for row planter assemblies comprising double disc furrow openers have been mounted to the frame of the row planter assembly and disposed so as to scrape in an area at the trailing edge of the opening discs. See, for example, the scraper 40 shown in FIGS. 4, 6 and 7, where scraper 40 comprises an attachment arm 42 for mounting scraper blade 43 to frame 15. This scraper contact area scrapes soil and refuse from the opening disc, propelling the soil and refuse generally upward, where it then falls downward due to gravity, toward the trailing portion of the rotating gauge wheel. Scraped material falling to the trailing portions of the gauge wheels tends to tumble around the rim perimeter of the gauge wheels, often resulting in a rapidly enlarging mass of material. However, there is only a narrow rear opening between the gauge wheels and the opening discs on double disc opener-type planters. The mass of revolving soil and refuse often becomes too large to exit the gap between the opening discs and the gauge wheels, causing the opening discs and the gauge wheels to clog up. At this point the gauge wheels typically start to skid and tear the furrow. Seed is then left atop the ground, or in a poorly formed furrow, with poor seed-to-soil contact.

Figure 25:
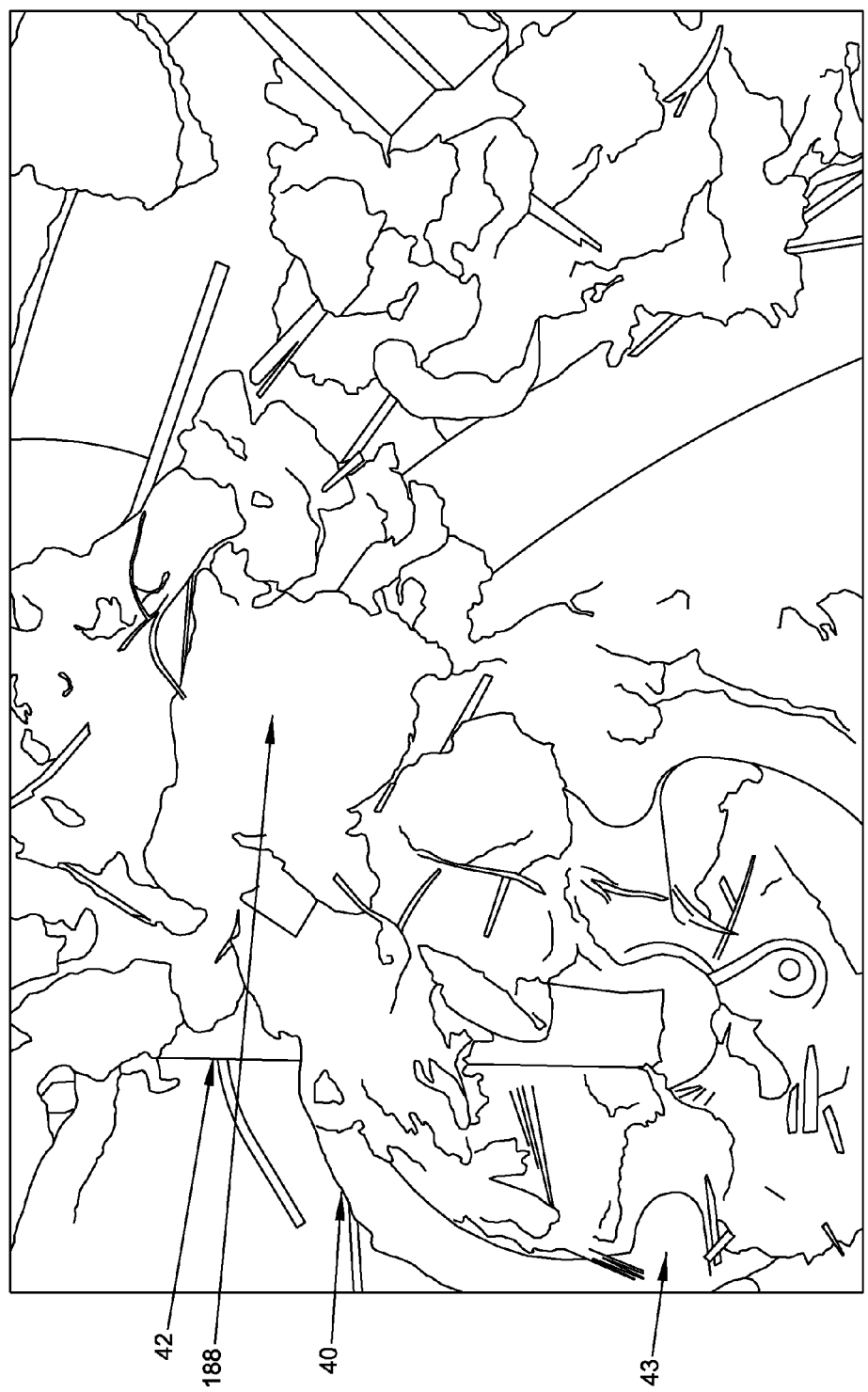
FIGS. 25 and 26 are schematic views showing how dirt may build up between a frame-mounted scraper and force the scraper away from the opening disc.
Figure 26:
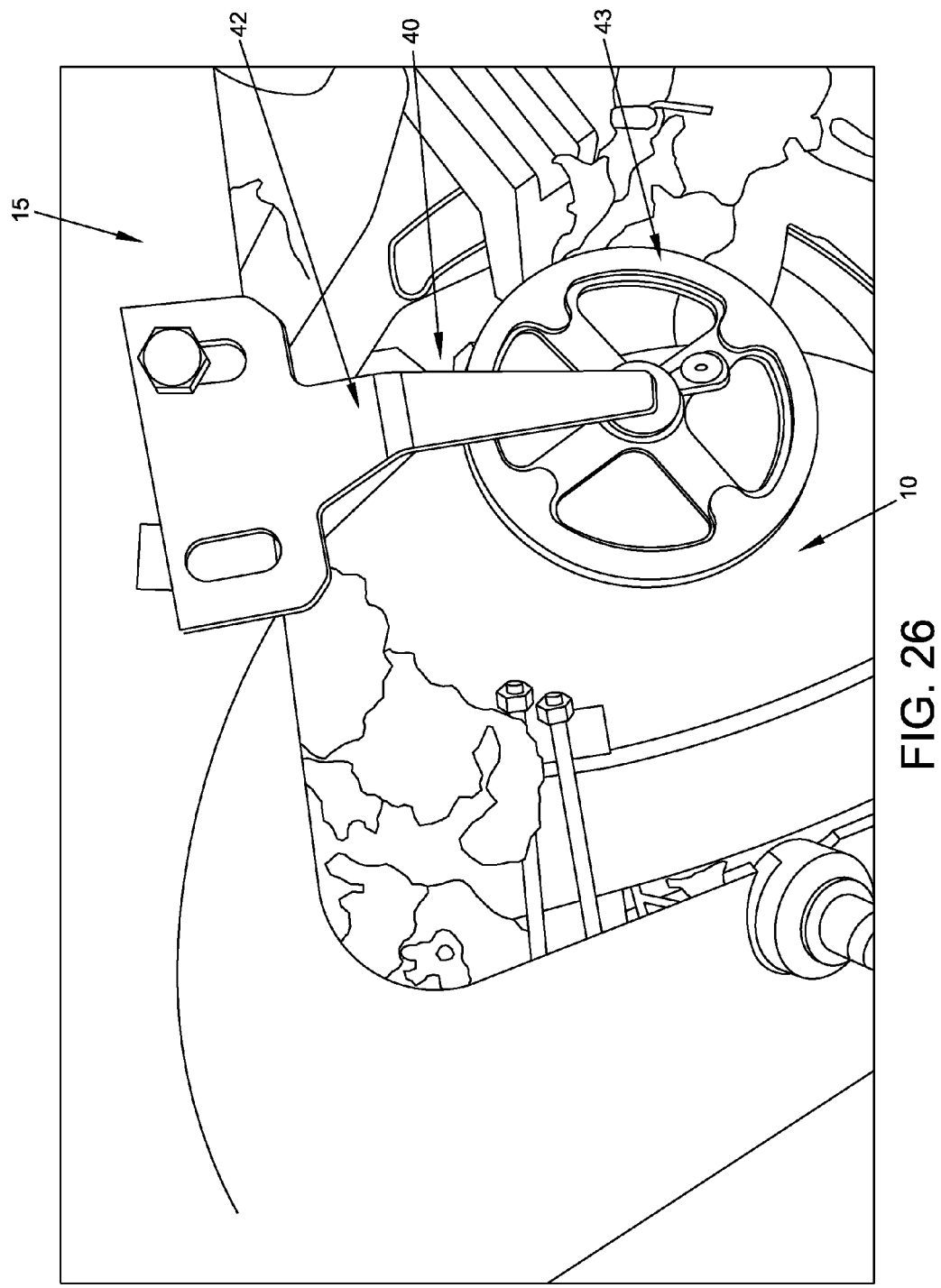
Figure 27:
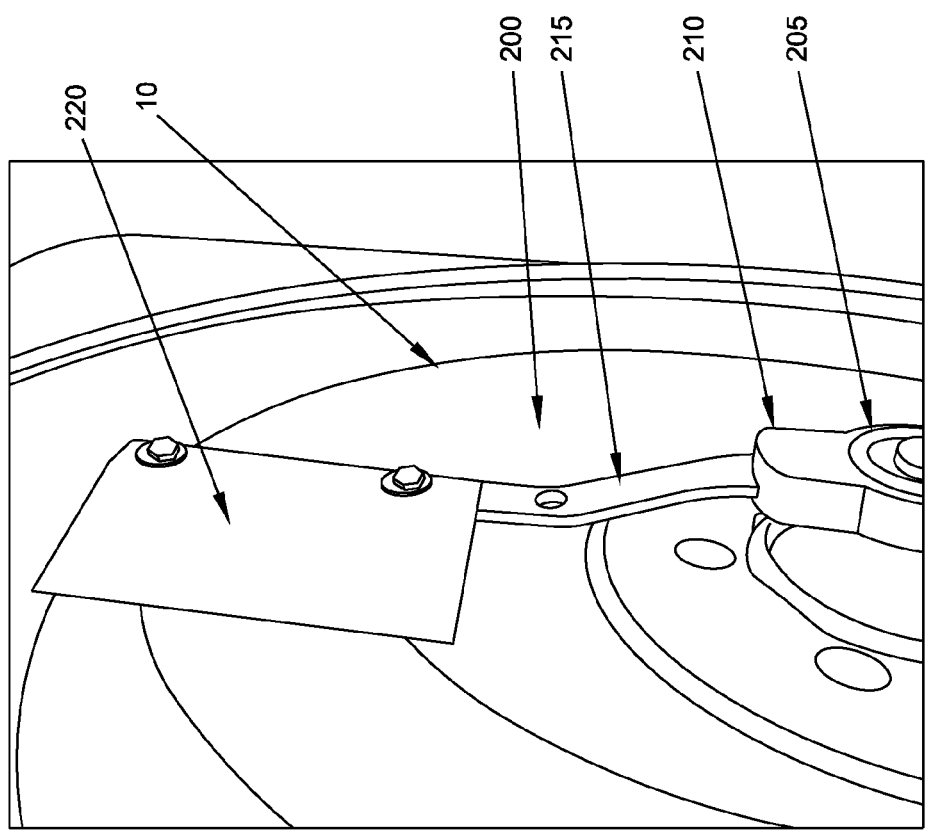
FIGS. 27 and 28 are schematic views showing a novel universal scraper formed in accordance with the present invention.

Another problem with frame-mounted scrapers (e.g., scrapers such as scraper 40 shown in FIGS. 4, 6 and 7) is that the attachment arm (e.g., the attachment arm 42 of scraper 40) can be a barrier or obstruction which holds back soil and refuse on the trailing edge of the attachment arm. See, for example, FIG. 25, where the attachment arm 42 supporting scraper blade 43 acts as a barrier to soil and refuse, causing an aggregation 188 of soil and debris on the attachment arm. This soil and debris can be forced under the attachment arm, thereby pushing the scraper blade away from the disc surface (FIG. 26). When this occurs, the scraper blade and entrapped soil and refuse can begin to have a braking effect on the opening disc, which will prevent the desired seed trench from being formed. Also, some soil and material stopped by the trailing edge of frame-mounted attachment arms will fall into the area between the opening discs, where disc rotation causes the soil and refuse to move to the outer circumference of the opening discs. Once this soil and refuse migrates to the outer disc perimeter, it often forms a wedge between the two opposing opening disc blades (where they are set to substantially contact each other, as seen in FIG. 7). When the two opposing opening disc blades become wedged, the opening discs will no longer rotate and the wedged opening discs can no longer create a proper furrow for the seed.

In accordance with the present invention, there is provided a novel universal scraper which addresses the deficiencies of prior art scrapers.

More particularly, and looking now at FIGS. 27-50, there is provided a novel universal scraper 200. Universal scraper 200 comprises four major components, an axle hub adapter 205 (FIGS. 27-42, 45 and 47), a hub adapter clamp 210 (FIGS. 27, 28 and 43-47), a scraper arm 215 (FIGS. 27, 28 and 48) and a scraper blade 220 (FIGS. 27, 28, 49 and 50). In essence, and as will hereinafter be discussed, axle hub adapter 205 is intended to be secured to the axle of an opening disc (or, alternatively, the axle of a gauge wheel), hub adapter clamp 210 is intended to be secured to axle hub adapter 205, scraper arm 215 is intended to be secured to hub adapter clamp 210, and scraper blade 220 is intended to be secured to scraper arm 215.

Axle hub adapter 205 has a base diameter 225 (FIG. 29) sized to tighten against the bearing race 230 of a bearing 232 so as to hold the bearing 232 in proper position against opening disc 10. No additional parts are necessary inasmuch as axle hub adapter 205 accepts a nut 235 of either SAE or metric size.

Figure 28:
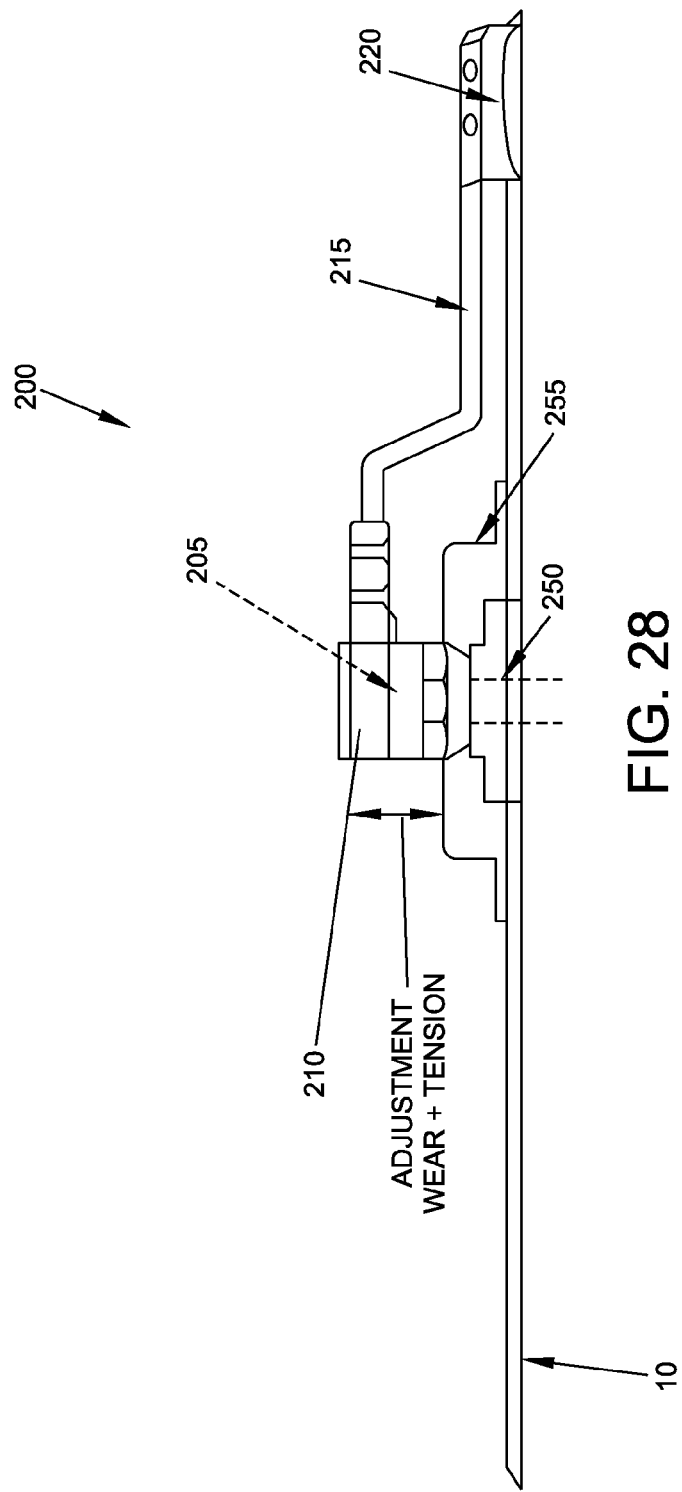
Figure 29:
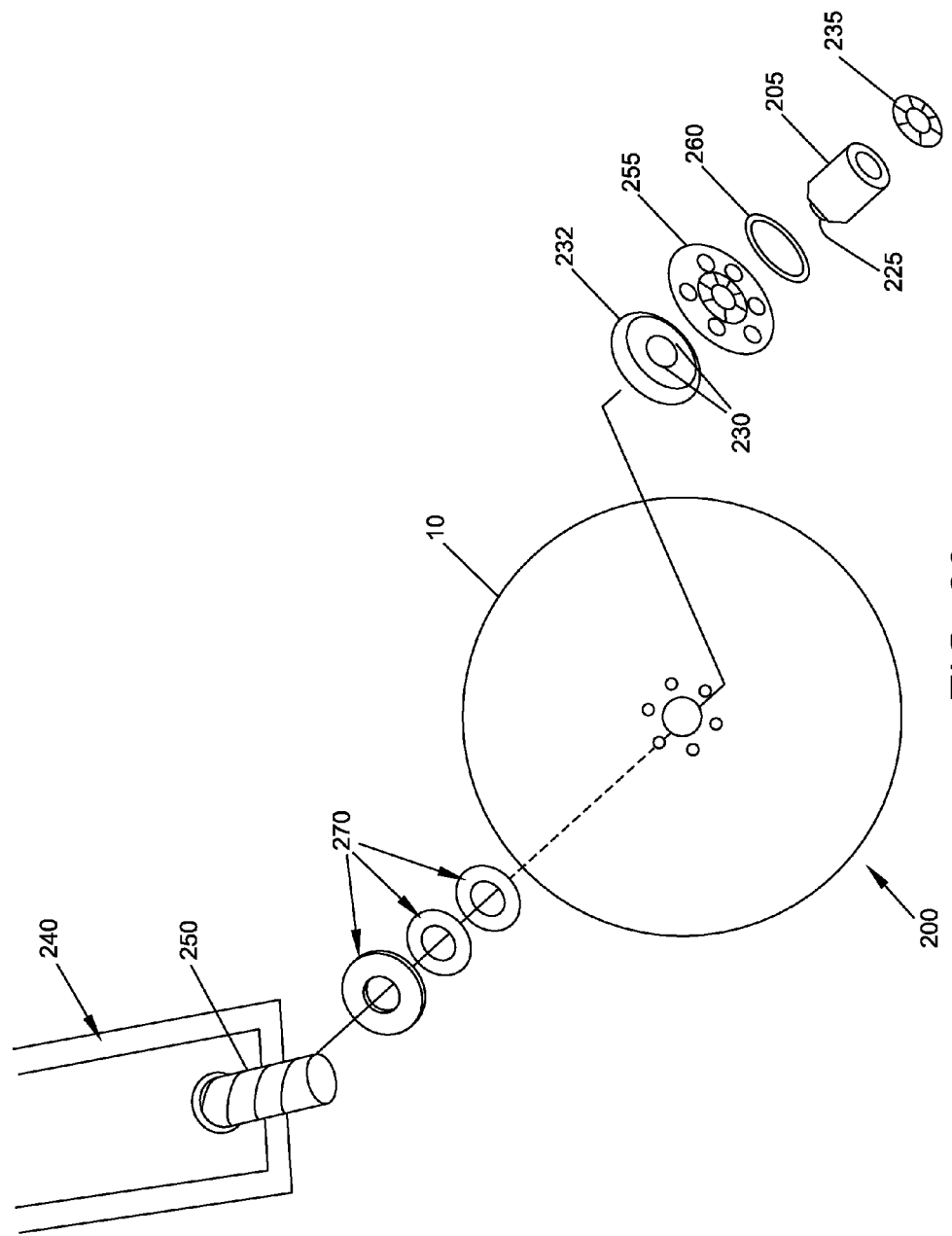
FIGS. 29-50 are schematic views showing various components of the novel universal scraper shown in FIGS. 27 and 28.
Figure 30:
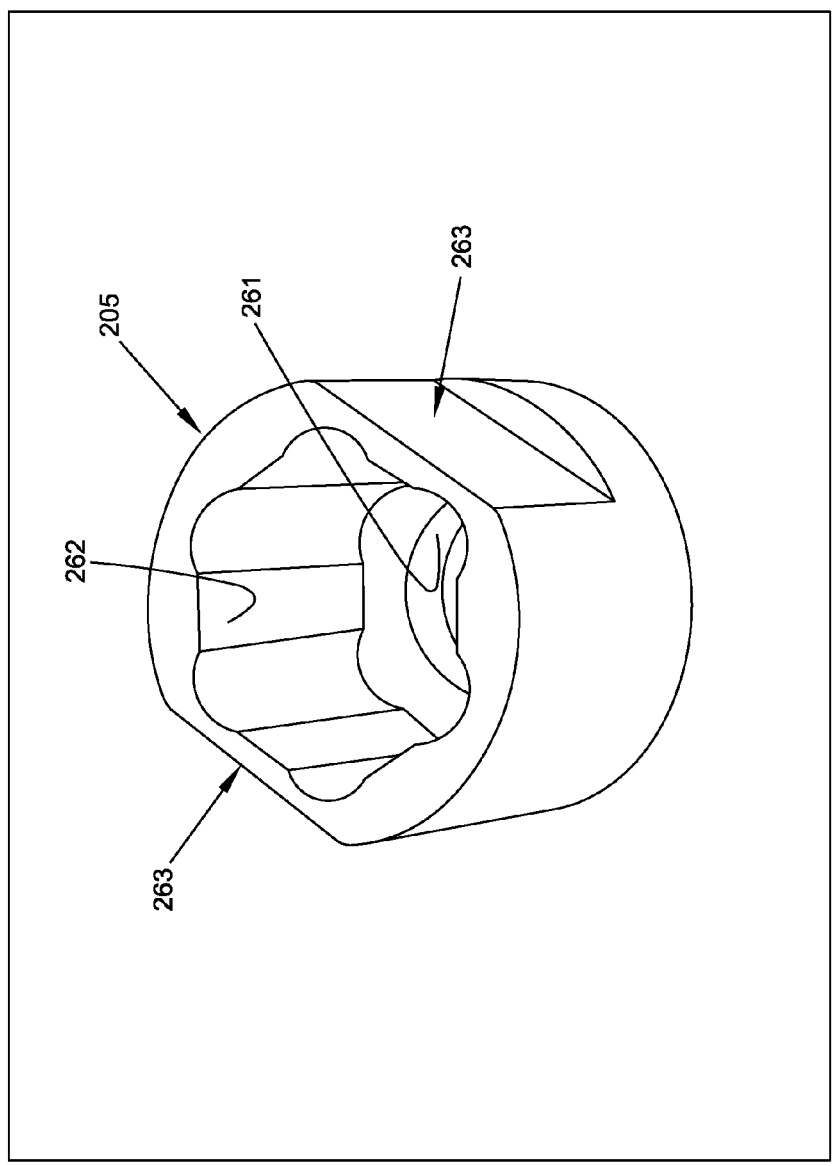
Figure 31:
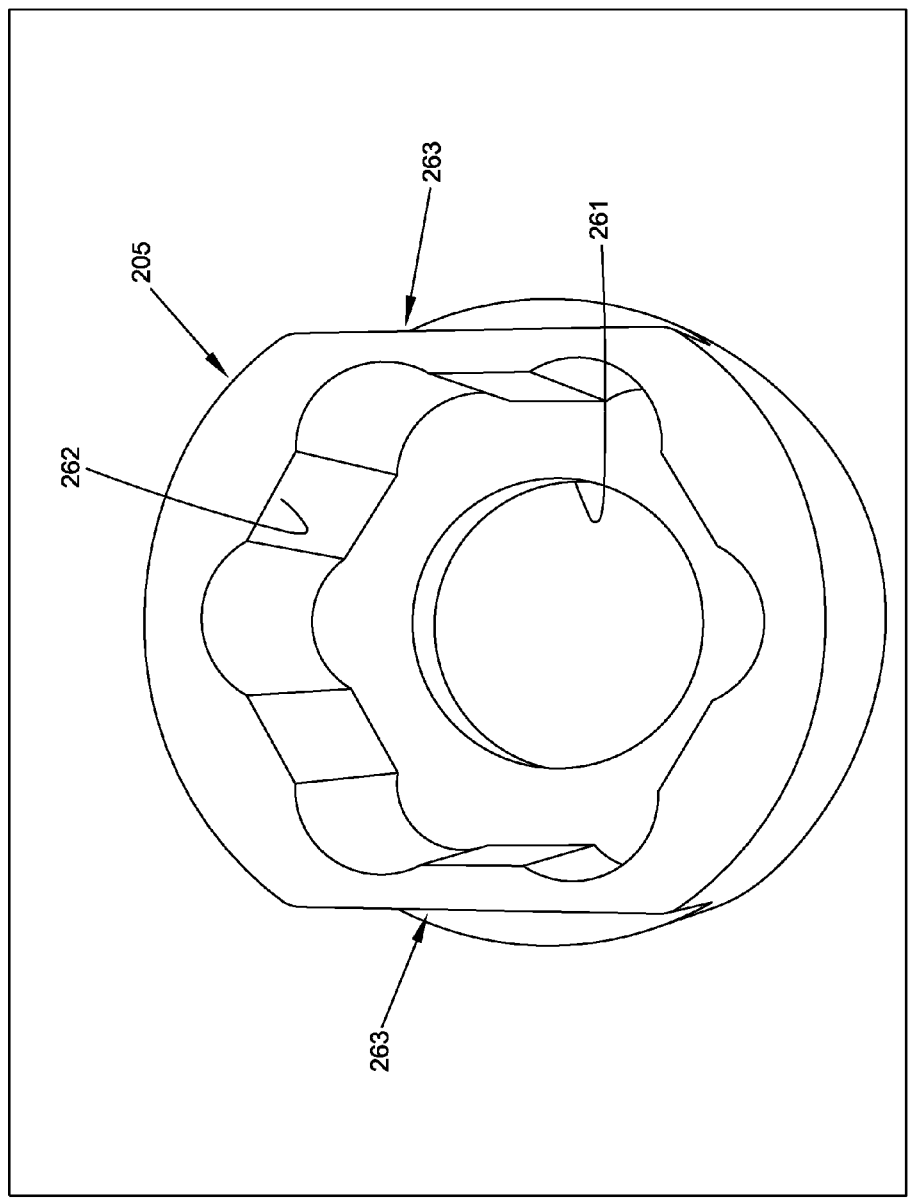
Figure 32:
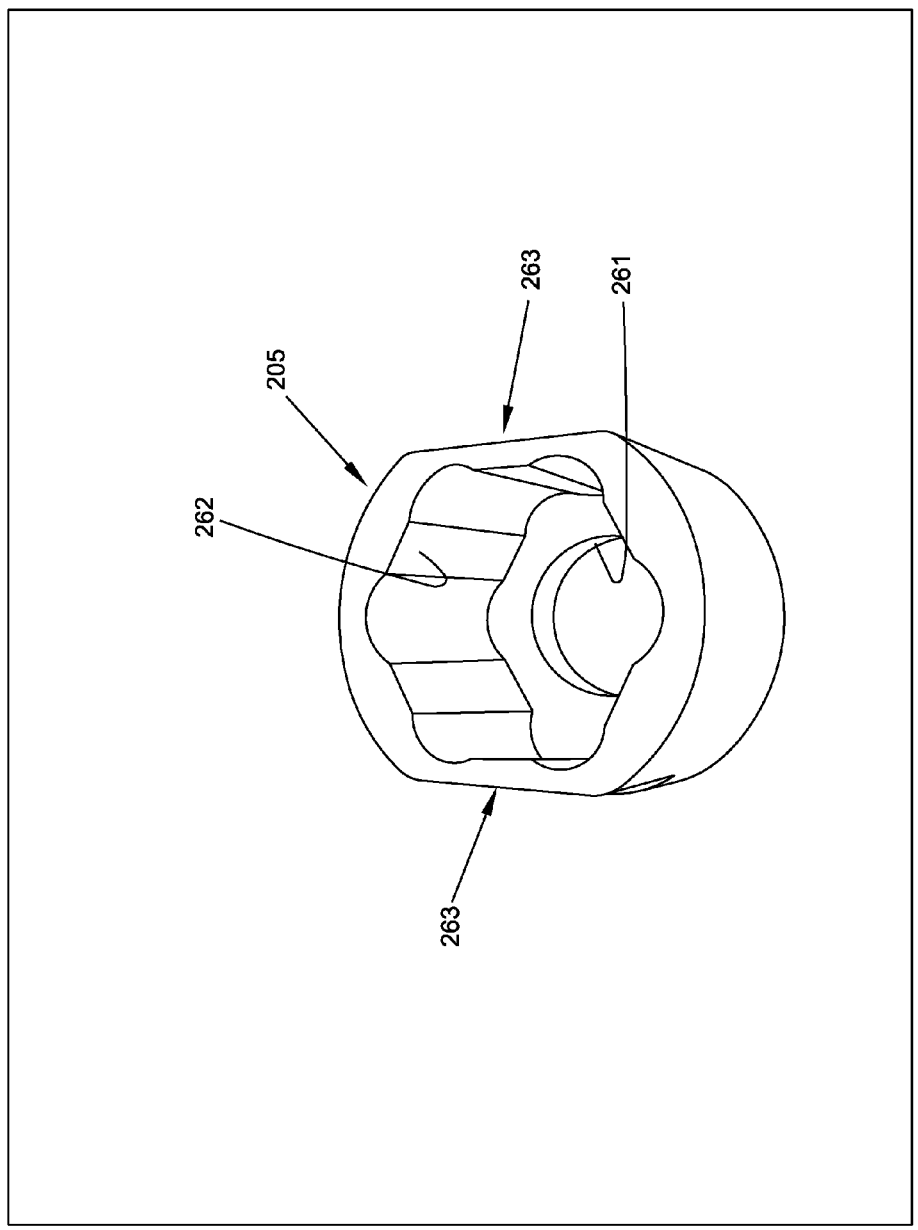
Figure 33:
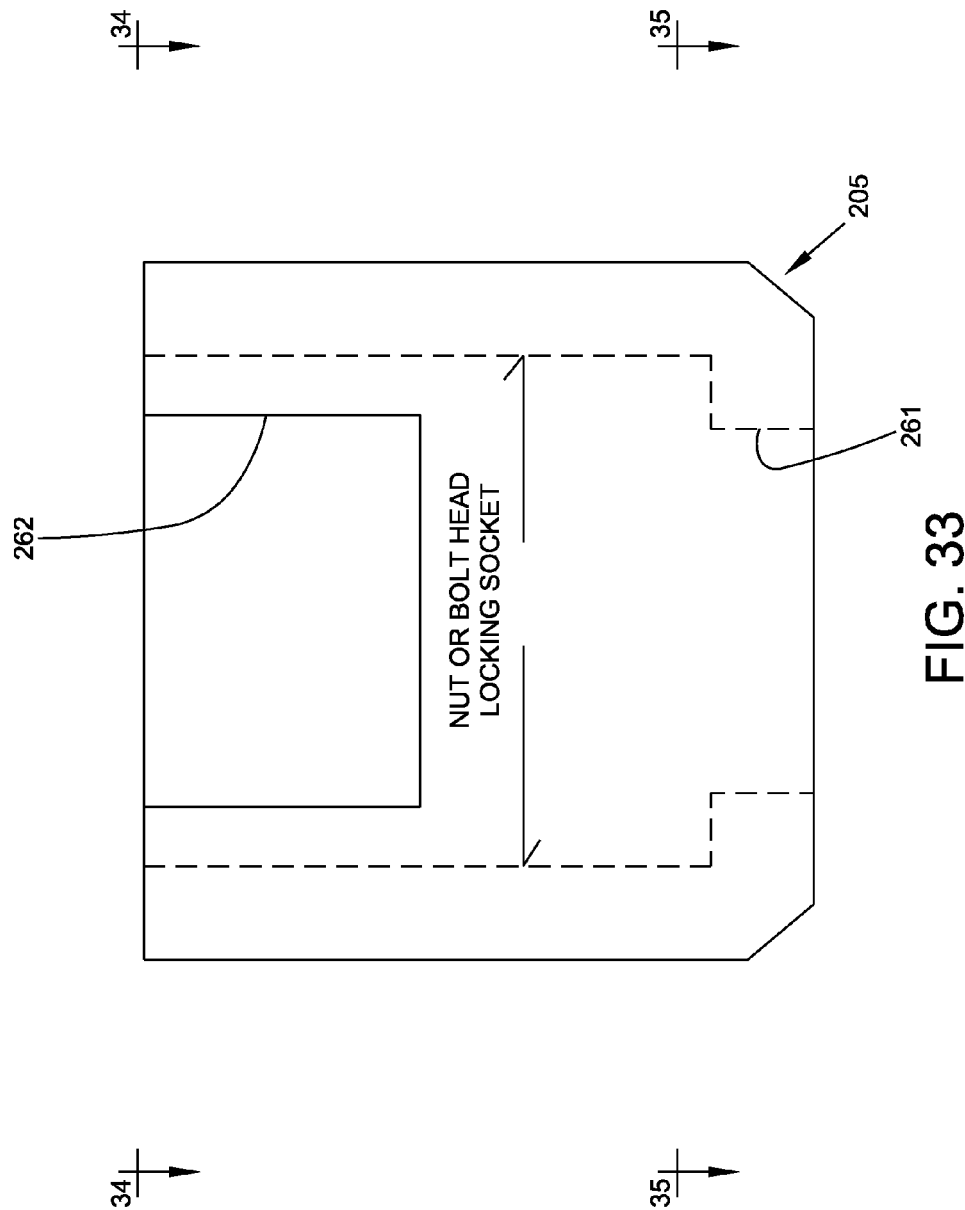
Figure 34:
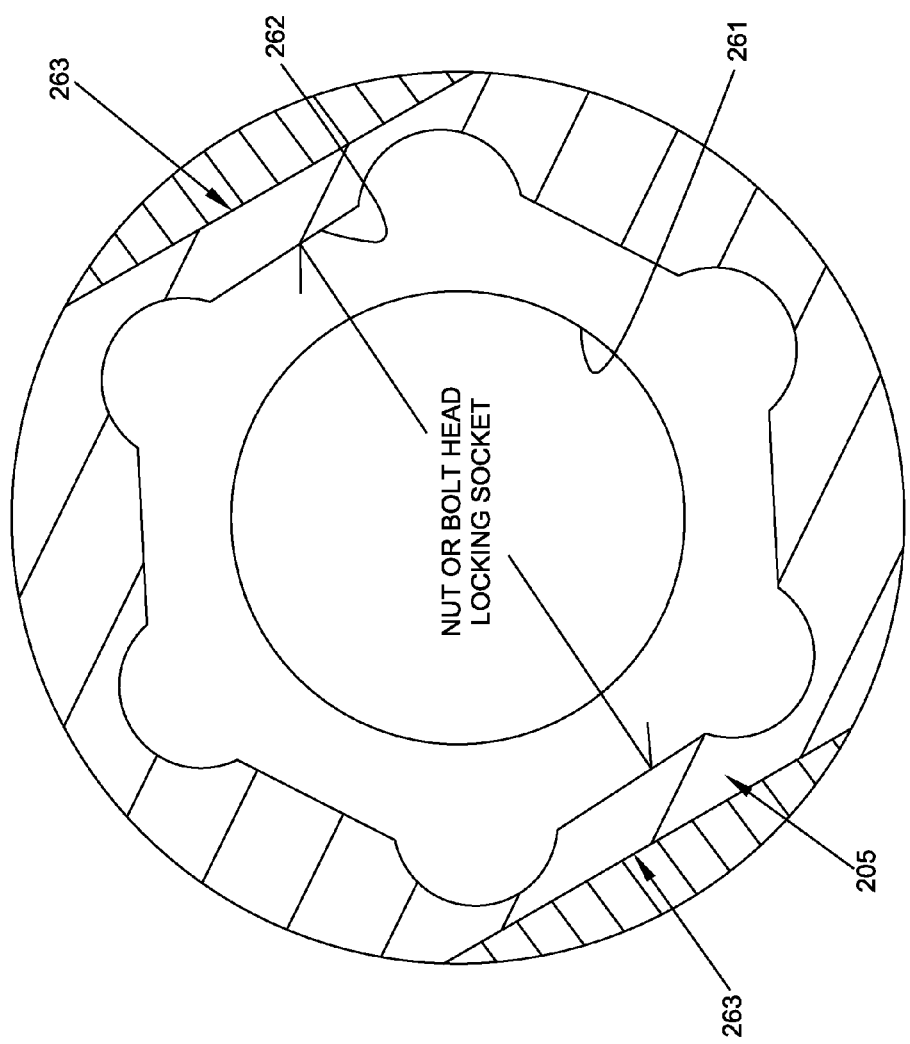
Figure 35:
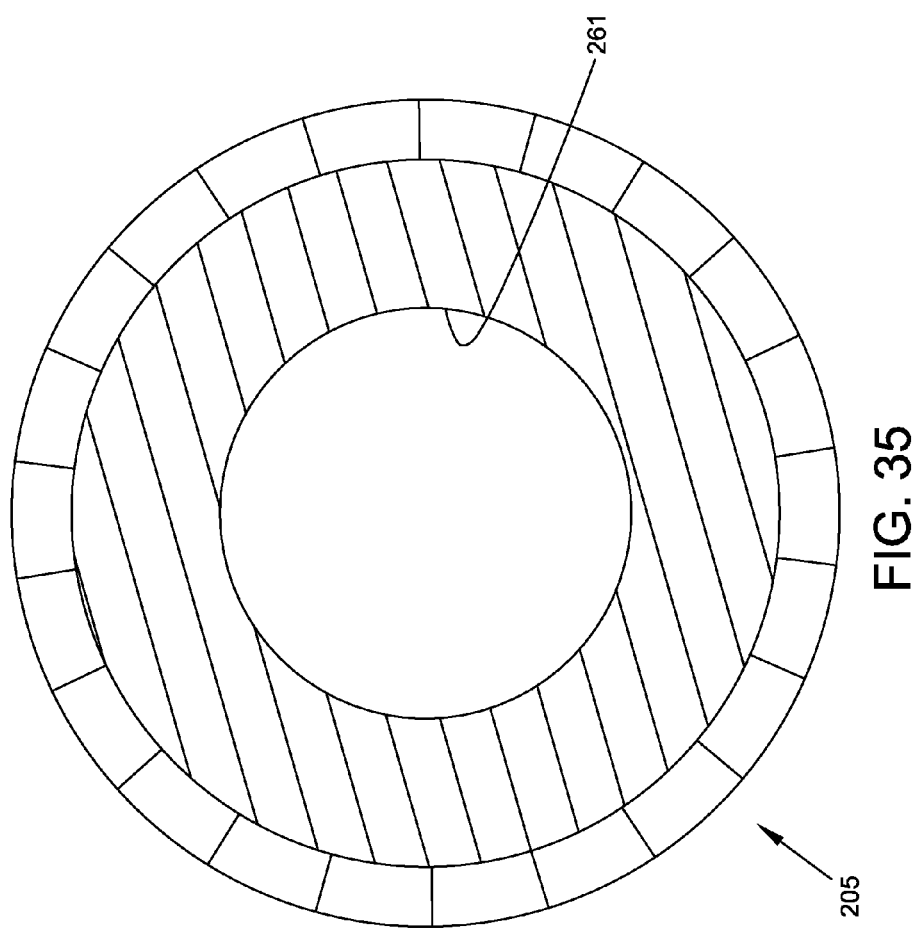
Figure 36:
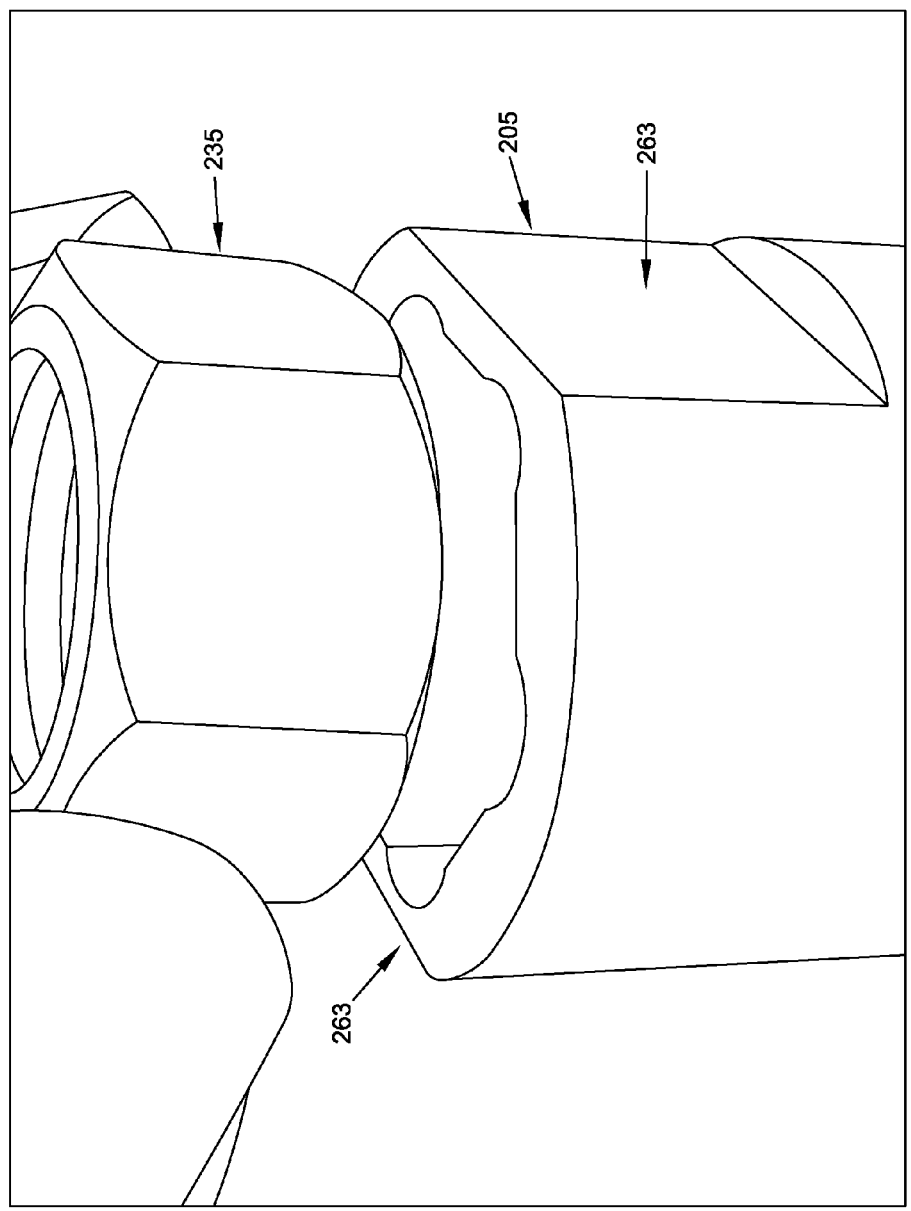
Figure 37:
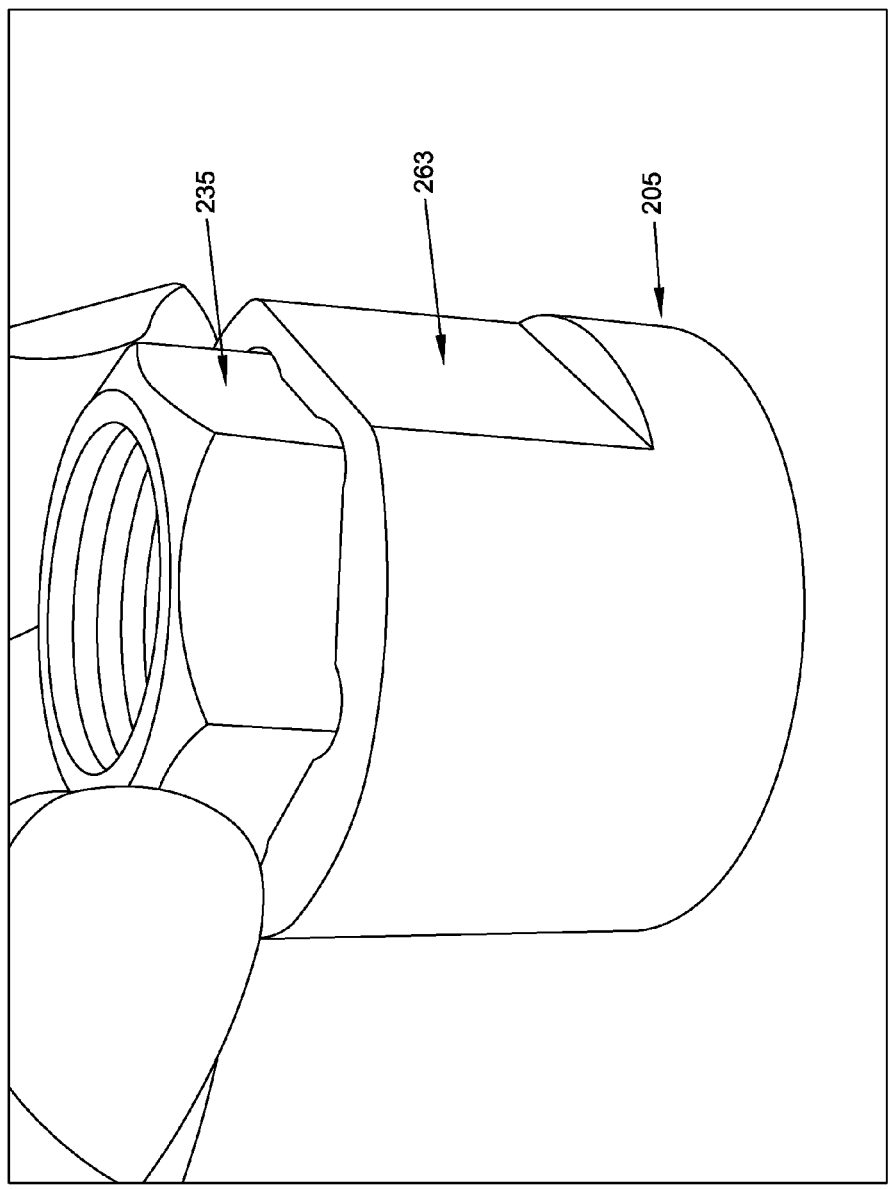
Figure 38:
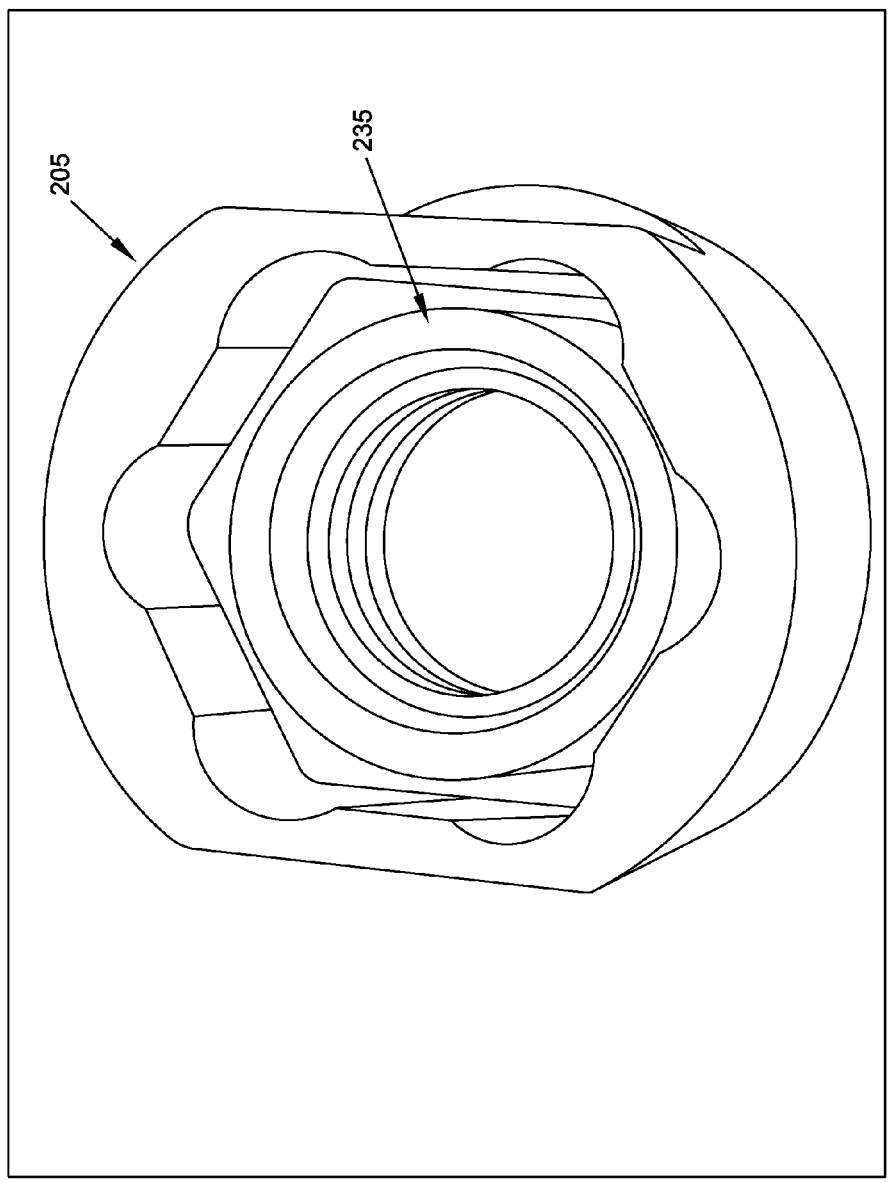

Axle hub adapter 205 may be of a length to allow for adjustment of hub adapter clamp 210 along axle hub adapter 205 so as to move scraper blade 220 inward or outward in relation to the opening disc surface (FIG. 28). Where the opening disc support arm 240 (FIG. 29) comprises an axle having a threaded stud 250, the threaded stud extends through the opening disc 10, through bearing 232, through hub 255 and through dust seal 260. Then, with nut 235 inserted into the top of axle hub adapter 205, the axle hub adapter 205/nut 235 are threaded onto the threaded stud 250, whereby to secure the assembly to the opening disc support arm 240. To this end, axle hub adapter 205 comprises an axle bore 261 for receiving threaded stud 250 and a multi-surfaced opening 262 for receiving nut 235. Flats 263 are provided on the exterior of axle hub adapter 205 for turning the axle hub adapter 205 and hence nut 235.

Alternatively, and looking now at FIGS. 39-42, where opening disc support arm 240 comprises a threaded hole 265, nut 235 is replaced by an axle bolt 235A comprising a threaded stud 235B and a head 235C. Axle bolt 235A is inserted from the distal end of the axle hub adapter 205 and down through the bore at the bottom of the axle hub adapter, through dust seal 260, through hub 255, through bearing 232, through opening disc 10 and into threaded hole 265 in opening disc support arm 240.

Preferably, shims 270 are disposed between opening disc 10 and opening disc support arm 240, so that axle hub adapter 205 tightens the inner race of bearing 232 to the frame/shims.

Opening discs 10 turning counterclockwise will tighten by turning axle hub adapter 205 counterclockwise, while opening discs 10 turning clockwise will tighten by turning the axle hub adapter 205 clockwise, thus the rotation of the opening disc will always have a self-tightening effect on the axle hub adapter 205, opening disc 10 and bearing 232.

The hub adapter clamp 210 (FIGS. 27, 28 and 43-47) is machined so as to achieve a close fit about the circumference of axle hub adapter 205, whereby to mount hub adapter clamp 210 to axle hub adapter 205 and hence to the axle of the opening disc (or, alternatively, the axle of a guide wheel). Significantly, hub adapter clamp 210 can be positioned at substantially any radial position on axle hub adapter 205, so that the universal scraper 200 can be disposed at substantially any radial position relative to opening disc 10.

Figure 43:
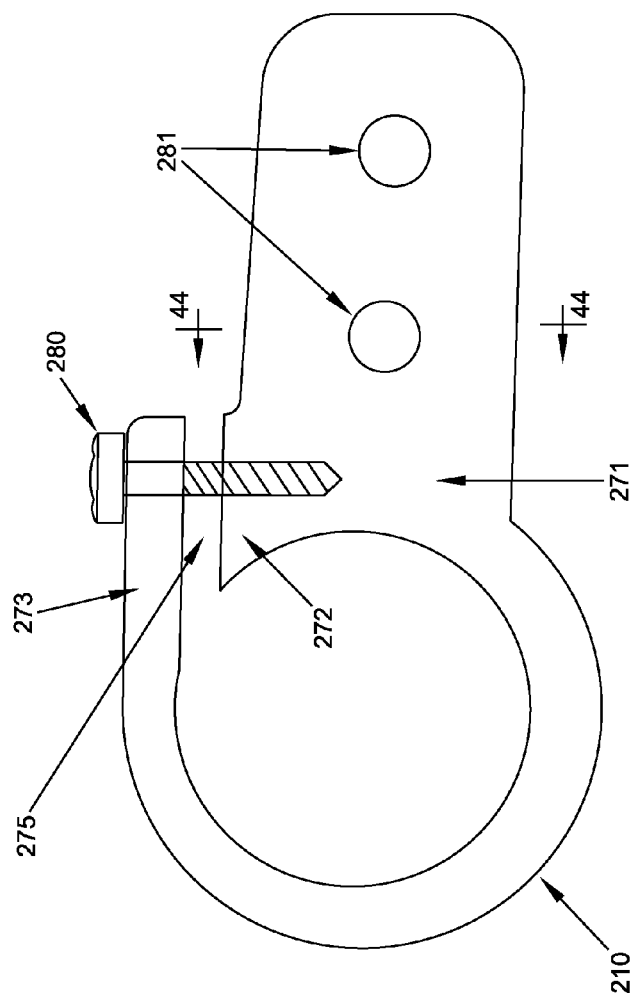
Figure 44:
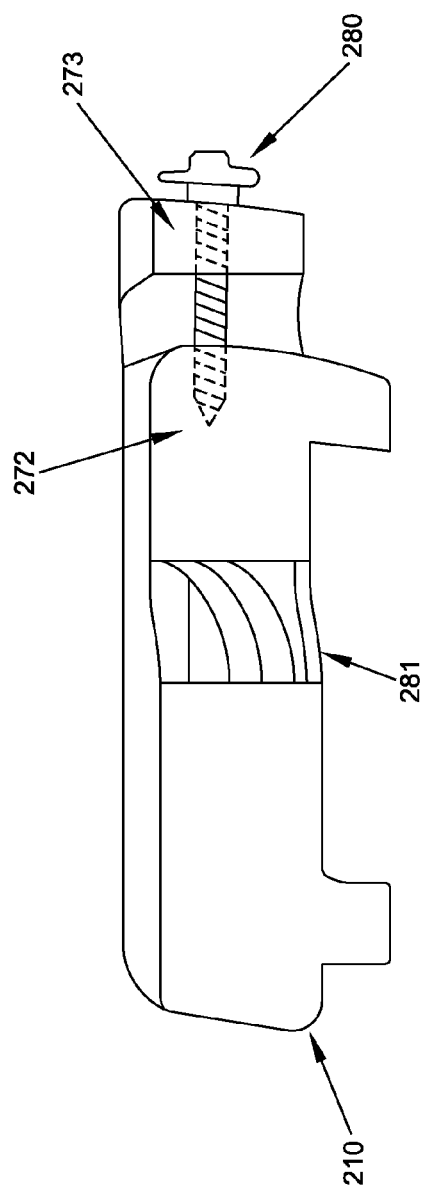
Figure 45:
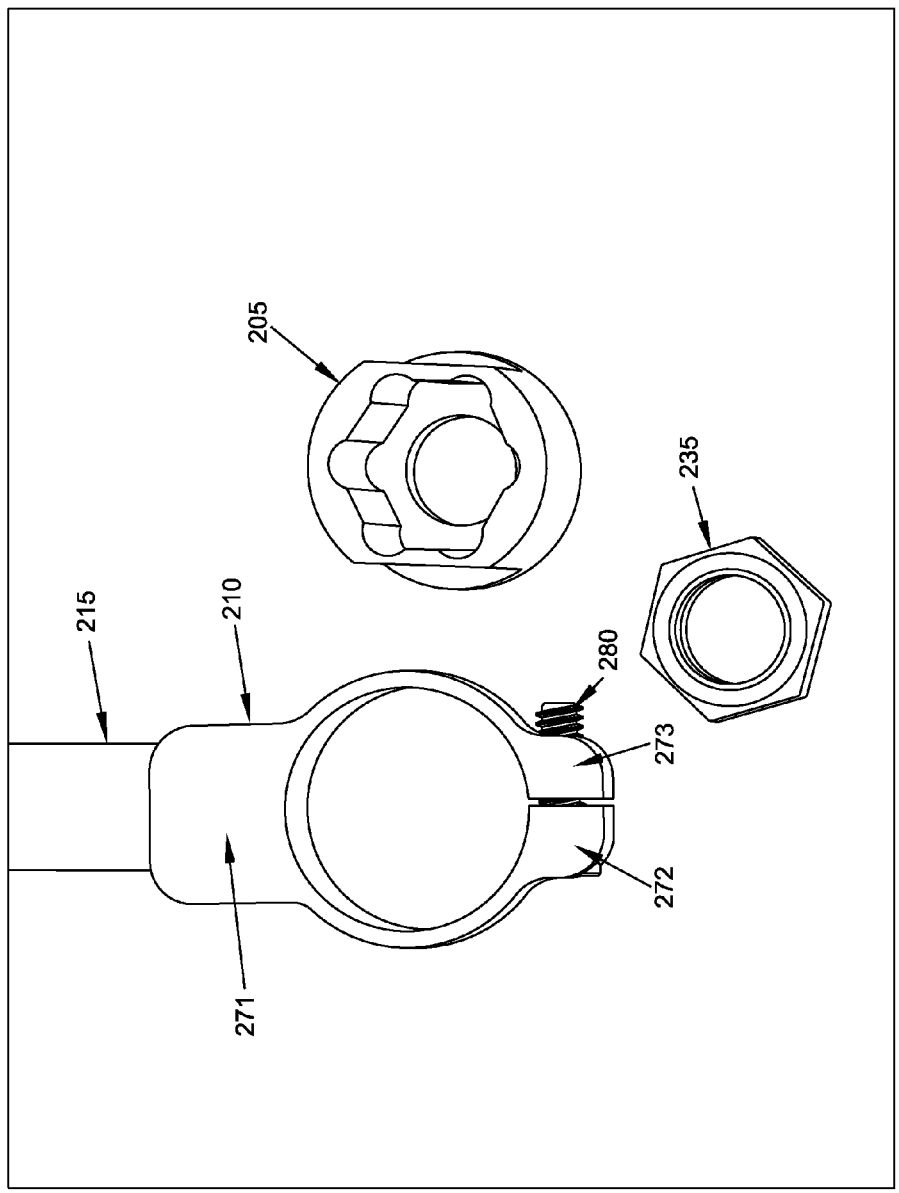
Figure 46:
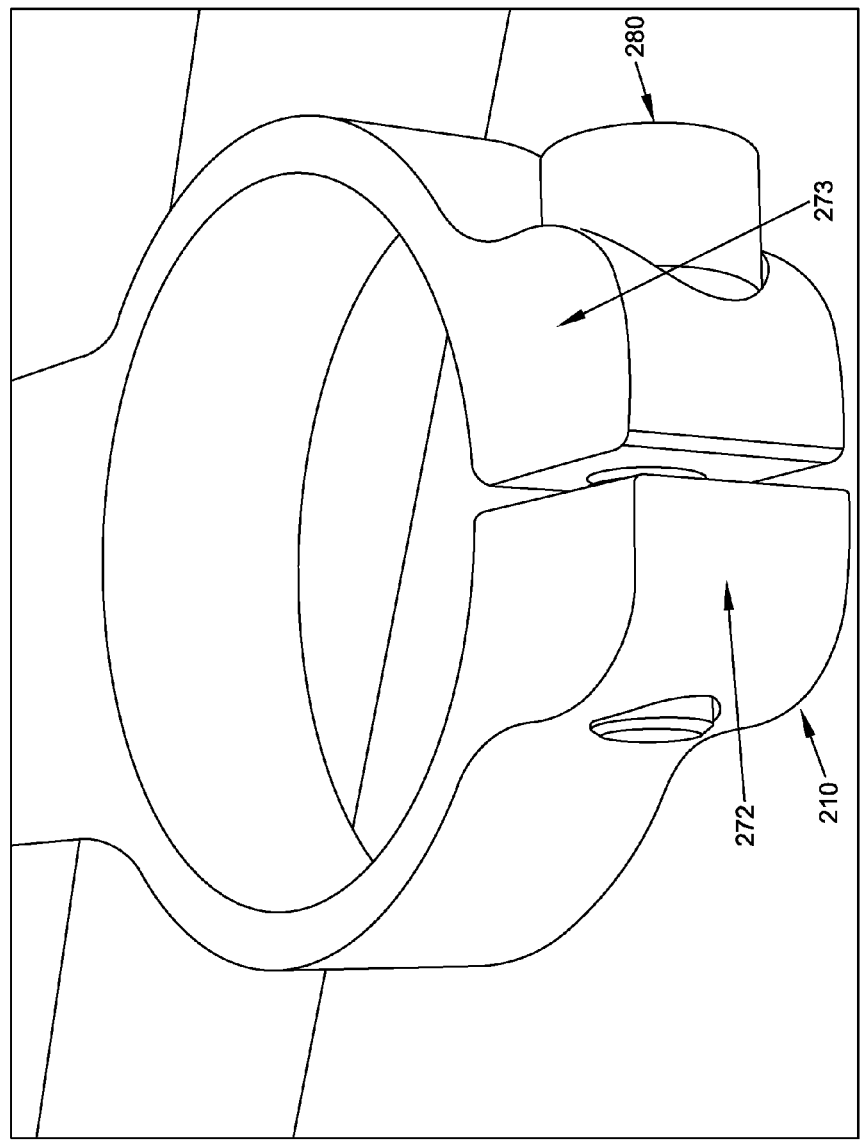
Figure 47:
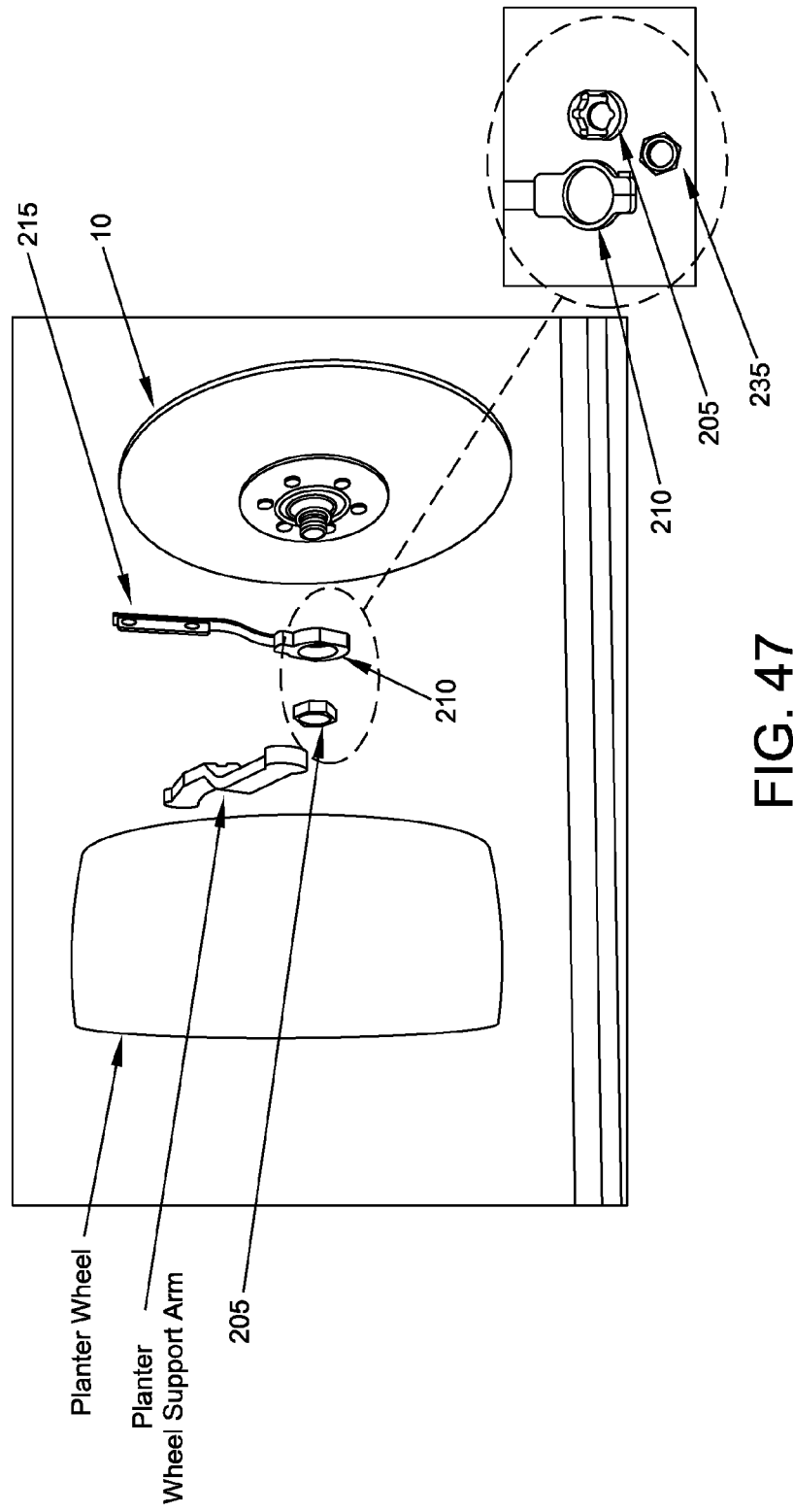
Figure 48:
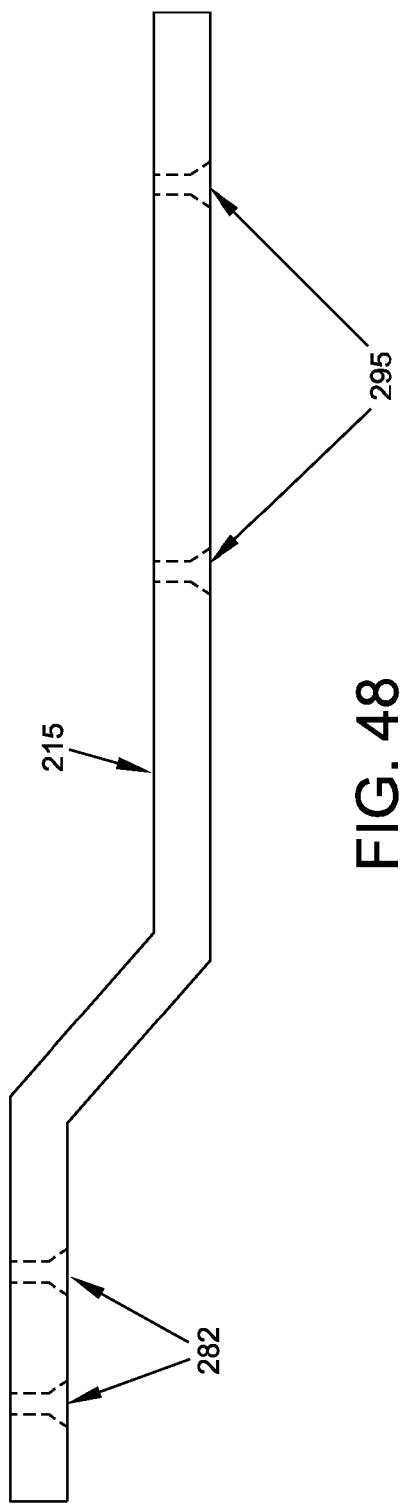
Figure 49:
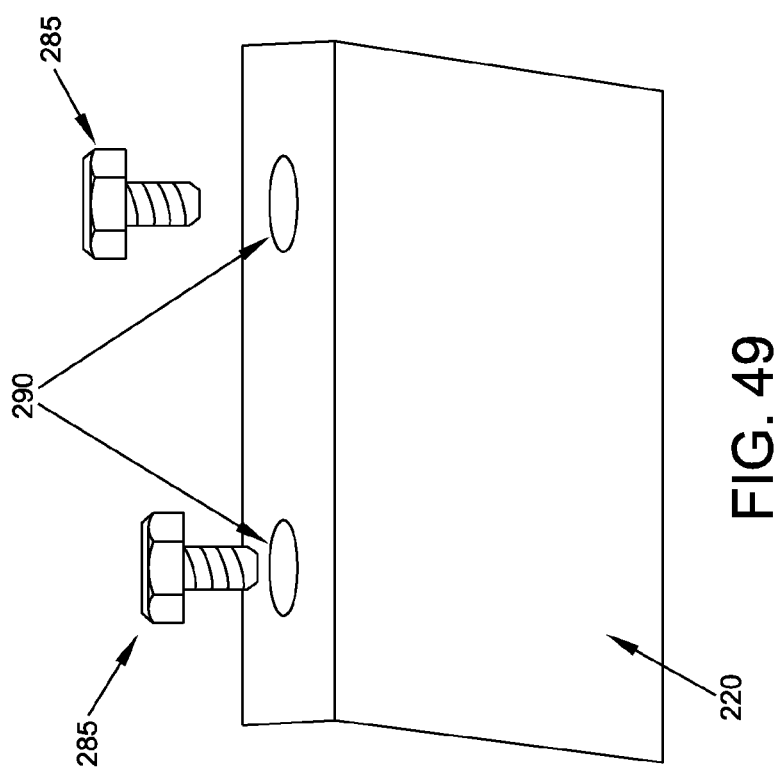
Figure 50:
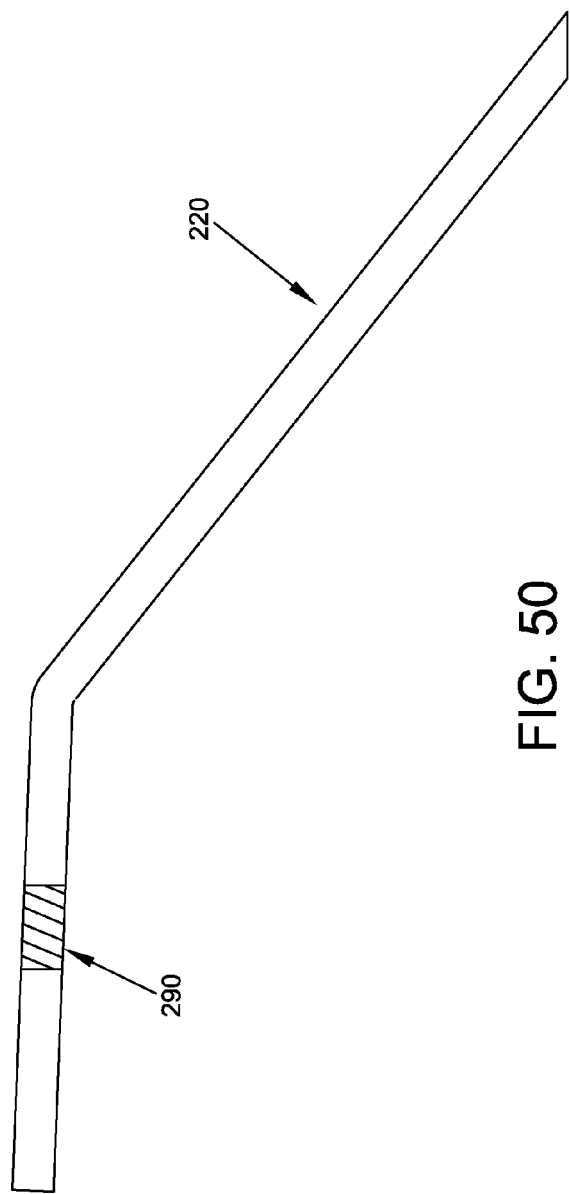
Figure 51:
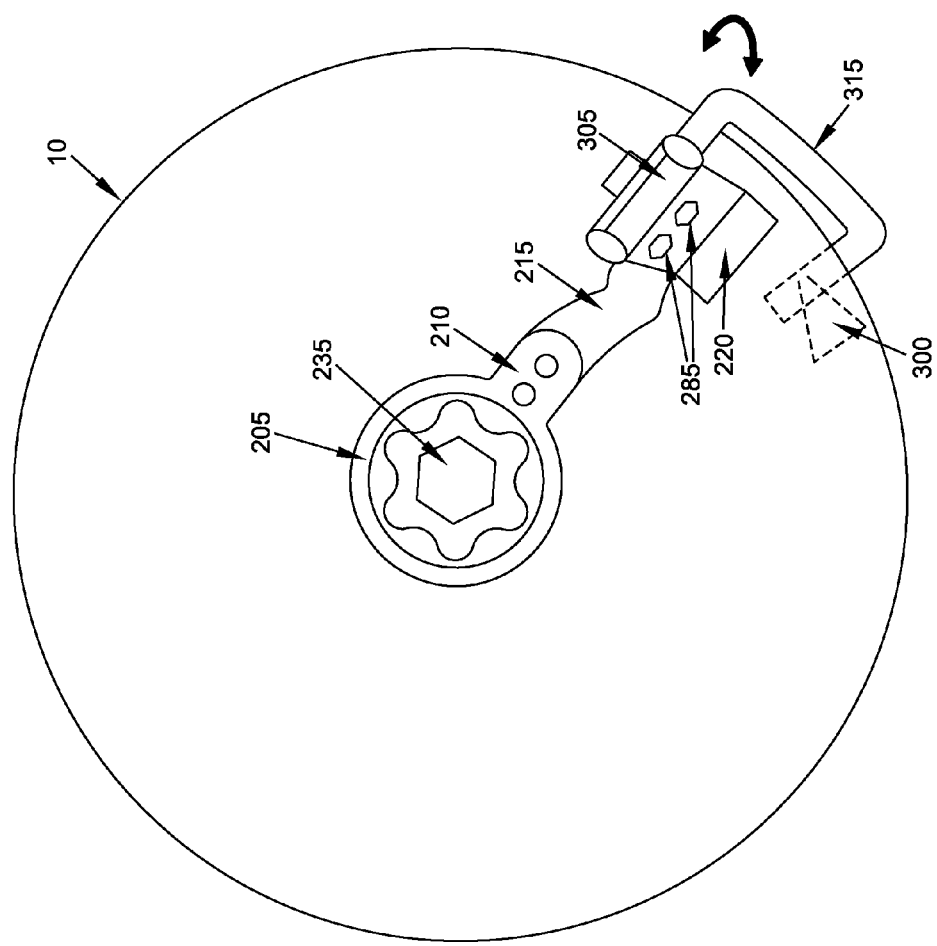
FIGS. 51-55 are schematic views showing the novel universal scraper with an associated rear surface scraper.
Figure 52:
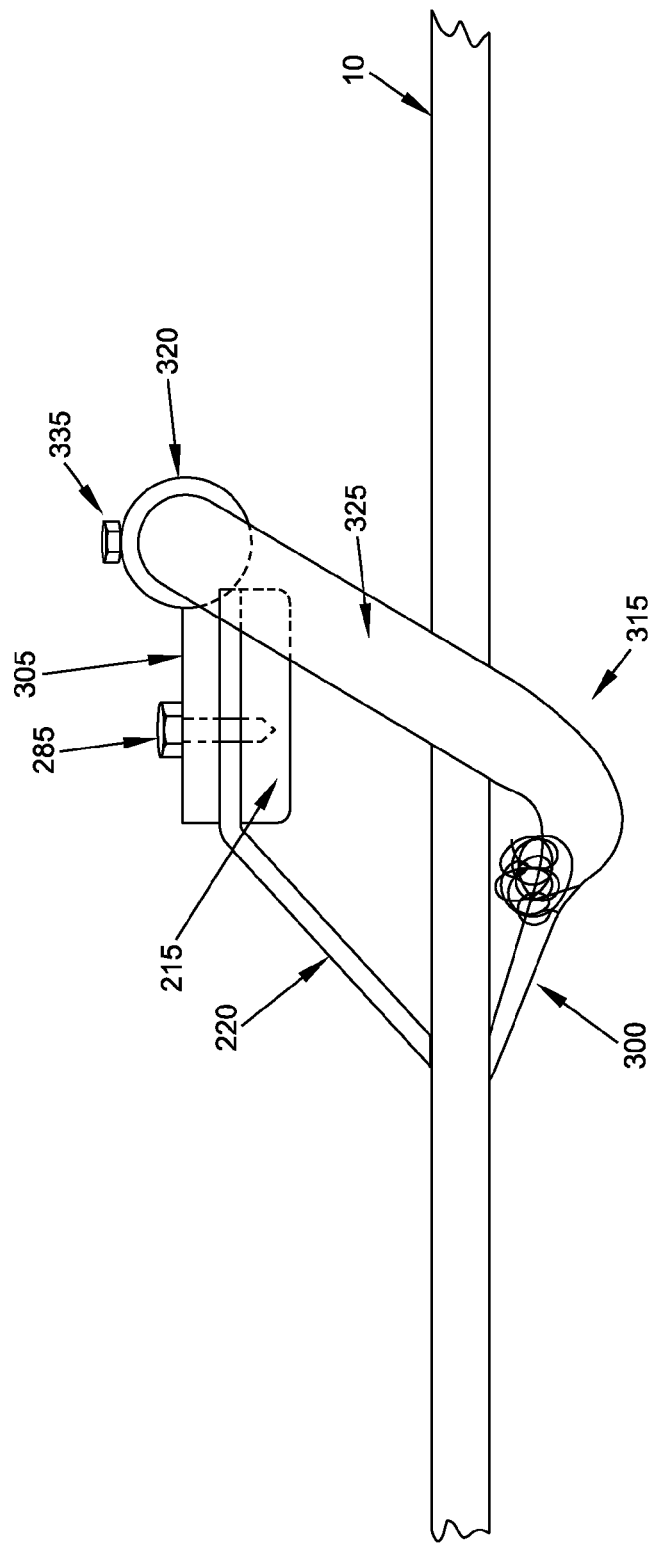
Figure 53:
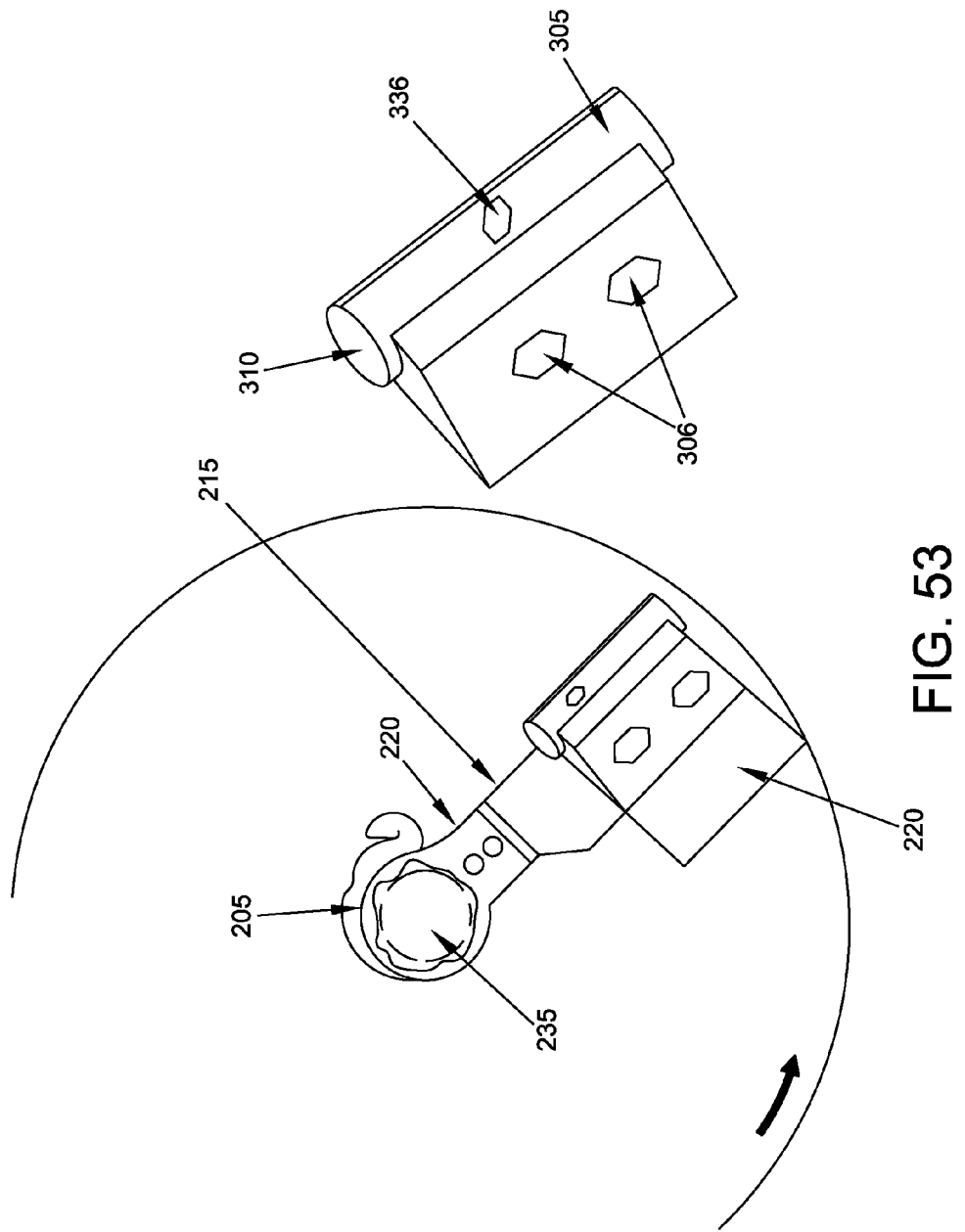
Figure 54:
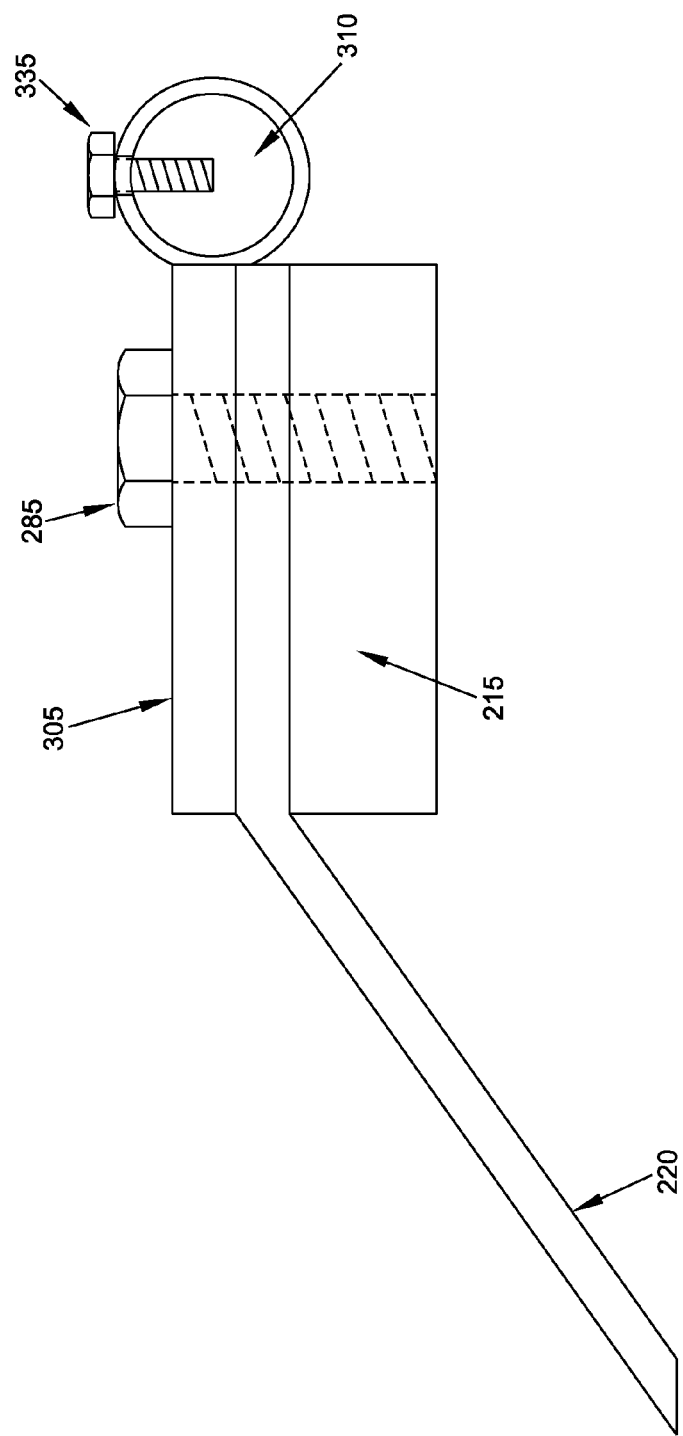
Figure 55:
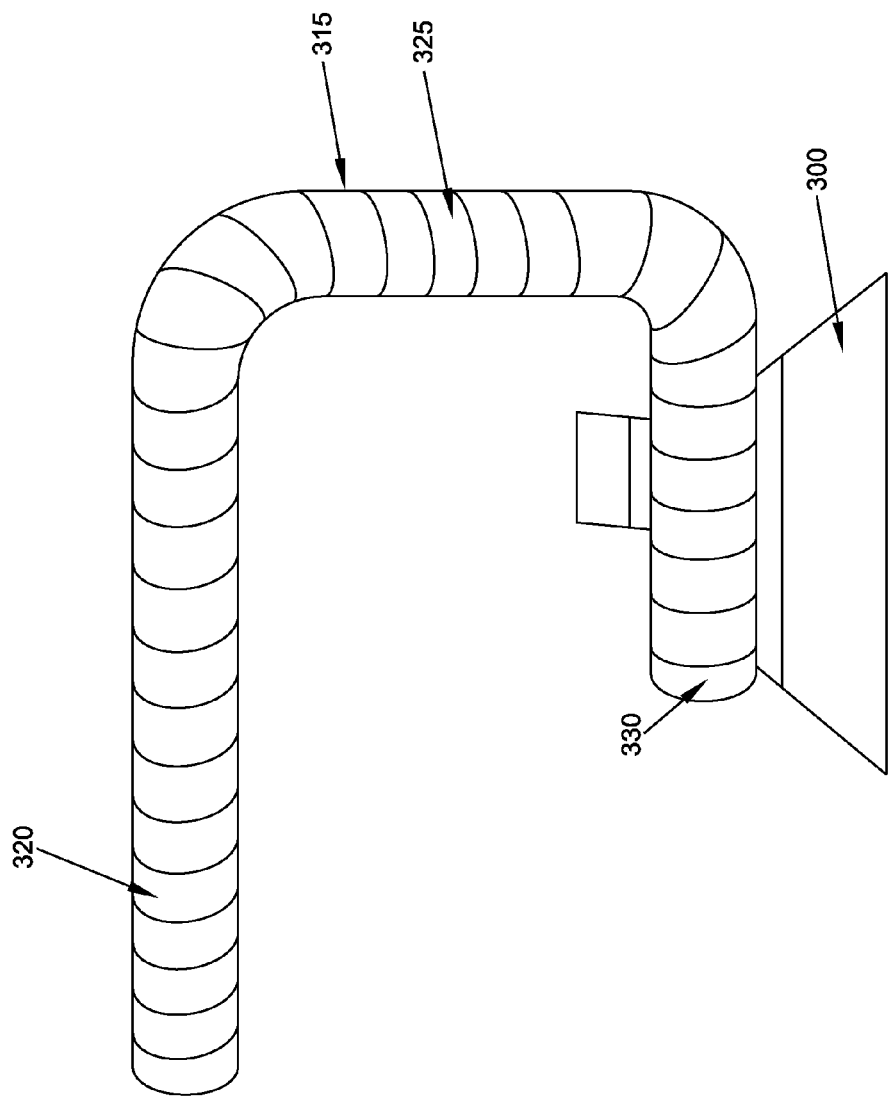

Hub adapter clamp 210 fastens to axle hub adapter using a clamping action. To this end, the proximal portion 271 of hub adapter clamp 210 is split so as to create a pair of segments 272, 273 separated by a narrow gap 275. A bolt 280 spans the narrow gap 275 and allows segments 272 to be drawn together, whereby to clamp hub adapter clamp 210 to axle hub adapter 205. In other words, bolt 280 may be used to tighten segments 272, 273 together in order to secure hub adapter clamp 210 in the desired position on axle hub adapter 205, i.e., at any point around the 360 degree circumference of the axle hub adapter. It will be appreciated that hub adapter clamp 210 may be formed in a variety of configurations. By way of example, one such configuration is shown in FIGS. 43 and 44; another such configuration is shown in FIGS. 45-47. Alternatively, other arrangements may be used to mount scraper arm 215 to axle hub adapter 205, however, hub adapter clamp 210 is preferred since it provides infinitely adjustable position settings. Hub adapter clamp 210 includes threaded holes 281.

Scraper arm 215 (FIGS. 27, 28 and 48) is secured to hub adapter clamp 210, e.g., via threaded holes 281 in hub adapter clamp 210 and threaded holes 282 in scraper arm 215. In one form of the invention, scraper arm 215 has a fixed length and is provided in a variety of sizes, so as to allow for use with larger or smaller diameter discs, etc. In another form of the invention, scraper arm 215 has an adjustable length so that a single scraper arm construction can be used with larger or smaller diameter discs.

Scraper blade 220 (FIGS. 27, 28, 49 and 50) is secured to scraper arm 215 with bolts 285 which pass through holes 290 in scraper blade 220 and are received in holes 295 in scraper arm 215. In one preferred form of the invention, holes 290 in scraper blade 220 may comprise elongated slots so as to allow the scraper blade to be moved inward, toward the hub, as the opening disc wears to smaller diameters. The scraper blade 220 may be made of spring steel with some flexibility so as to allow the scraper blade to flex against the surface of the rotating disc.

It will be appreciated that variations may be made to the foregoing constructions, such as providing a spring scraper arm with tensioning similar to the spring tensioning of windshield wiper arms, or providing a solid arm, or a spring steel arm, or a thin high carbon steel arm, as well as providing scraper blades with spring tensioning and/or different types of fasteners.

Figure 39:
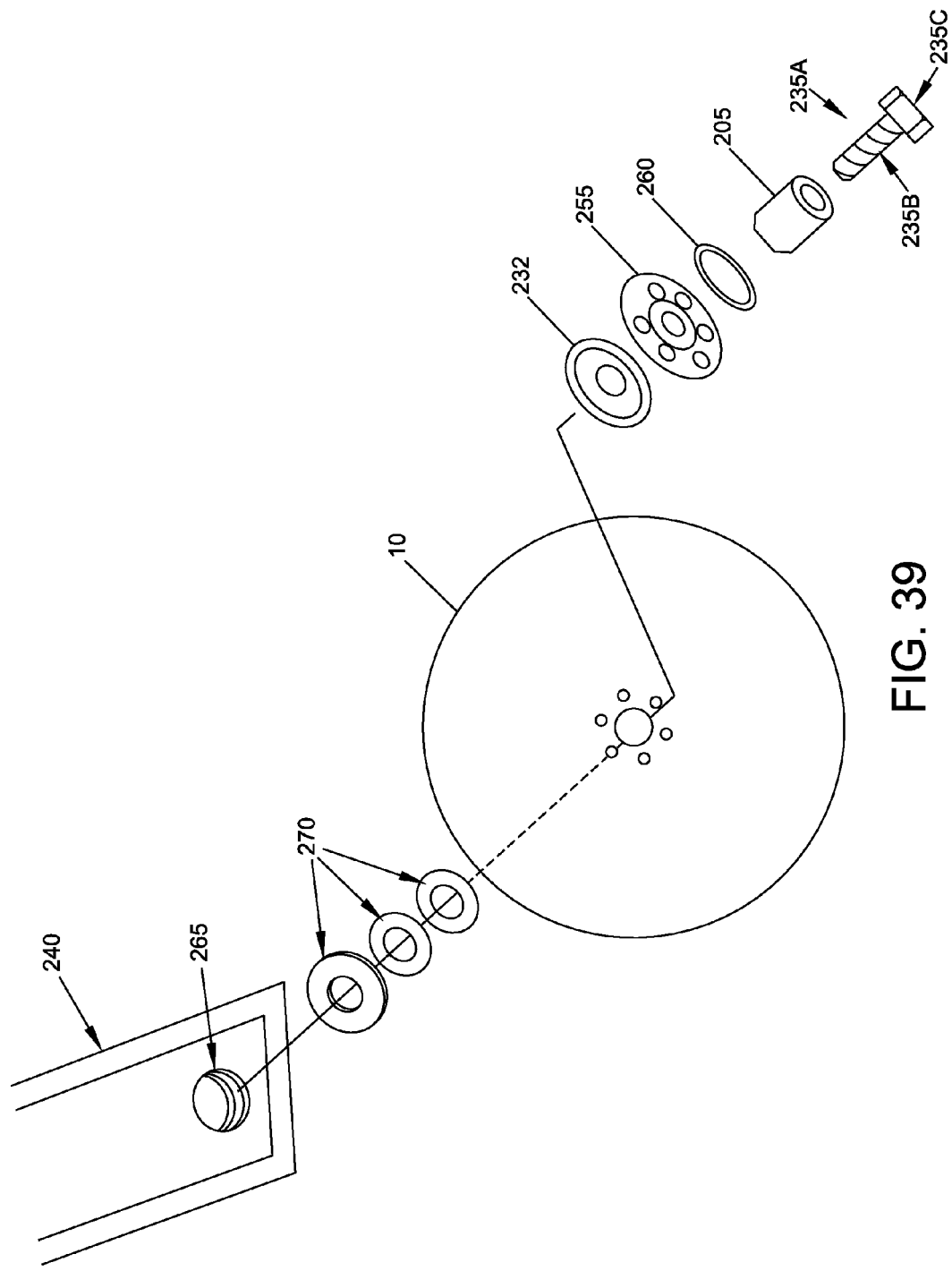
Figure 40:
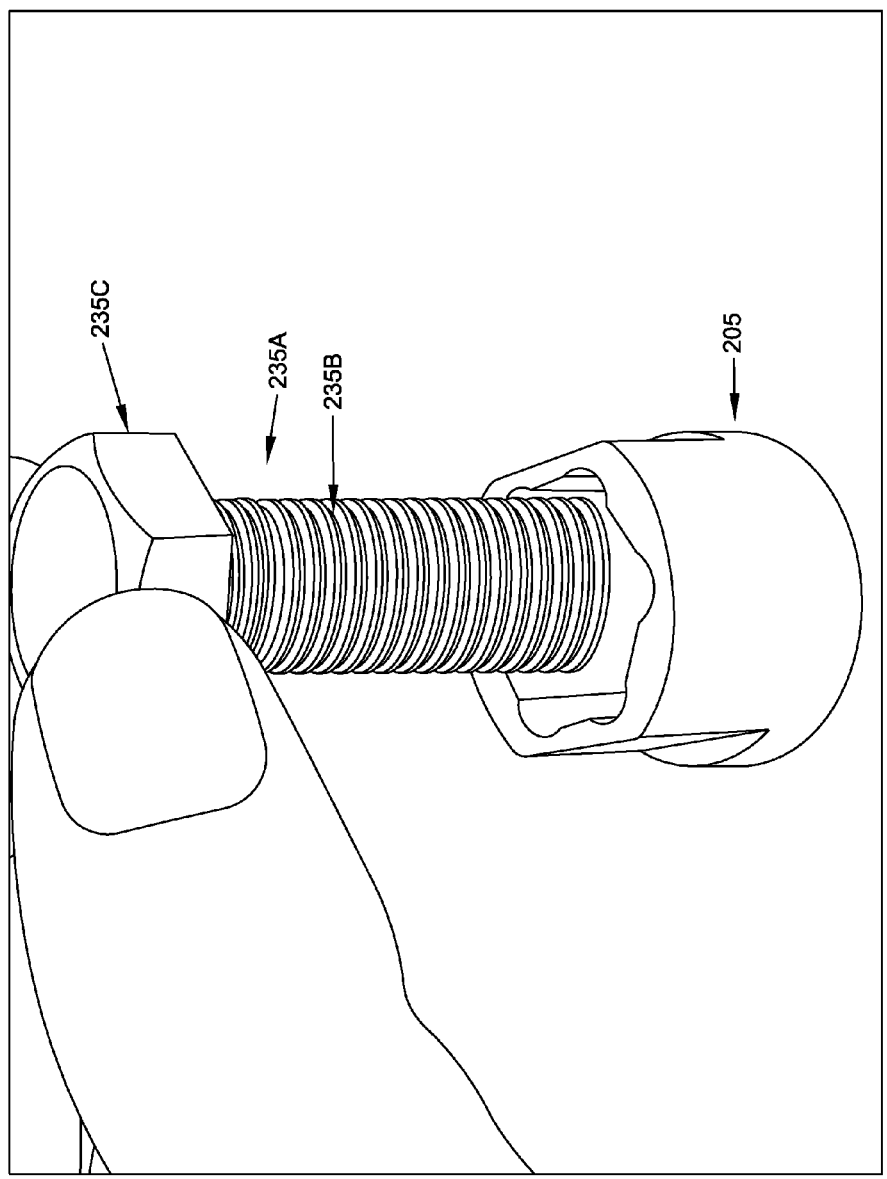
Figure 41:
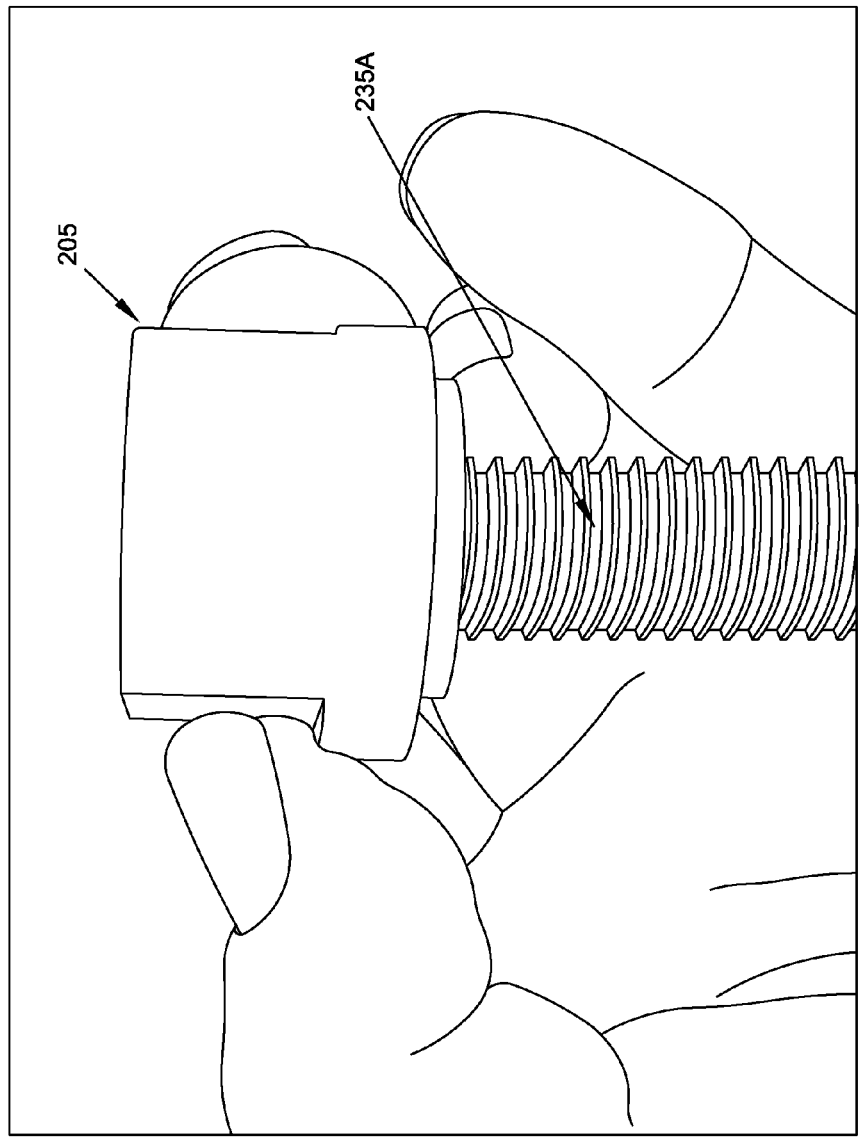
Figure 42:
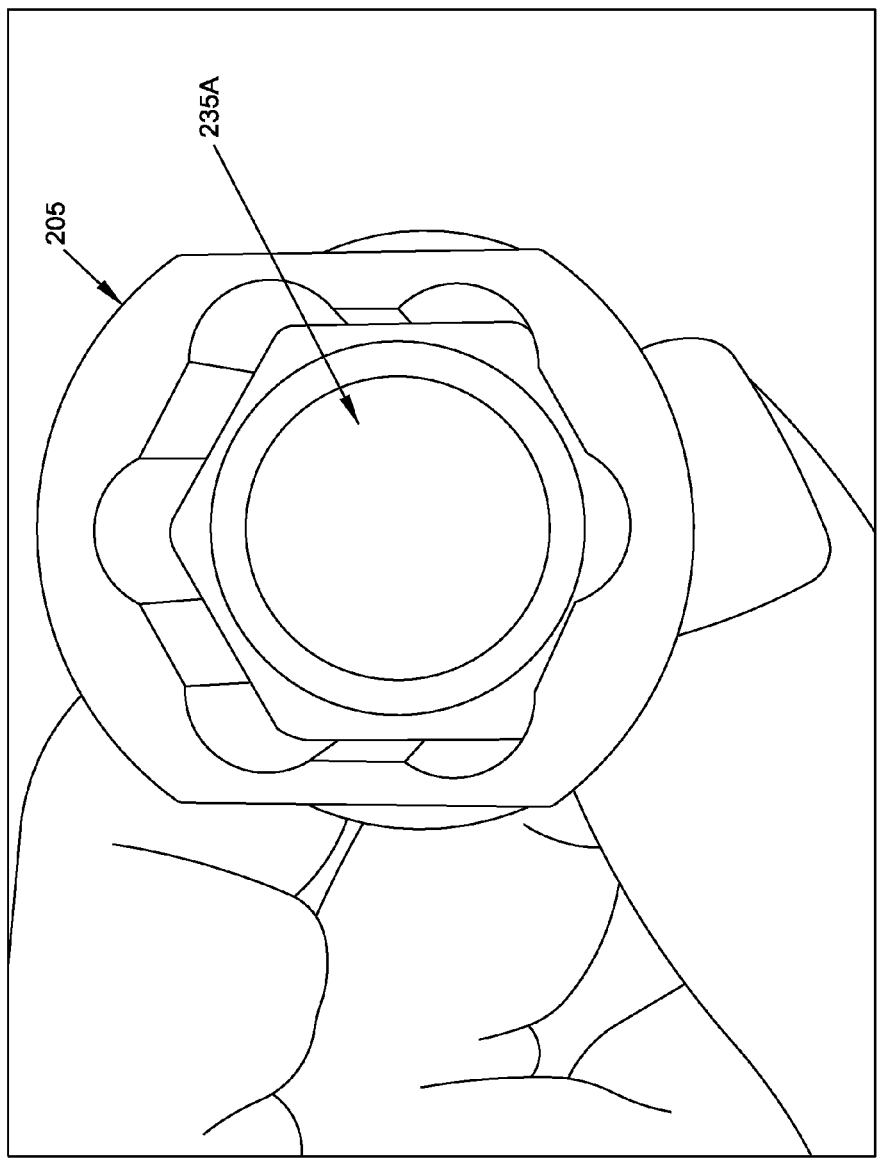

The axle hub adapter 205 used in the present invention allows the universal scraper to be installed on the axle of major brand planters, regardless of whether the planter uses an axle formed by a frame-mounted threaded stud (FIG. 29) or an axle formed by an axle bolt received by the frame (FIG. 39). This is a significant advantage in the art.

Another advantage over prior art constructions is the elimination of the need for left side scraper arms and right side scraper arms, inasmuch as the same universal scraper can be used for both left side applications and right side applications.

And another advantage over prior art constructions is the elimination of the need for left side scraper blades and right side scraper blades, inasmuch as identical scraper blades can be used with the universal scraper for both left side applications and right side applications.

In addition, the present invention has all interchangeable parts, regardless of whether scraping against a counterclockwise rotation or a clockwise rotation, and regardless of scraping against the left side or right side of an opening disc, etc.

And axle hub adapters using the principles of the present invention can be designed to fit axles with bearings such as tapered roller wheel bearings without departing from the spirit of this invention.

Currently, there also exist frame-mounted scrapers which scrape the back face of the opening disc surface, however, such back face frame-mounted scrapers suffer from many of the same disadvantages as the front face scrapers discussed above. Significantly, the present invention provides a scraper arm that can also serve as an attachment point for a second scraper arm that crosses over to the back side of the opening disc, where a second scraper scrapes the outer perimeter of the inboard (or back face) of the opening disc.

More particularly, and looking now at FIGS. 51-55, the distal end of scraper arm 215 can serve the dual purpose of (i) supporting front surface scraper blade 220, and (ii) supporting a rear surface scraper blade 300. In one preferred form of the invention, this is accomplished by attaching a bracket 305 to the free end of scraper arm 215. By way of example but not limitation, this may be done by passing screws 285 through holes 306 in bracket 305 and then through holes 290 in scraper blade 220 and then into holes 295 in scraper arm 215. Bracket 305 comprises a bore 310 which allows a second scraper arm 315 to be inserted into bore 310. Second scraper arm 315 is preferably in the form of a J or a U, with a first segment 320, a second segment 325 and a third segment 330. First segment 320 is intended to be inserted into bore 310 of bracket 305, second segment 325 is intended to span the thickness of opening disc 10, and third segment 330 is intended to support rear surface scraper blade 300. The tension of the rear surface scraper blade 300 can be adjusted by rotating first segment 320 within bore 310 so as to move third segment 330 closer to the opening disc surface. Second scraper arm 315 may be locked into the desired position by a set screw 335 which passes through a hole 336 or other locking mechanism. The rear surface scraper blade 300 may be placed at a radial surface position fore or aft of the front scraper position. The radial distance between the front and rear scraper blade contact points is dependent upon the arm length of the disc cross-over section of the scraper, i.e., second portion 325, as well as the sizings of other components, e.g., rear surface scraper blade 300.

A two-edged scraper blade 300 would allow the scraper blade to be used to scrape the back surface of either the left or right opening disc.

One advantage gained from using the new scraper system on equipment comprising double disc furrow openers is that of being able to position the left side disc to be scraped at a different radial location than the scraper of the right side disc. On one side of the row unit, a scraper blade could be easily positioned so as to scrape further forward of the opening disc center line, while the opposite opening disc could be set farther back on the trailing edge behind the opening disc center line. This configuration would prevent the sum of all scrapings from falling to the same trailing edge of both left and right opposing gauge wheel rim perimeters. As a result, this reduces the total quantity of scraped materials having to clear the exit point at any given time, thereby reducing the possibility of clogging.

Another advantage of the new scraper system is that it is able to release more of the scraped material forward of the opening disc hub, thereby allowing the material to use momentum to keep soil particles dispersed rather than falling rearward where they tend to tumble together, forming ever larger masses.

In addition, on single disc opener seed planters, fertilizer furrow placement arrangements and "no till" ground opening discs, it is often difficult to find a suitable place on the frame for mounting scrapers, thus mounting to the disc hub presents a significantly better option.

The universal scraper of the present invention gains considerable additional advantage when used with a gauge wheel with openings in the side wall of the wheel which allow soil to pass through, inasmuch as the scraper can be placed in a position to best use scraped material momentum to be directed by the scraper blade out through the revolving openings, thereby ensuring the best combination for double disc opener planters as well as single disc planters and drills, fertilizer disc opener coulters and "no till" ground opening discs.

MODIFICATIONS

While the present invention has been described in terms of certain exemplary preferred embodiments, it will be readily understood and appreciated by those skilled in the art that it is not so limited, and that many additions, deletions and modifications may be made to the preferred embodiments discussed herein without departing from the scope of the present invention.

What is claimed is:

1. A universal scraper for scraping an opening disc, wherein the opening disc rotates around an axle having a longitudinal axis, the universal scraper comprising:
   an elongated body having a first end and a second end, wherein the first end is mounted to the axle of the opening disc, and the second end receives a scraper blade for engagement against the opening disc, wherein the first end of the elongated body is adjustably lockable to the axle of the opening disc at a selected angle to the longitudinal axis of the axle of the opening disc, and further wherein the elongated body holds the scraper blade so as to be fixed against rotation relative to the opening disc during operation of the scraper blade.

2. A universal scraper according to claim 1 wherein the first end of the elongated body is adapted to mount to an axle supporting the opening disc.

3. A universal scraper according to claim 1 wherein the first end of the elongated body is adapted to mount to an axle supporting a gauge wheel.

4. A universal scraper according to claim 1 wherein the first end of the elongated body is mounted to an adapter secured to the axle of the opening disc.

5. A universal scraper according to claim 4 wherein the first end of the elongated body is clamped to the adapter.

6. A universal scraper according to claim 4 wherein the first end of the elongated body comprises two segments separated by a gap, and further wherein the two segments are adjustably movable relative to one another so as to clamp the elongated body to the adapter.

7. A universal scraper according to claim 1 wherein the axle of the opening disc comprises a threaded stud extending from a frame, and further wherein the adapter is secured to the threaded stud with a nut.

8. A universal scraper according to claim 1 wherein the axle comprises an axle bolt secured in a hole in a frame, and further wherein the adapter is secured to the axle by the head of the axle bolt.

9. A universal scraper according to claim 1 wherein the elongated body is fixed in length.

10. A universal scraper according to claim 1 wherein the elongated body is adjustable in length.

11. A universal scraper according to claim 1 further comprising a spanning body having a first end and a second end, the first end of the spanning body mounted to the elongated body, and the second end of the spanning body receiving a second scraper blade.

12. A universal scraper according to claim 11 wherein the spanning body spans a width of the opening disc so that the scraper blade and the second scraper blade scrape opposing sides of the same opening disc.

13. A universal scraper according to claim 12 wherein the spanning body comprises one of a J-shaped configuration and a U-shaped configuration.

14. A universal scraper according to claim 13 wherein the first end of the spanning body is mounted to the elongated body by inserting the first end of the spanning body into a hole.

15. A universal scraper according to claim 14 wherein the hole is formed in the elongated body.

16. A universal scraper according to claim 14 wherein the hole is formed in a member which is attached to the elongated body.

17. Apparatus for opening ground, the apparatus comprising:
   a frame;
   an opening disc rotatably mounted to the frame on an axle having a longitudinal axis; and
   a universal scraper for scraping the opening disc, the universal scraper comprising:
      an elongated body having a first end and a second end, wherein the first end is mounted to the axle of the opening disc, and the second end receives a scraper blade for engagement against the opening disc, wherein the first end of the elongated body is adjustably lockable to the axle of the opening disc at a selected angle to the longitudinal axis of the axle of the opening disc, and further wherein the elongated body holds the scraper blade so as to be fixed against rotation relative to the opening disc during operation of the scraper blade.

18. A method for opening ground, the method comprising:
   providing a frame, an opening disc rotatably mounted to the frame on an axle having a longitudinal axis, and a universal scraper for scraping the opening disc, the universal scraper comprising an elongated body having a first end and a second end, wherein the first end is mounted to the axle of the opening disc, and the second end receives a scraper blade for engagement against the opening disc, wherein the first end of the elongated body is adjustably lockable to the axle of the opening disc at a selected angle to the longitudinal axis of the axle of the opening disc, and further wherein the elongated body holds the scraper blade so as to be fixed against rotation relative to the opening disc during operation of the scraper blade; and moving the opening disc through the ground.

19. A universal scraper for scraping an opening disc, wherein the opening disc rotates around an axle having a longitudinal axis, the universal scraper comprising:

an elongated body having a first end and a second end, wherein the first end is mounted to the axle of the opening disc, and the second end receives a scraper blade, and further wherein the scraper blade is presented in fixed, scraping disposition to the opening disc during operation of the scraper blade; and a spanning body having a first end and a second end, the first end of the spanning body mounted to the elongated body, and the second end of the spanning body receiving a second scraper blade;

wherein the spanning body spans a width of the opening disc so that the scraper blade and the second scraper blade scrape opposing sides of the same opening disc;

wherein the spanning body comprises one of a J-shaped configuration and a U-shaped configuration;

wherein the first end of the spanning body is mounted to the elongated body by inserting the first end of the spanning body into a hole;

wherein the hole is formed in the elongated body.

\* \* \* \* \*